(12) United States Patent
Farag

(10) Patent No.: US 12,225,579 B2
(45) Date of Patent: Feb. 11, 2025

(54) SENSING OPERATIONS FOR SIDELINK COMMUNICATIONS

(71) Applicant: Samsung Electronics Co., Ltd., Suwon-si (KR)

(72) Inventor: Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 17/654,763

(22) Filed: Mar. 14, 2022

(65) Prior Publication Data

US 2022/0312479 A1    Sep. 29, 2022

Related U.S. Application Data

(60) Provisional application No. 63/307,924, filed on Feb. 8, 2022, provisional application No. 63/298,452, filed
(Continued)

(51) Int. Cl.
*H04W 74/0808* (2024.01)
*H04W 72/0446* (2023.01)
(Continued)

(52) U.S. Cl.
CPC ... *H04W 74/0808* (2013.01); *H04W 72/0446* (2013.01); *H04W 72/1263* (2013.01); *H04W 72/542* (2023.01)

(58) Field of Classification Search
CPC ......... H04W 74/0808; H04W 72/0446; H04W 72/1263; H04W 72/542; H04W 72/02; H04W 92/18
See application file for complete search history.

(56) References Cited

U.S. PATENT DOCUMENTS

| 10,611,322 | B2 | 4/2020 | Agiwal | |
| 11,647,540 | B2* | 5/2023 | Lee | H04W 76/28 370/329 |

(Continued)

FOREIGN PATENT DOCUMENTS

| WO | 2017222280 A1 | 12/2017 |
| WO | 2019028841 A1 | 2/2019 |
| WO | 2020063130 A1 | 4/2020 |

OTHER PUBLICATIONS

International Search Report and Written Opinion issued Jun. 30, 2022 regarding International Application No. PCT/KR2022/003826, 6 pages.

(Continued)

*Primary Examiner* — Tejis Daya

(57) ABSTRACT

Methods and apparatuses for adaptive low-power sensing operations for sidelink (SL) communications in a wireless communication system. A method of operating a user equipment (UE) includes operating with partial sensing; operating in a resource pool configured for the partial sensing; and triggering for a SL resource selection in a slot n. The method further includes selecting Y candidate slots for the SL resource selection and performing, in a sensing window, a contiguous partial sensing (CPS). A first of the selected Y candidate slots is a slot $t'_{y,0}{}^{SL}$. The sensing window is in contiguous slots within the resource pool relative to the slot $t'_{y,0}{}^{SL}$.

18 Claims, 29 Drawing Sheets

Related U.S. Application Data on Jan. 11, 2022, provisional application No. 63/279,503, filed on Nov. 15, 2021, provisional application No. 63/226,542, filed on Jul. 28, 2021, provisional application No. 63/168,839, filed on Mar. 31, 2021, provisional application No. 63/162,891, filed on Mar. 18, 2021.

(51) Int. Cl.
*H04W 72/1263* (2023.01)
*H04W 72/542* (2023.01)

(56) References Cited

U.S. PATENT DOCUMENTS

| | | | |
|---|---|---|---|
| 2019/0350045 A1 | 11/2019 | Lee et al. | |
| 2020/0229171 A1 | 7/2020 | Khoryaev et al. | |
| 2020/0296690 A1 | 9/2020 | Lee et al. | |
| 2021/0144726 A1 | 5/2021 | Hui et al. | |
| 2021/0243749 A1 | 8/2021 | Hoang et al. | |
| 2021/0250772 A1 | 8/2021 | Farag | |
| 2021/0400650 A1 | 12/2021 | Shilov et al. | |
| 2022/0078758 A1* | 3/2022 | Lee | H04W 72/1263 |
| 2022/0256553 A1 | 8/2022 | Lin et al. | |
| 2022/0386284 A1 | 12/2022 | Zhao et al. | |
| 2023/0028889 A1* | 1/2023 | Kim | H04W 72/542 |
| 2023/0080157 A1* | 3/2023 | Ko | H04W 72/0446 370/329 |
| 2023/0128828 A1* | 4/2023 | Ko | H04W 74/0808 370/329 |
| 2023/0254898 A1* | 8/2023 | Cheng | H04W 74/0816 370/329 |
| 2023/0319578 A1 | 10/2023 | Farag | |
| 2024/0080805 A1* | 3/2024 | Lee | H04W 72/0446 |

OTHER PUBLICATIONS

Moderator (OPPO), "FL summary for AI 8.11.1.1—resource allocation for power saving", 3GPP TSG RAN WG1 #104-e, R1-2101412, Jan. 2021, 91 pages.
Fujitsu, "Considerations on Partial Sensing and DRX in NR V2X", 3GPP TSG RAN WG1 Meeting #104-e, R1-2100745, Jan. 2021, 23 pages.
Apple, "Sidelink Resource Allocation for Power Saving", 3GPP TSG RAN WG1 #104-e, R1-2101357, Jan. 2021, 7 pages.
LG Electronics, "Discussion on resource allocation for power saving", 3GPP TSG RAN WG1 Meeting #104-e, R1-2100517, Jan. 2021, 20 pages.
"3rd Generation Partnership Project; Technical Specification Group Radio Access Network; NR; Physical channels and modulation (Release 16)", 3GPP TS 38.211 V16.8.0, Dec. 2021, 134 pages.
"3rd Generation Partnership Project; Technical Specification Group Radio Access Network; NR; Multiplexing and channel coding (Release 16)", 3GPP TS 38.212 V16.8.0, Dec. 2021, 153 pages.
"3rd Generation Partnership Project; Technical Specification Group Radio Access Network; NR; Physical layer procedures for control (Release 16)", 3GPP TS 38.213 V16.8.0, Dec. 2021, 189 pages.
"3rd Generation Partnership Project; Technical Specification Group Radio Access Network; NR; Physical layer procedures for data (Release 16)", 3GPP TS 38.214 V16.8.0, Dec. 2021, 172 pages.
"5G; NR; Medium Access Control (MAC) protocol specification (3GPP TS 38.321 version 16.7.0 Release 16)", ETSI TS 138 321 V16.7.0, Jan. 2022, 160 pages.
"5G; NR; Radio Resource Control (RRC); Protocol specification (3GPP TS 38.331 version 16.7.0 Release 16)", ETSI TS 138 331 V16.7.0, Jan. 2022, 950 pages.
"3rd Generation Partnership Project; Technical Specification Group Radio Access Network; Evolved Universal Terrestrial Radio Access (E-UTRA); Physical layer procedures (Release 16)", 3GPP TS 36.213 V16.8.0, Dec. 2021, 577 pages.
Extended European Search Report issued Jul. 18, 2024 regarding Application No. 22771815.2, 11 pages.
LG Electronics, "WID revision: NR Sidelink enhancement," 3GPP TSG RAN Meeting #88e, RP-201385, Electronic Meeting, Jun. 29-Jul. 3, 2020, 6 pages.
International Search Report and Written issued May 31, 2021 regarding Application No. PCT/KR2021/001844, 8 pages.
OPPO, "Discussions on resource reservation, sensing and selectioninMode 2", 3GPP TSG-RAN WG1 Meeting #98bis, R1-1910379, Oct. 2019, 12 pages.
Fujitsu, "Dynamic Resource Selection for NR Sidelink", 3GPP TSG RAN WG1 #99, R1-1912079, Nov. 2019, 17 pages.
NTT Docomo, Inc., "Sidelink resource allocation mechanism mode 2 for NR V2X", 3GPP TSG RAN WG1 #99, R1-1912882, Nov. 2019, 7 pages.
Intel Corporation, "Sidelink Resource Allocation Design for NR V2X Communication", 3GPP TSG RAN WG1 Meeting #96bis, R1-1904296, Apr. 2019, 15 pages.
Extended European Search Report issued May 11, 2023 regarding Application No. 21753331.4, 12 pages.
Intel Corporation, "Resource Allocation Mode-2 for NR V2X Sidelink Communication", 3GPP TSG RAN WG1 Meeting #98bis, R1-1910650, Oct. 2019, 28 pages.
OPPO, "Discussions on resource reservation, sensing and selection in Mode 2", 3GPP TSG-RAN WG1 Meeting #99, R1-1912794, Nov. 2019, 12 pages.
Intel Corporation, "Summary for AI 7.2.4.2.2 Mode-2 Resource Allocation", 3GPP TSG RAN WG1 Meeting #97, R1-1907699, May 2019, 26 pages.
Extended European Search Report issued Dec. 1, 2023 regarding Application No. 23196197.0, 12 pages.
Ericsson, "Resource allocation for Mode-2 transmissions", 3GPP TSG-RAN WGl Meeting #99, RI-1912599, Nov. 2019, 23 pages.
Vivo, "Discussion on mode 2 resource allocation mechanism", 3GPP TSG RAN WG1 #99 meeting, R1-1912022, Nov. 2019, 10 pages.
Intel Corporation, "Design of Resource Allocation Mode-2 for NR V2X Sidelink Communication", 3GPP TSG RAN WG1 Meeting #99, R1-1912205, Nov. 2019, 32 pages.
Intel Corporation, "UE-Autonomous Resource Allocation for NR V2X Sidelink Communication", 3GPP TSG RAN WG1 Meeting #98, R1-1908635, Aug. 2019, 28 pages.
USPTO, Office Action issued May 9, 2024 regarding U.S. Appl. No. 18/332,548, 24 pages.

* cited by examiner

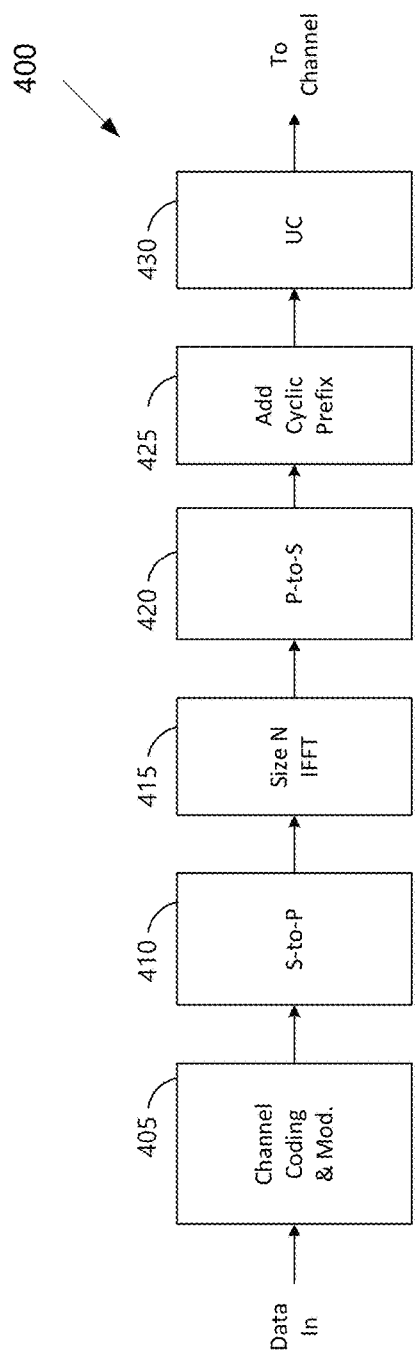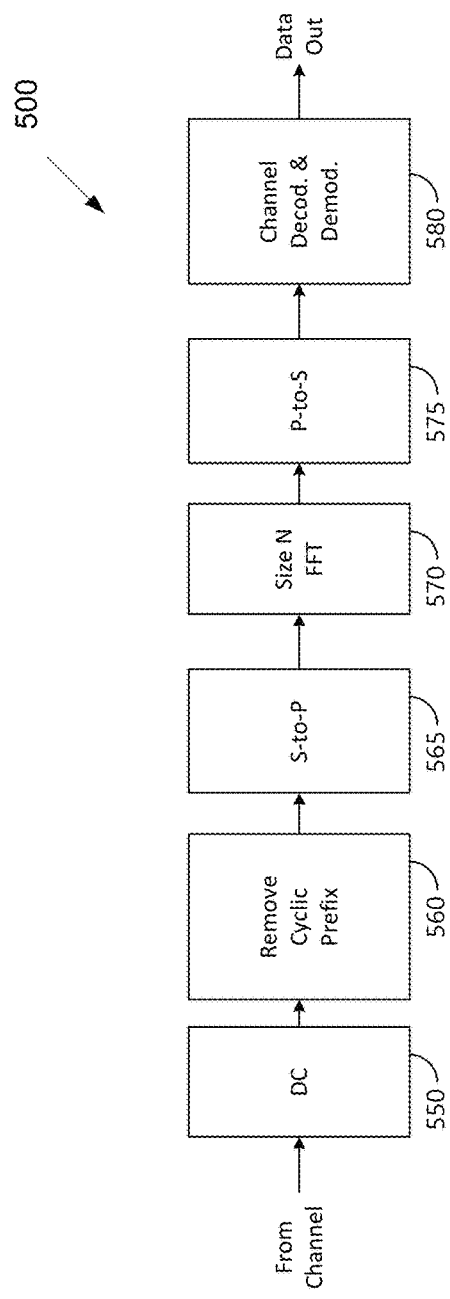

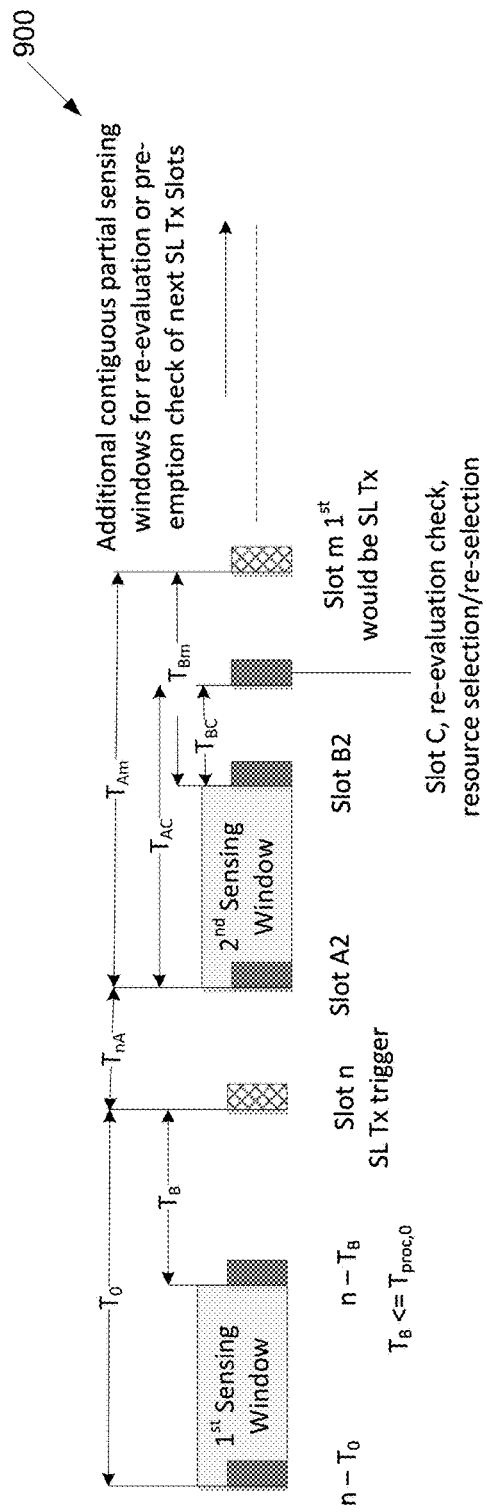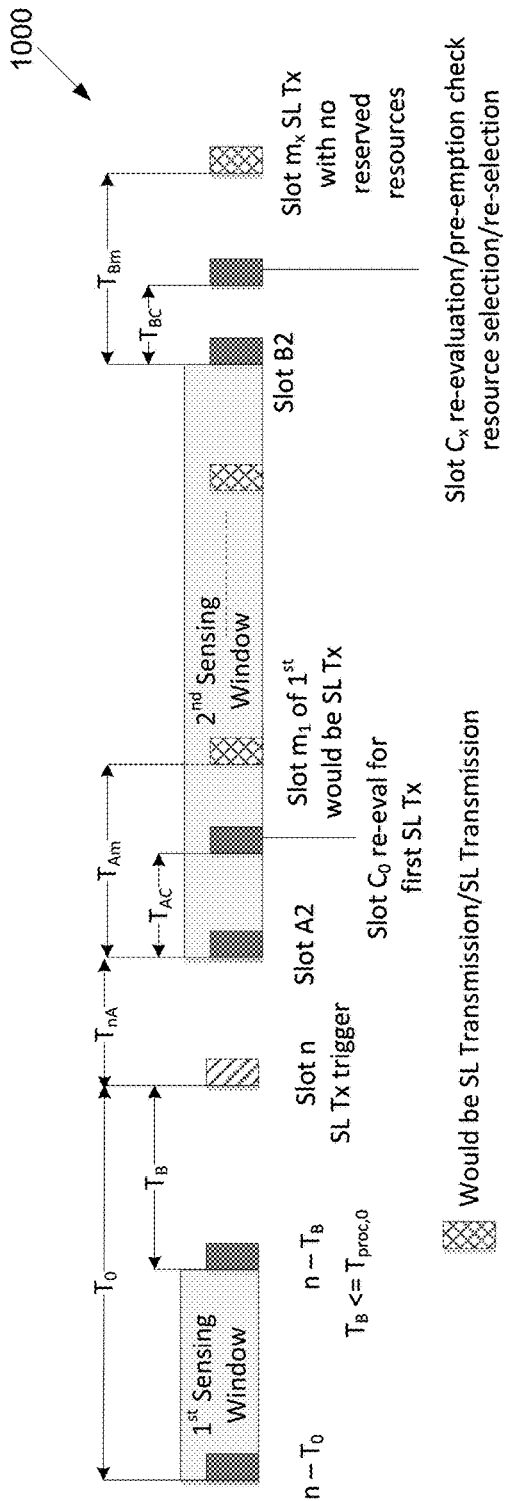

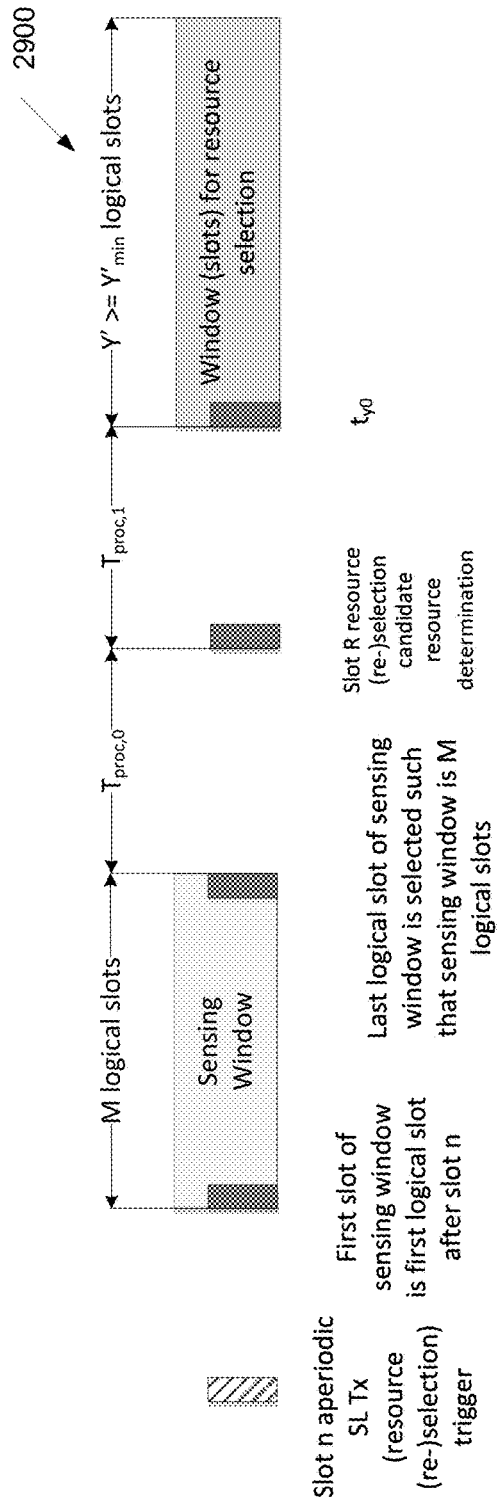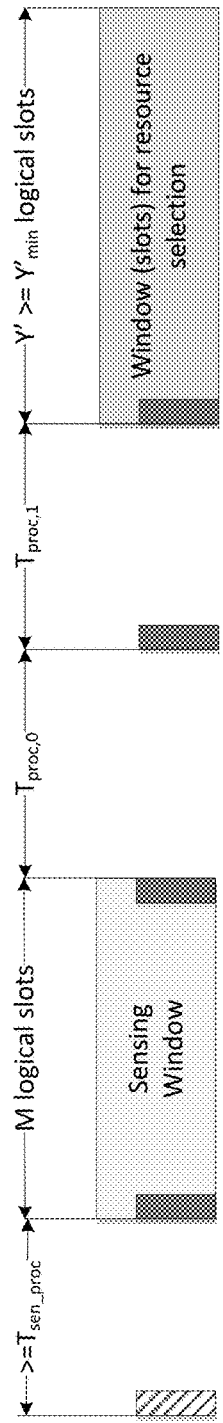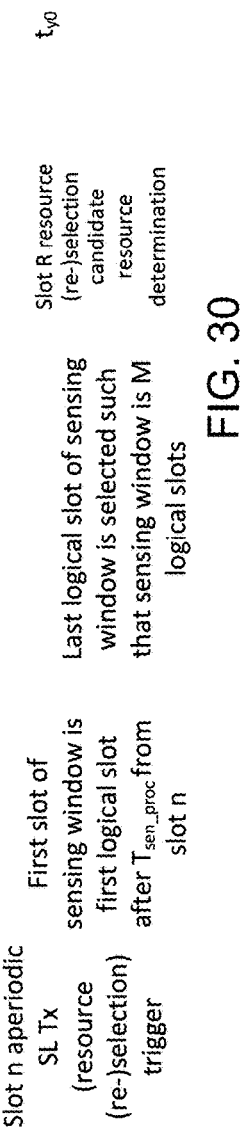
FIG. 29
FIG. 30

SENSING OPERATIONS FOR SIDELINK COMMUNICATIONS

CROSS-REFERENCE TO RELATED APPLICATIONS AND CLAIM OF PRIORITY

The present application claims priority to:
U.S. Provisional Patent Application No. 63/162,891, filed on Mar. 18, 2021;
U.S. Provisional Patent Application No. 63/168,839, filed on Mar. 31, 2021;
U.S. Provisional Patent Application No. 63/226,542, filed on Jul. 28, 2021;
U.S. Provisional Patent Application No. 63/279,503, filed on Nov. 15, 2021;
U.S. Provisional Patent Application No. 63/298,452, filed on Jan. 11, 2022; and
U.S. Provisional Patent Application No. 63/307,924, filed on Feb. 8, 2022. The content of the above-identified patent document is incorporated herein by reference.

TECHNICAL FIELD

The present disclosure relates generally to wireless communication systems and, more specifically, the present disclosure relates to an adaptive low-power sensing operation for sidelink (SL) in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to an adaptive low-power sensing operation for SL in a wireless communication system.

In one embodiment, a user equipment (UE) is provided. The UE includes a transceiver and a processor operably coupled to the transceiver. The processor is configured to operate with partial sensing, operate in a resource pool configured for the partial sensing, trigger a SL resource selection in a slot n, and select Y candidate slots for the SL resource selection. A first of the selected Y candidate slots is a slot $t'_{y_0}{}^{SL}$. The processor is further configured to perform, in a sensing window, a contiguous partial sensing (CPS). The sensing window is in contiguous slots within the resource pool relative to the slot $t'_{y_0}{}^{SL}$.

In another embodiment, a method of operating a UE is provided. The method includes operating with partial sensing; operating in a resource pool configured for the partial sensing; and triggering for a SL resource selection in a slot n. The method further includes selecting Y candidate slots for the SL resource selection and performing, in a sensing window, a CPS. A first of the selected Y candidate slots is a slot $t'_{y_0}{}^{SL}$. The sensing window is in contiguous slots within the resource pool relative to the slot $t'_{y_0}{}^{SL}$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4 and 5 illustrate examples of wireless transmit and receive paths according to this disclosure;

FIGS. 7-25 illustrate various examples of contiguous partial sensing operations according to various embodiments of the present disclosure;

FIGS. 29-50 illustrate various examples of sensing operations according to various embodiments of the present disclosure.

DETAILED DESCRIPTION

FIG. 1 through FIG. 50, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.8.0, "NR; Physical channels and modulation"; 3GPP TS 38.212 v16.8.0, "NR; Multiplexing and Channel coding"; 3GPP TS 38.213 v16.8.0, "NR; Physical Layer Procedures for Control"; 3GPP TS 38.214 v16.8.0, "NR; Physical Layer Procedures for Data"; 3GPP TS 38.321 v16.7.0, "NR; Medium Access Control (MAC) protocol specification"; and 3GPP TS 38.331 v16.7.0, "NR; Radio Resource Control (RRC) Protocol Specification"; and 3GPP TS 36.213 v16.8.0, "Evolved Universal Terrestrial Radio Access (E-UTRA); Physical layer procedures."

Figure 1:
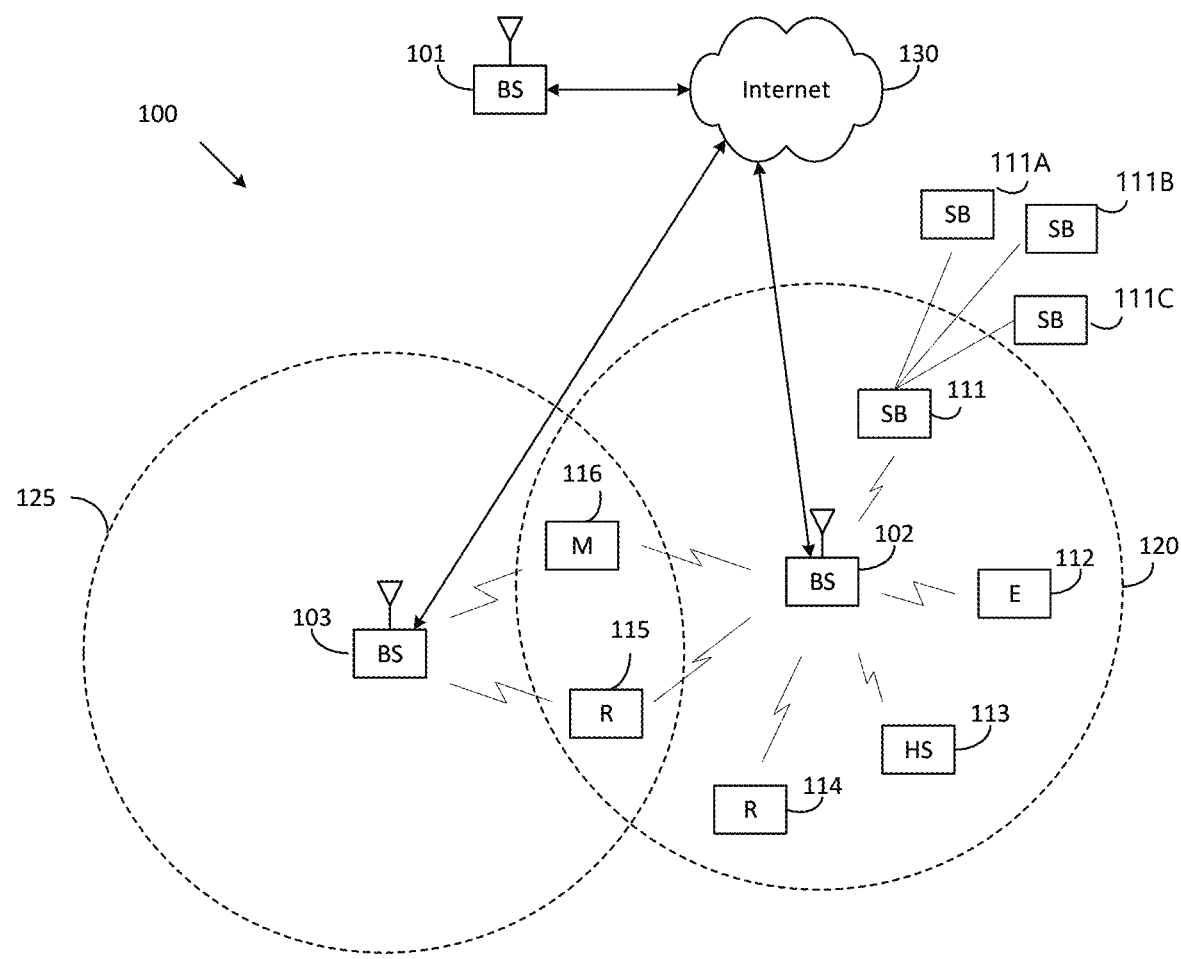
FIG. 1 illustrates an example of wireless network according to embodiments of the present disclosure.
Figure 2:
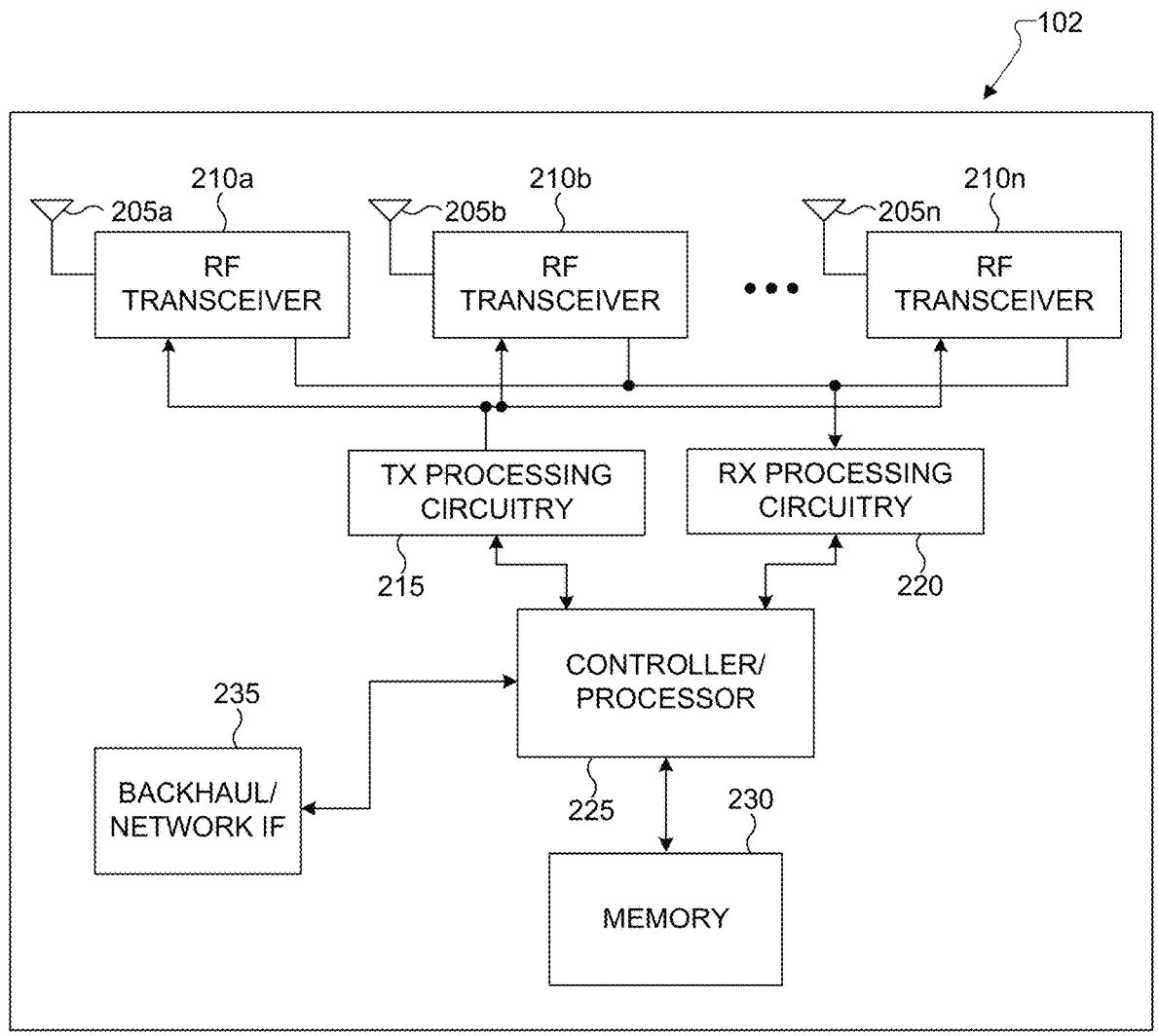
FIG. 2 illustrates an example of a gNB according to embodiments of the present disclosure.
Figure 3:
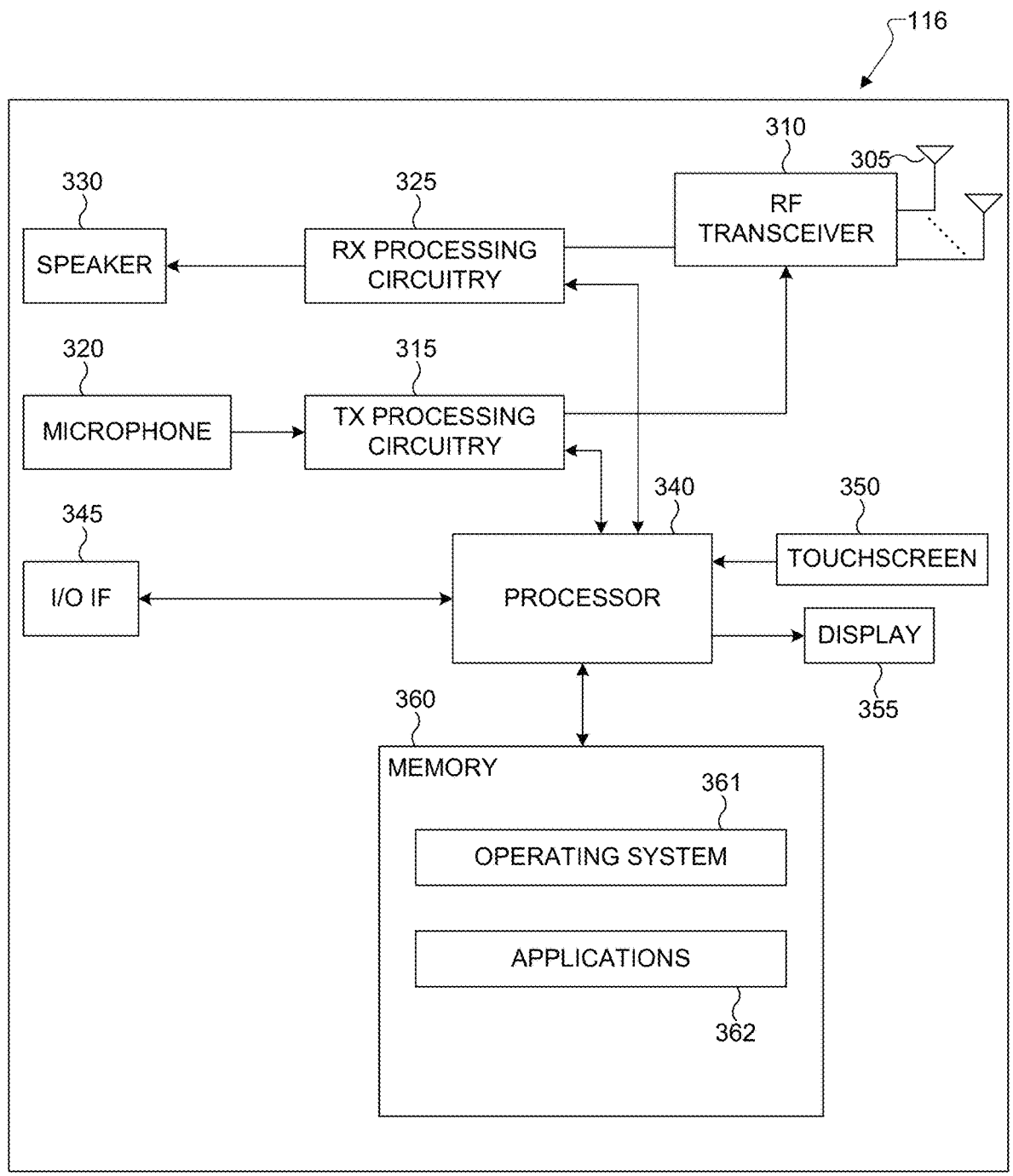
FIG. 3 illustrates an example of a UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques. In various embodiments, a UE 116 may communicate with another UE 115 via a sidelink (SL). For example, both UEs 115-116 can be within network coverage (of the same or different base stations). In another example, the UE 116 may be within network coverage and the other UE may be outside network coverage. In yet another example, both UE are outside network coverage. In one embodiment, the small office base station (SB) 111 can communicate with an SB 111A, an SB 111B, and an SB 111c, through the SL. The SBs 111A to 111C can communicate with the BS 102 through the SB 111. In yet another example, SBs 111A to 111C can communicate with another of the SBs 111A to 111C.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for an adaptive low-power sensing operation for SL in a wireless communication system. In certain embodiments, and one or more of the gNBs 101-103 includes circuitry, programing, or a combination thereof, for an adaptive low-power sensing operation for SL in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of downlink (DL) channel signals and the transmission of uplink (UL) channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support an adaptive low-power sensing operation for SL in a wireless communication system. Another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100, or by another UE on an SL. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL signals or SL channels and signals and the transmission of UL channel signals or SL channels and signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for an adaptive low-power sensing operation for SL in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points and a sidelink (SL) that refers to transmissions from one or more UEs to one or more UEs.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support SL sensing in SL communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. A transmitted RF signal from a first UE arrives at a second UE after passing through the wireless channel, and reverse operations to those at the first UE are performed at the second UE.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems. In addition, a slot can have symbols for SL communications. A UE can be configured one or more bandwidth parts (BWPs) of a system BW for transmissions or receptions of signals or channels.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information, physical SL control channels (PSCCHs) conveying SL control information (SCI) for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, and physical SL broadcast channel (PSBCH) conveying system information to assist in SL synchronization.

SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/stages corresponding to two respective SCI formats where, for example, the first SCI format is multiplexed on a PSCCH and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-)configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format transmitted from the gNB on a DL. In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a UE can be (pre-)configured one of two options for reporting of HARQ-ACK information by the UE: (i) HARQ-ACK reporting option (1): a UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB; and (ii) HARQ-ACK reporting option (2): a UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ-ACK reporting option (1), when a UE that transmitted the PSSCH detects a NACK in a PSFCH reception, the UE can transmit another PSSCH with the TB (retransmission of the TB). In HARQ-ACK reporting option (2) when a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots which can belong to a sidelink resource pool can be denoted by $\{t_0^{SL}, t_1^{SL}, t_2^{SL}, \ldots\}$. A set of slots which belong to a resource pool can be denoted by $\{t_0^{SL}, t_1^{SL}, t_2^{SL}, \ldots, t'_{T'_{MAX}-1}^{SL}\}$ and can be configured, for example, at least using a bitmap. Where, $T'_{MAX}$ is the number of SL slots in a resource pool. Within each slot $t'_y^{SL}$ of a sidelink resource pool, there are $N_{subCH}$ contiguous subchannels in the frequency domain for sidelink transmission, where $N_{subCH}$ is provided by a higher-layer parameter. Subchannel m, where m is between 0 and $N_{subCH}-1$, is given by a set of $n_{subCHsize}$ PRBs, given by $n_{PRB}=n_{subCHstart}+m \cdot n_{subCHsize}+j$, where $j=0, 1, \ldots, n_{subCHsize}-1$, $n_{subCHstart}$ and $n_{subCHsize}$ are provided by higher layer parameters.

The slots of a SL resource pool are determined as follow examples.

In one example, let a set of slots that may belong to a resource be denoted by $\{t_0^{SL}, t_1^{SL}, t_2^{SL}, \ldots, t_{T_{MAX}-1}^{SL}\}$, where $0 \leq t_i^{SL} < 10240 \times 2^\mu$, and $0 \leq i < T_{max}$ $\mu$ is the sub-carrier spacing configuration. $\mu=0$ for a 15 kHz sub-carrier spacing. $\mu=1$ for a 30 kHz sub-carrier spacing. $\mu=2$ for a 60 kHz sub-carrier spacing. $\mu=8$ for a 120 kHz sub-carrier spacing. The slot index is relative to slot #0 of SFN #0 of the serving cell, or DFN #0. The set of slots includes all slots except: (1) $N_{S-SSB}$ slots that are configured for SL SS/PBCH Block (S-SSB); (2) $N_{nonSL}$ slots where at least one SL symbols is not not-semi-statically configured as UL symbol by higher layer parameter tdd-UL-DL-ConfigurationCommon or sl-TDD-Configuration. In a SL slot, OFDM symbols Y-th, (Y+1)-th, (Y+X−1)-th are SL symbols, where Y is determined by the higher layer parameter sl-StartSymbol and X is determined by higher layer parameter sl-LengthSymbols; and (3) $N_{reserved}$ reserved slots. Reserved slots are determined such that the slots in the set $\{t_0^{SL}, t_1^{SL}, t_2^{SL}, \ldots, t_{T_{MAX}-1}^{SL}\}$ is a multiple of the bitmap length ($L_{bitmap}$), where the bitmap $(b_0, b_1, \ldots, b_{L_{bitmap}-1})$ is configured by higher layers. The reserved slots are determined as follows: (i) let $\{l_0, l_1, \ldots, l_{2^\mu \times 10240-N_{S-SSB}-N_{nonSL}-1}\}$ be the set of slots in range $0 \ldots 2^\mu \times 10240-1$, excluding S-SSB slots and non-SL slots. The slots are arranged in ascending order of the slot index; (ii) the number of reserved slots is given by: $N_{reserved}=(2^\mu \times 10240-N_{S-SSB}-N_{nonSL}) \bmod L_{bitmap}$; and (iii) the reserved slots $l_r$ are given by:

$$r = \left\lfloor \frac{m \cdot (2^\mu \times 10240 - N_{S-SSB} - N_{nonSL})}{N_{reserved}} \right\rfloor,$$

where, $m=0, 1, \ldots, N_{reserved}-1$. $T_{max}$ is given by: $T_{max}=2^\mu \times 10240-N_{S-SSB}-N_{nonSL}-N_{reserved}$.

In another example, the slots are arranged in ascending order of slot index.

In yet another example, the set of slots belonging to the SL resource pool, $\{t'_0^{SL}, t'_1^{SL}, t'_2^{SL}, \ldots, t'_{T'_{MAX}-1}^{SL}\}$, are determined as follows: (1) each resource pool has a corresponding bitmap $(b_0, b_1, b_{L_{bitmap}-1})$ of length $L_{bitmap}$; (2) a slot $t_k^{SL}$ belongs to the resource pool if $b_{k \bmod L_{bitmap}}=1$; and (3) the remaining slots are indexed successively staring from 0, 1, ... $T'_{MAX}-1$. Where, $T'_{MAX}$ is the number of remaining slots in the set.

Slots can be numbered (indexed) as physical slots or logical slots, wherein physical slots include all slots numbered sequential, while logical slots include only slots that belong to a sidelink resource pool as described above numbered sequentially. The conversion from a physical duration, $P_{rsvp}$, in milli-second to logical slots, $P_{rsvp}'$, is given by $$P'_{rsvp} = \left\lceil \frac{T'_{max}}{10240 \text{ ms}} \times P_{rsvp} \right\rceil.$$

For resource (re-)selection or re-evaluation in slot n, a UE can determine a set of available single-slot resources for transmission within a resource selection window [n+T$_1$, n+T$_2$], such that a single-slot resource for transmission, R$_{x,y}$ is defined as a set of L$_{subCH}$ contiguous subchannels x+i, where i=0, 1, ..., L$_{subCH}$−1 in slot t'$_y^{SL}$. T$_1$ is determined by the UE such that, 0≤T$_1$≤T$_{proc,1}^{SL}$, where T$_{proc,1}^{SL}$ is a PSSCH processing time for example as defined in REF 4. For example, T$_{proc,1}^{SL}$ the resource selection processing time in TABLE 3. T$_2$ is determined by the UE such that T$_{2min}$≤T$_2$≤remaining packet delay budget, as long as T$_{2min}$≤remaining packet delay budget, else T$_2$ is equal to the remaining packet delay budget. T$_{2min}$ is a configured by higher layers and depends on the priority of the SL transmission.

The resource (re-)selection is a two-step procedure: (1) the first step (e.g., performed in the physical layer) is to identify and determine the candidate resources within a resource selection window. Candidate resources are resources that belong to a resource pool, but exclude resources (e.g., resource exclusion) that were previously reserved, or potentially reserved by other UEs. The resources excluded are based on SCIs decoded in a sensing window and for which the UE measures a SL RSRP that exceeds a threshold. The threshold depends on the priority indicated in a SCI format and on the priority of the SL transmission. Therefore, sensing within a sensing window involves decoding the first stage SCI, and measuring the corresponding SL RSRP, wherein the SL RSRP can be based on PSCCH DMRS or PSSCH DMRS. Sensing is performed over slots where the UE doesn't transmit SL. The resources excluded are based on reserved transmissions or semi-persistent transmissions that can collide with any of reserved or semi-persistent transmissions; the identified (determined) candidate resources after resource exclusion are provided (reported) to higher layers and (2) the second step (e.g., performed in the higher layers) is to select or re-select a resource from the identified (determined) candidate resources for PSSCH/PSCCH transmission.

During the first step of the resource (re-)selection procedure, a UE can monitor slots in a sensing window [n−T$_0$, n−T$_{proc,0}^{SL}$), where the UE monitors slots belonging to a corresponding sidelink TX resource pool that are not used for the UE's own transmission. For example, T$_{proc,0}^{SL}$ is the sensing processing latency time. To determine a candidate single-slot resource set to report to higher layers, a UE excludes (e.g., resource exclusion) from the set of available single-slot resources for SL transmission within a TX resource pool and within a resource selection window, the following: single slot resource R$_{x,y}$, such that for any slot t'$_m^{SL}$ not monitored within the sensing window with a hypothetical received SCI Format 1-A, with a "Resource reservation period" set to any periodicity value allowed by a higher layer parameter sl-ResourceReservePeriodList, and indicating all sub-channels of the resource pool in this slot, satisfies condition 2.2. below.

To determine a candidate single-slot resource set to report to higher layers, a UE excludes from the set of available single-slot resources for SL transmission within a TX resource pool and within a resource selection window, the following: single slot resource R$_{x,y}$, such that for any received SCI within the sensing window: (1) the associated L1-RSRP measurement is above a (pre-)configured SL-RSRP threshold, where the SL-RSRP threshold depends on the priority indicated in the received SCI and that of the SL transmission for which resources are being selected; (2) (Condition 2.2) The received SCI in slot t'$_m^{SL}$, or if "Resource reservation field" is present in the received SCI the same SCI is assumed to be received in slot t'$_{m+q \times P_{rsvp\_Rx}}^{SL}$ indicates a set of resource blocks that overlaps R$_{x,y+j \times P_{rsvp\_Tx}}$, where: (i) q=1, 2, ..., Q, (where: if P$_{rsvp\_RX}$≤T$_{scal}$ and $$n' - m < P'_{rsvp\_Rx} \Rightarrow Q = \left\lceil \frac{T_{scal}}{P_{rsvp\_RX}} \right\rceil.$$

T$_{scal}$ is T$_2$ in units of milli-seconds; else Q=1, if n belongs to (t'$_0^{SL}$, t'$_1^{SL}$, ..., t'$_{T'_{MAX}-1}^{SL}$), n'=n, else n' is the first slot after slot n belonging to set (t'$_0^{SL}$, t'$_1^{SL}$, ..., t'$_{T'_{MAX}-1}^{SL}$)); (ii) j=0, 1, ..., C$_{resel}$−1; (iii) P$_{rsvp\_RX}$ is the indicated resource reservation period in the received SCI in physical slots, and P$_{rsvp\_Rx}$' is that value converted to logical slots; and (iv) P$_{rsvp\_Tx}$' is the resource reservation period of the SL transmissions for which resources are being reserved in logical slots; and (3) if the candidate resources are less than a (pre-)configured percentage, such as 20%, of the total available resources within the resource selection window, the (pre-)configured SL-RSRP thresholds are increased by a predetermined amount, such as 3 dB.

NR SL introduced two new procedures for mode 2 resource allocation; re-evaluation and pre-emption.

Re-evaluation check occurs when a UE checks the availability of pre-selected SL resources before the resources are first signaled in an SCI Format, and if needed re-selects new SL resources. For a pre-selected resource to be first-time signaled in slot m, the UE performs a re-evaluation check at least in slot m−T$_3$, where T$_3$=T$_{proc,1}^{SL}$ as define in TS 38.214, clause 8.1.4. T$_3$ is a resource selection processing time for re-evaluation check, which equals a resource selection processing time T$_{proc,1}^{SL}$. The re-evaluation check includes: (1) performing the first step of the SL resource selection procedure as determined in 3GPP standard specification (i.e., clause 8.1.4 of TS 38.214), which involves identifying (determining) a candidate (available) sidelink resource set in a resource selection window as previously described; (3) if the pre-selected resource is available in the candidate sidelink resource set, the resource is used/signaled for sidelink transmission; and (4) else, the pre-selected resource is not available in the candidate sidelink resource set, a new sidelink resource is re-selected from the candidate sidelink resource set.

Pre-emption check occurs when a UE checks the availability of pre-selected SL resources that have been previously signaled and reserved in an SCI Format, and if needed re-selects new SL resources. For a pre-selected and reserved resource to be signaled in slot m, the UE performs a pre-emption check at least in slot m−T$_3$, where T$_3$=T$_{proc,1}^{SL}$ as defined in TS 38.214 clause 8.1.4. T$_3$ is a resource selection processing time for pre-emption check, which equals a resource selection processing time T$_{proc,1}^{SL}$.

The pre-emption check includes: (1) performing the first step of the SL resource selection procedure as determined in 3GPP standard specification (i.e., clause 8.1.4 of TS 38.214), which involves identifying (determining) candidate (available) sidelink resource set in a resource selection window as previously described; (2) if the pre-selected and reserved resource is available in the candidate sidelink resource set, the resource is used/signaled for sidelink transmission; (3)

else, the pre-selected and reserved resource is NOT available in the candidate sidelink resource set. The resource is excluded from the candidate resource set due to an SCI, associated with a priority value $P_{RX}$, having an RSRP exceeding a threshold. Let the priority value of the SL resource being checked for pre-emption be $P_{TX}$: (i) if the priority value $P_{RX}$ is less than a higher-layer configured threshold and the priority value $P_{RX}$ is less than the priority value $P_{TX}$. The pre-selected and reserved SL resource is pre-empted. A new SL resource is re-selected from the candidate SL resource set. Note that, a lower priority value indicates traffic of higher priority; and (ii) else, the resource is used/signaled for SL transmission.

As described above, the monitoring procedure for resource (re)selection during the sensing window requires reception and decoding of a SCI format during the sensing window, as well as measuring the SL RSRP. This reception and decoding process and measuring the SL RSRP increases a processing complexity and power consumption of a UE for SL communication.

3GPP Release 16 is the first NR release to include SL through work item "5G V2X with NR SL," the mechanisms introduced focused mainly on vehicle-to-everything (V2X), and can be used for public safety when the service requirement can be met. Release 17 extends SL support to more use cases through work item "NR sidelink enhancement." One of the motivations for the SL enhancement in Release 17 is power saving.

Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

One of the objectives of the Release 17 SL enhancement work item is to specify resource allocation enhancements that reduce power consumption, taking the principle of the release 14 LTE sidelink random resource selection and partial sensing as baseline with potential enhancements. For resource allocation enhancement, resource allocation is specified to reduce power consumption of the UEs: (1) baseline is to introduce the principle of Rel-14 LTE sidelink random resource selection and partial sensing to Rel-16 NR sidelink resource allocation mode 2; and (2) taking Rel-14 as the baseline does not preclude introducing a new solution to reduce power consumption for the cases where the baseline cannot work properly.

Another motivation for the sidelink enhancement in Release 17 is to enhance reliability and reduced latency: allows the support of URLLC-type sidelink use cases in wider operation scenarios. The system level reliability and latency performance of sidelink is affected by the communication conditions such as the wireless channel status and the offered load, and Rel-16 NR sidelink is expected to have limitation in achieving high reliability and low latency in some conditions, e.g., when the channel is relatively busy. Solutions that can enhance reliability and reduce latency are required in order to keep providing the use cases requiring low latency and high reliability under such communication conditions.

Another objective of the Release 17 sidelink enhancement work item is to study the feasibility and benefits of enhancements to resource allocation mode 2, wherein a set of resources can be determined at UE-A and sent to UE-B, and UE-B takes into account this set for its own transmission. As discussed in the 3GPP standard procedure, for inter-UE coordination, a set of resources is determined at UE-A. This set is sent to UE-B in mode 2, and UE-B takes this into account in the resource selection for its own transmission.

To alleviate the issues associated with sensing, various schemes have been provided, e.g., random resource selection (e.g., no sensing) and partial sensing have been considered in LTE for SL transmission and are under consideration in NR. With a random resource selection, a UE randomly selects a resource for SL transmission within the total available resources of a TX resource pool within a resource selection window without performing sensing. With partial sensing, a UE can sense some sidelink slots. Partial sensing can be periodic-based partial sensing (PBPS), wherein the sensed slots can occur at fixed periodic interval. Alternatively, partial sensing can be contiguous partial sensing (CPS), wherein slots are sensed contiguously within a short time window before resource selection/reselection for an initial SL transmission or for a re-evaluation check or a preemption check.

In this disclosure, we consider the design of the sensing window for contiguous partial sensing for initial resource selection/re-selection and re-evaluation check and preemption check. We also consider the determination of the type of sensing and the sensing window and the slots for the selection of the candidate SL resources based on the TX resource pool configuration, e.g., with and without periodic reservations, the type of traffic (periodic or aperiodic), and (pre-) configuration. We also consider SL Channel Busy Ratio (CBR) in case of partial sensing 3GPP Release 16 is the first NR release to include sidelink through work item "5G V2X with NR sidelink," the mechanisms introduced focused mainly on vehicle-to-everything (V2X), and can be used for public safety when the service requirement can be met. Release 17 extends sidelink support to more use cases through work item "NR Sidelink enhancement."

One of the motivations for the sidelink enhancement in Release 17 is power savings. One of the objectives of the Release 17 sidelink enhancement work item is to introduce the principle of Rel-14 LTE sidelink random resource selection (e.g., no sensing). Low power sensing can be based on partial sensing or no sensing (for random resource selection). Partial sensing can be periodic-based partial sensing (PBPS) and/or contiguous partial sensing (CPS). It has been agreed that a SL mode 2 TX resource pool can be (pre-) configured to enable full sensing only, partial sensing only, random resource selection only, or a combination of thereof. The configuration of the sensing window for partial sensing depends on how far in advance a UE can know about a SL transmission (resource selection/re-selection procedure) trigger start to start partial sensing, and sense for a sufficient time period before resource selection/re-selection and candidate resources determination/reporting to higher layers.

In the present disclosure, we consider the design of the contiguous partial sensing window for initial resource selection/re-selection and re-evaluation check and pre-emption check, as well as the determination of the sensing mode and sensing window based on the TX resource pool type, e.g., whether or not it supports periodic resource reservation and the traffic type, e.g., periodic or aperiodic traffic.

The present disclosure relates to a 5G/NR communication system.

The present disclosure considers the design of the contiguous partial sensing window for initial resource selection/re-selection and re-evaluation check and pre-emption check.

This disclosure also considers the determination of the sensing mode and sensing window based on the TX resource pool type, e.g., whether or not it supports periodic resource reservation and the traffic type, e.g., periodic or aperiodic traffic.

The present disclosure relates to a 5G/NR communication system.

The present disclosure introduces signaling and methods for: (1) the determination of the sensing window and the slots for the selection of candidate SL resources for aperiodic SL transmission in case of partial sensing; and (2) SL channel busy ratio (CBR) determination and validity in case of partial sensing.

In the present disclosure, a UE is (pre-)configured to operate one or more sensing modes.

In one embodiment, a UE senses slots with a periodicity to determine the available candidate resources within a SL TX resource pool within a resource selection window for SL resource selection.

In another embodiment, a UE performs sensing in a short contiguous window to determine the available candidate resources within a SL TX resource pool within resource selection window for SL resource selection.

In yet another embodiment a UE both senses slots with a periodicity and performs sensing in a short contiguous window to determine the available candidate resources within a SL TX resource pool within a resource selection window for SL resource selection.

In yet another embodiment a UE performs no sensing (e.g. random resource selection), SL resources within a SL TX resource pool with a resource selection window are available for SL resource selection.

In yet another embodiment, a UE performs full sensing following the NR release 16 SL sensing procedure as described in TS 38.214, to determine the available candidate resources within a SL TX resource pool within a resource selection window for SL resource selection.

Figure 6:
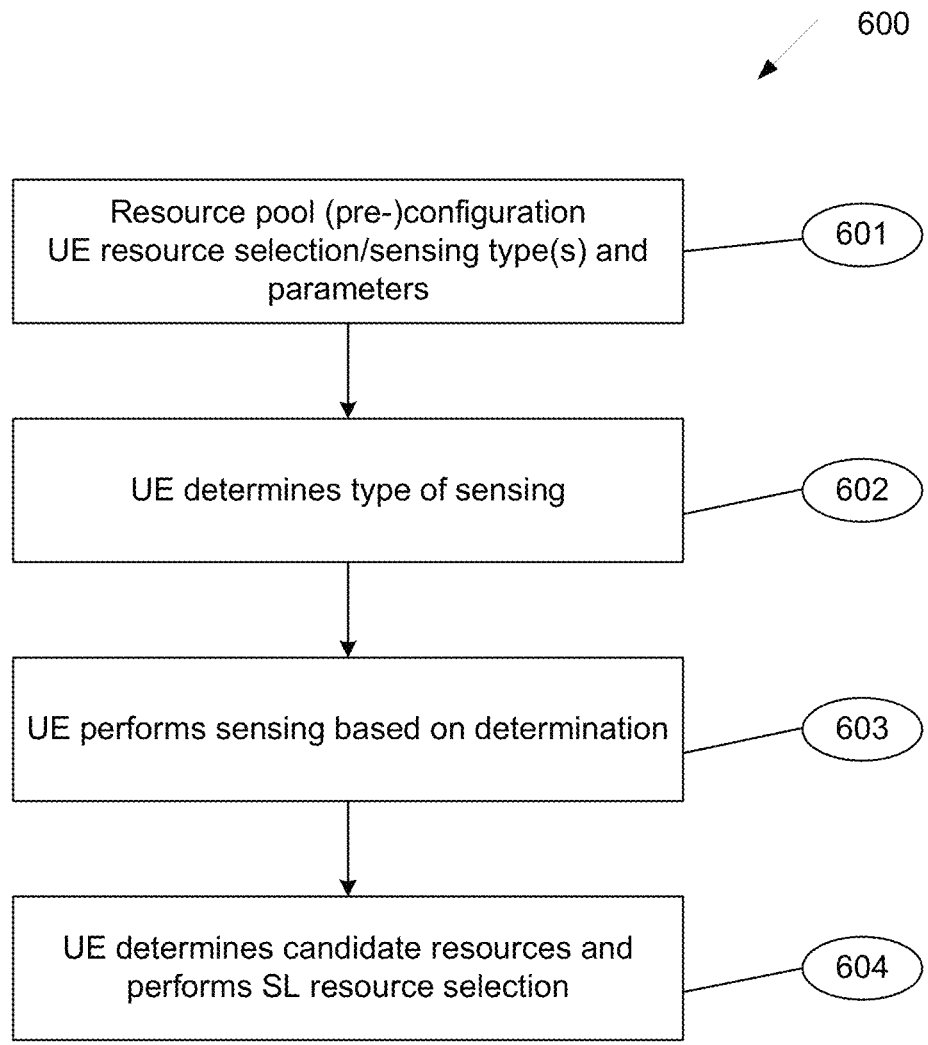
FIG. 6 illustrates an example of a UE procedure for determining the type of sensing to perform and performing sensing and resource selection according to embodiments of the present disclosure.

FIG. 6 illustrates an example of UE procedure 600 for determining the type of sensing to perform and performing sensing and resource selection according to embodiments of the present disclosure. The UE procedure 600 as may be performed by a UE (e.g., 111-116 as illustrated in FIG. 1). An embodiment of the UE procedure 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As illustrated in FIG. 6, in step 601, a UE is (pre-)configured with a resource pool, and with one or more sensing modes (e.g., full sensing, partial sensing and/or random resource selection), as well as configuration parameters related to each sensing mode. A UE maybe further (pre-)configured with other parameters related to the SL traffic the UE is expected to handle.

For example, a resource pool can be configured to either allow or not allow periodic reservations. In this disclosure, a resource pool with periodic reservations is a resource pool for which an initial transmission of a transport block can be reserved by an SCI associated with a different transport block, for example a resource pool with periodic reservations can have higher layer parameter sl-MultiReserveResource enabled. A resource pool can be configured with one or more periodic reservation periods given by higher layer parameter sl-ResourceReservationPeriodList.

One or more sensing modes can be (pre-)configured, by higher layers, along with the conditions for using each sensing mode. In this discourse, for a UE operating in power saving mode, sensing can be performed (or not performed) at least based on one of the following: (1) periodic-based partial sensing (PBPS), wherein the sensing is performed repeatedly at periodic intervals; (2) contiguous partial sensing, wherein sensing is one shot aperiodic sensing performed over a contiguous, within the transmit resource pool) short window of slots; and (3) random resource selection, wherein the identification of the candidate resources is performed with no sensing.

Additional parameters maybe further (pre-)configured for each sensing mode as described in this disclosure.

In step 602, a UE determines the type of sensing or sensing mode based on the embodiments of this disclosure. The determination can be based on the type of periodicity supported by the resource pool (periodic or aperiodic), and/or the type of SL traffic (periodic or periodic) and/or higher layer (pre-)configuration.

In step 603, a UE performs sensing based on the determination in step 402.

In step 604, a UE determines the candidate resources as a result of partial sensing (or no sensing) in step 603, and performs SL resource selection within the candidate resources.

In the following examples time can be expressed in one of following: (1) logical slots within a resource pool: (i) a logical slot index for a slot within a resource pool is denoted as $t'^{SL}_i$; and (ii) a time period expressed in logical slots within a resource pool is denoted as T'; (2) logical slots that can be in a resource pool. These are the SL slots before the application of the resource pool bitmap, as described in TS 38.214: (i) a logical slot index for a slot that can be in a resource pool is denoted as $t^{SL}_i$; and (ii) a time period expressed in logical slots that can be in a resource pool is denoted as T'. While this is the same notation as used for logical slots within a resource pool the value is different and it should be apparent from the context which value to use; and (3) physical slots or physical time: (i) a Physical slot number (or index) is denoted as n or n'. n is the physical slot number of any physical slot, while n' is the physical slot number of a slot in the resource pool; and (ii) a time period is expressed as physical time (e.g., in milliseconds (ms)) or in units of physical slots.

When used in the same equation, time units should be the same, i.e.: (1) if logical slots within a resource pool are used in an equation, inequality or expression, the time period in the same equation, inequality or expression should be expressed in units of logical slots within a resource pool; (2) if logical slots that can be in a resource pool are used in an equation, inequality or expression, the time period in the same equation, inequality or expression should be expressed in units of logical slots that can be in a resource pool; and (3) if physical slots are used in an equation, inequality or expression, the time period in the same equation, inequality or expression should be expressed in units of physical slots or physical time scaled by the slot duration.

Time units can be converted from one unit to another: (1) for example, for each logical slot index for a slot within a resource pool there is a corresponding physical slot number. The converse is not true, i.e., not every physical slot corresponds to a logical slot within a resource pool. When converting from physical slot number to logical slot index: (i) if the physical slot is in the resource pool, the corresponding logical slot index within the resource pool is determined; and (ii) if the physical slot is not in the resource pool, the index of an adjacent logical slot within the resource pool is determined, wherein one of: (a) the adjacent logical slot is the next logical slot after the physical slot; or (b) the adjacent logical slot is the pervious logical slot before the physical slot; and (2) to convert from physical time (in ms) to time in units of logical slots within a resource pool, the following equation can be used, wherein T is in units of ms and T' is in units of logical slots within a resource pool:

$$T' = \left\lceil \frac{T'_{max}}{10240 \text{ ms}} \times T \right\rceil,$$

where, $T'_{max}$ is the number of logical slots within the resource pool in 1024 frames or 10240 ms.

The slot index or the time period provided by higher layers or specified in the specifications can be given in one unit, e.g., in physical slots or in ms, and is converted to a logical slot index or units of logical slots within a resource pool before being used in the corresponding equations, or vice versa.

As described in U.S. patent application Ser. No. 17/653,105 filed Mar. 1, 2022, which is incorporated by reference herein, for a UE (pre-)configured with periodic-based partial sensing and triggered to perform resource selection/re-selection in slot n: (1) a resource selection window, $[n+T_1, n+T_2]$ is determined and/or configured; (2) Y candidate slots within the resource selection window are determined and/or configured. Wherein, candidate SL resource selection resources are within the Y candidate slots; (3) one or more periodicities, $P'_i$, are determined and/or configured. Wherein, the sensed slots for a candidate slot $t'_y{}^{SL}$ are $t'_{y-k_i \times P'_i}{}^{SL}$. Wherein, $P'_i$ can be $P'_{reserve}$; i.e., one or more of resource reservation periods of the resource pool. A $P'_{reserve}$ in logical slots within a resource pool corresponds to a $P_{reserve}$ in physical time with the physical time to logical slot conversion as previously described; and (4) one or more periodic sensing occasions $k_i$ for periodicity $P'_i$ are determined and/or configured. In one example $k_i$ can be the same across all periodicities, i.e., denoted by k. In another example, $k_i$ can depend on the candidate slot $t'_y{}^{SL}$. In this disclosure, the Y candidate slots are denoted as logical slots within a resource pool, e.g., $t'_y{}^{SL}$ or $t'_{y0}{}^{SL}$ for the first of the Y candidate slots or $t'_{yi}{}^{SL}$ for the ith of the Y candidate slots, etc. However, it should be apparent that the candidate slots can also be logical slots that can be in a resource pool and denoted as $t_y{}^{SL}$ or $t_{y0}{}^{SL}$ for the first of the Y candidate slots or $t_{yi}{}^{SL}$ for the ith of the Y candidate slots.

Figure 7:
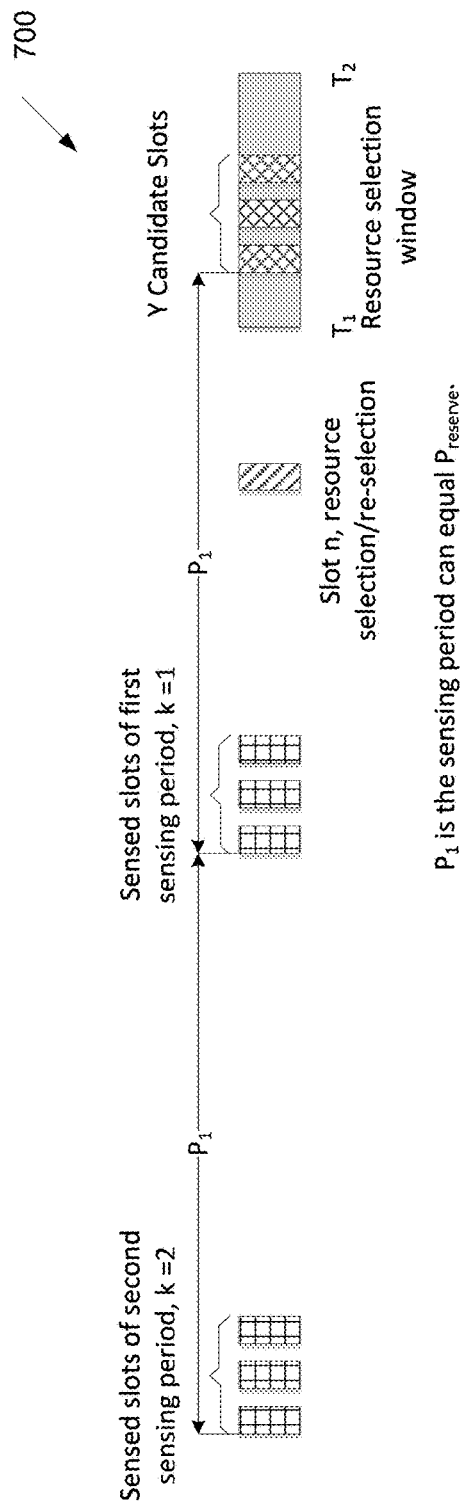

FIG. 7 illustrates an example of contiguous partial sensing operation 700 according to embodiments of the present disclosure. An embodiment of the contiguous partial sensing operation 700 shown in FIG. 7 is for illustration only.

FIG. 7 illustrates an example of periodic-based partial sensing: (i) resource selection/re-selection is triggered by higher layers in slot n; (2) the resource selection window extends between $T_1$ and $T_1$, i.e., $[T_1, T_2]$; (3) there are Y candidate slots in the resource selection window; (4) the sensing period is $P_1$, which can equal $P_{reserve}$; and (5) the periodic sensing occasions are k=1 and k=2.

For contiguous partial sensing, when a trigger for a SL transmission (resource selection/re-selection procedure) occurs in slot n, at least one of the examples of TABLE 1 for contiguous partial sensing can apply. These are described in more detail below. In TABLE 1, a sensing window refers to a contiguous partial sensing window.

When the UE performs periodic-based partial sensing and contiguous partial sensing, the UE uses a same resource selection window and a same set of Y candidate slots within the resource selection window for periodic-based partial sensing and contiguous partial sensing. The set of Y candidate slots is determined by the UE's implementation. Candidate slots are slots within which the UE may select resources for SL transmissions based on the outcome of sensing.

When the UE performs only contiguous partial sensing: (1) the UE can consider that all slots within the resource selection window are available as candidate slots; (2) the UE can select a set of Y candidate slots within the resource selection window. The set of Y candidate slots is determined by the UE's implementation; (3) the UE can select a set of Y candidate slots within the resource selection window. The first candidate slot is the first slot of the resource selection window (within the resource pool). The remaining Y candidate slots are determined by the UE's implementation; (4) the UE can select a set of Y candidate slots within the resource selection window. The Y candidate slots are contiguous within a resource pool, the UE's implementation determines the first of the Y candidate slots and the number of the Y candidate slots; and/or (5) the UE can select a set of Y candidate slots within the resource selection window. The Y candidate slots are contiguous within a resource pool. The first candidate slot is the first slot of the resource selection window (within the resource pool). The UE's implementation determines the number of the Y candidate slots.

TABLE 1

Contiguous partial sensing examples

| Initial Resource Selection | Sensing windows | FIG. |
|---|---|---|
| Slot n | Slot n is where SL transmission (resource selection/re-selection procedure) is triggered. Sensing window starting before slot n and ending before slot n for initial resource selection/re-selection. | FIG. 8 |
| Slot n | Slot n is where SL transmission (resource selection/re-selection procedure) is triggered. First sensing window starting and ending before slot n for initial resource selection/re-selection. Second sensing window(s) for re-evaluation and pre-emption of SL transmissions/would-be SL transmissions. Overlapping sensing windows can be merged. | FIG. 9 FIG. 13 |
| Slot n | Slot n is where SL transmission (resource selection/re-selection procedure) is triggered. First sensing window starting and ending before slot n for initial resource selection/re-selection. Second sensing window for re-evaluation and pre-emption of SL transmissions/would-be SL transmissions and, ending based on SL transmission with no reserved resources, ending after reception of positive HARQ-ACK for SL Tx, ending after last HARQ-ACK retransmission. | FIG. 10 FIG. 11 FIG. 12 |
| Slot n | Slot n is where SL transmission (resource selection/re-selection procedure) is triggered. First sensing window starting before slot n and ending based on first would-be SL transmission for initial resource selection/re-selection and pre-emption check of first would-be SL transmission. Second sensing window(s) for re-evaluation and pre-emption for additional SL transmissions/would-be SL transmissions. Overlapping sensing windows can be merged. | FIG. 14 |

TABLE 1-continued

Contiguous partial sensing examples

| Initial Resource Selection | Sensing windows | FIG. |
|---|---|---|
| Slot n | Slot n is where SL transmission (resource selection/re-selection procedure) is triggered. Sensing window starting before slot n and . . . ending based on SL transmission with no reserved resources, ending after reception of positive HARQ-ACK for SL Tx, ending after last HARQ-ACK retransmission. | FIG. 15 FIG. 16 FIG. 17 |
| Slot R (slot R is after slot n) | Slot n is where SL transmission (resource selection/re-selection procedure) is triggered. Slot R is where SL resource selection/re-selection and candidate resources determination/reporting to higher layers occurs. Sensing window starting based on slot n or slot R. Sensing window ending before slot R. Sensing window can start before or after slot n, in the example shown in the FIG. sensing window is staring after slot n. | FIG. 18 |
| Slot R (slot R is after slot n) | Slot n is where SL transmission (resource selection/re-selection procedure) is triggered. Slot R is where SL resource selection/re-selection and candidate resources determination/reporting to higher layers occurs. First sensing window starting based on slot n or slot R. First sensing window ending before slot R. First sensing window can start before or after slot n, in the example shown in the FIG. first sensing window is staring after slot n. Second sensing window(s) for re-evaluation and pre-emption. Overlapping sensing windows can be merged. | FIG. 19 |
| Slot R (slot R is after slot n) | Slot n is where SL transmission (resource selection/re-selection procedure) is triggered. Slot R is where SL resource selection/re-selection and candidate resources determination/reporting to higher layers occurs. First sensing window starting based on slot n or slot R. First sensing window ending before slot R. First sensing window can start before or after slot n, in the example shown in the FIG. first sensing window is staring after slot n. Second sensing window for re-evaluation and pre-emption: ending based on SL transmission with no reserved resources, ending after reception of positive HARQ-ACK for SL Tx, ending after last HARQ-ACK retransmission. | FIG. 20 FIG. 21 FIG. 22 |
| Slot R (slot R is after slot n) | Slot n is where SL transmission (resource selection/re-selection procedure) is triggered. Slot R is where SL resource selection/re-selection and candidate resources determination/reporting to higher layers occurs. Sensing window starting based on slot n or slot R. Sensing window can start before or after slot n, in the example shown in the FIG. sensing window is staring after slot n. ending based on SL transmission with no reserved resources, ending after reception of positive HARQ-ACK for SL Tx, ending after last HARQ-ACK retransmission. | FIG. 23 FIG. 24 FIG. 25 |

In one example 0.1, contiguous partial sensing occurs before slot n.

Figure 8:
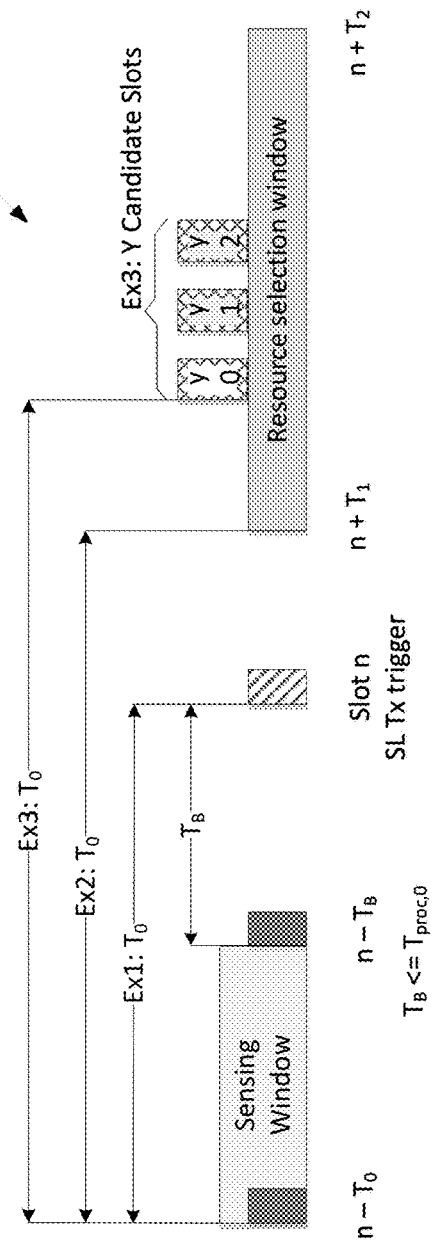

FIG. 8 illustrates another example of contiguous partial sensing operation 800 according to embodiments of the present disclosure. An embodiment of the contiguous partial sensing operation 800 shown in FIG. 8 is for illustration only.

In one example 0.1.1, as illustrated in FIG. 8, contiguous partial sensing starts in slot A, wherein $A=n-T_0$, and ends before slot $n-T_B$, i.e., the contiguous partial sensing window is in the range $[n-T_0, n-T_B)$. Alternatively, contiguous partial sensing starts in slot A, wherein $A=n-T_0$, and ends on or before slot $n-T_B$, i.e., the contiguous partial sensing window is in the range $[n-T_0, n-T_B]$. Associated with a slot n is a resource selection window that extends from $n-T_1$ to $n-T_2$.

In one example 0.1.1.1, $T_0$ is determined by the extent of aperiodic resource reservation by sidelink control information (SCI), based on at least one of the following example.

In one example 0.1.1.1.1, as in release 16, an SCI can indicate up to 2 future aperiodic reserved resources within 31 logical slots. In one example, $T_0$ corresponds to the physical duration of 31 logical slots before slot n, and slot n is the physical slot number. Alternatively, slot n corresponds to a logical slot index within a resource pool and $T_0$ is 31 logical slots within a resource pool, i.e., the sensing window starts in slot $t'_n{}^{SL}-31$, wherein $t'_n{}^{SL}$ is the logical slot index within the resource pool corresponding to slot n, if slot n is not within the resource pool $t'_n{}^{SL}$ corresponds to the next or pervious logical slot within the resource pool after or before slot n respectively. Alternatively, the sensing window starts 31 logical slots before the start of the resource selection window, i.e., the sensing window starts in slot $t'_{n1}{}^{SL}-31$, wherein $t'_{n1}{}^{SL}$ is the index of the first logical slot within the resource selection window, i.e., $n-T_0=t'_{n1}{}^{SL}-31$. Alternatively, when the UE selects Y slots within the resource selection window $\{t'_{y0}{}^{SL}, t'_{y1}{}^{SL}, \ldots\}$ (e.g., when contiguous partial sensing is combined with periodic-based partial sensing) and the slots are ordered in time, with slot $t'_{y0}{}^{SL}$ being the first in time, the sensing window starts 31 logical slots before the start of slot $t'_{y0}{}^{SL}$, i.e., the sensing window starts in slot $t'_{y0}{}^{SL}-31$, wherein $t'_{y0}{}^{SL}$ is the index of the first logical slot selected by UE, within the resource selection window, i.e., $n-T_0=t'_{y0}{}^{SL}-31$.

In another example 0.1.1.1.2, the farthest aperiodic reservation that can be indicated in an SCI is after W logical slots from the slot of the SCI, wherein W can be specified in the system specifications and/or pre-configured and/or configured and/or updated by RRC signaling and/or MAC CE signaling and/or L1 control signaling. In one example, $T_0$ corresponds to the physical duration of W logical slots before slot n, and slot n is the physical slot number. Alternatively, slot n corresponds to a logical slot index within a resource pool and $T_0$ is W logical slots within a resource pool. In one example, W can be in units of physical time (e.g., ms) or in units of physical slots. In another example, W can be in units of logical slots that can be in a resource pool. In another example, W can be in units of logical slots in a resource pool, i.e., the sensing window starts in slot $t'_n{}^{SL}-W$, wherein $t'_n{}^{SL}$ is the logical slot index within the resource pool corresponding to slot n, if slot n is not within the resource pool $t'_n{}^{SL}$ corresponds to the next or pervious logical slot within the resource pool after or before slot n respectively. Alternatively, the sensing window starts W logical slots before the start of the resource selection window, i.e., the sensing window starts in slot $t'_{n1}{}^{SL}-W$, wherein $t'_{n1}{}^{SL}$ is the index of the first logical slot within the resource selection window. Alternatively, when the UE selects Y slots within the resource selection window $\{t'_{y0}{}^{SL}, t'_{y1}{}^{SL}, \ldots\}$ (e.g., when contiguous partial sensing is combined with periodic-based partial sensing) and the slots are ordered in time, with slot $t'_{y0}{}^{SL}$ being the first in time, the sensing window starts W logical slots before the start of slot $t'_{y0}{}^{SL}$, i.e., the sensing window starts in slot $t'_{y0}{}^{SL}-W$, wherein $t'_{y0}{}^{SL}$ is the index of the first logical slot selected by UE, within the resource selection window. In one example, W can depend on a UE capability. In one example, W can depend on the sub-carrier spacing of the SL bandwidth part (e.g., of the SL channels). In another example, $T_0$ can be determined by the UE's implementation. In another example, $T_0$ can be determined by the UE's implementation subject to the above constraints, e.g., $T_0 \geq W$, wherein $T_0$ and W are converted to the same time unit, e.g., logical slots in a resource pool or physical time or physical slots.

In yet another example 0.1.1.1.3, $T_0$ is in physical time or in physical slots, wherein $T_0$ can be specified by system specifications and/or pre-configured and/or configured and/or updated by RRC signaling and/or MAC CE signaling and/or L1 control signaling.

In yet another example 0.1.1.1.4, $T_0$ is in logical slots that can be within a resource pool or in logical slots within a resource pool, wherein $T_0$ can be specified by system specifications and/or pre-configured and/or configured and/or updated by RRC signaling and/or MAC CE signaling and/or L1 control signaling.

In yet another example 0.1.1.1.5, $T_0$ depends on a UE capability.

In yet another example 0.1.1.1.6, $T_0$ depends on the sub-carrier spacing of the SL bandwidth part (e.g., of the SL channels).

In yet another example 0.1.1.1.7, time $T_0$ is determined by UE's own implementation.

In yet another example 0.1.1.1.8, time $T_0$ is configured or indicated by higher layers.

In one example 0.1.1.2, $T_{proc,0}{}^{SL}$ is latency for sensing from the end of the sensing window (or last slot be sensed) to slot n where resource selection/re-selection can occur, based on at least one of the following: (1) in one example 0.1.1.2.1, $T_B = T_{proc,0}{}^{SL}$; (2) in one example 0.1.1.2.2, $T_{proc,0}{}^{SL}$ depends on a UE capability; and (3) in another example 0.1.1.2.3, $T_{proc,0}{}^{SL}$ depends on the sub-carrier spacing of the SL bandwidth part (e.g., of the SL channels). For example, as shown in TABLE 2.

TABLE 2

Example of dependence of $T_{proc,0}{}^{SL}$ on Sub-carrier spacing. For example, $T_{proc,0}{}^{SL}$ is the sensing processing latency time. For example, $T_{proc,0}{}^{SL}$ is as described in Table 8.1.4-1 of TS 38.214.

| Sidelink Sub-carrier spacing ($\mu_{SL}$) | $T_{proc,0}{}^{SL}$ in slots |
| --- | --- |
| 15 kHz ($\mu_{SL} = 0$) | 1 |
| 30 kHz ($\mu_{SL} = 1$) | 1 |
| 60 kHz ($\mu_{SL} = 2$) | 2 |
| 120z ($\mu_{SL} = 3$) | 4 |

In another example 0.1.1.2.4, $T_{proc,0}{}^{SL}$ is specified in the system specifications and/or pre-configured and/or configured and/or updated by RRC signaling and/or MAC CE signaling and or RRC signaling.

In one example 0.1.1.2.5, $T_{proc,0}{}^{SL}$ can be in units of physical time (e.g., ms) or in units of physical slots. In another example, $T_{proc,0}{}^{SL}$ can be in units of logical slots that can be in a resource pool. In another example, $T_{proc,0}{}^{SL}$ can be in units of logical slots in a resource pool.

In another example 0.1.1.2.6, the contiguous partial sensing window ends before slot $n-T_B$, i.e., the contiguous partial sensing window is in the range $[n-T_0, n-T_B)$. Alternatively, contiguous partial sensing ends on or before slot $n-T_B$, i.e., the contiguous partial sensing window is in the range $[n-T_0, n-T_B]$. Wherein, $T_B \leq T_{proc,0}{}^{SL}$.

In one example 0.1.1.2.7, $T_B$ can be in units of physical time (e.g., ms) or in units of physical slots. In another example, $T_B$ can be in units of logical slots that can be in a resource pool. In another example, $T_B$ can be in units of logical slots in a resource pool.

In another example 0.1.1.2.8, time $T_B$ is determined by UE's own implementation.

In another example 0.1.1.2.9, time $T_B$ is configured or indicated by higher layers.

In one example, if the start of the sensing window calculated following example 0.1.1.1 is after the end of the sensing window calculated following example 0.1.1.2, there is no contiguous partial sensing.

FIG. 9 illustrates yet another example of contiguous partial sensing operation 900 according to embodiments of the present disclosure. An embodiment of the contiguous partial sensing operation 900 shown in FIG. 9 is for illustration only.

In another example 0.1.2, a first contiguous partial sensing window occurs before slot n as described in example 0.1.1 for resource selection/re-selection in slot n, and one or more second contiguous partial sensing windows occur for re-evaluation and/or pre-emption. As illustrated in the example of FIG. 9, for a first SL transmission occurring in slot m, as a result of a resource selection/re-selection in slot n, a resource re-evaluation check can occur in slot C, wherein slot C can be given as $m-T_C$ (e.g., $T_C = T_3$ as defined in release 16, where $T_3 = T_{proc,1}{}^{SL}$). A second contiguous partial sensing window can start in slot A2, and end before slot B2, i.e., the second contiguous partial sensing window is in the range [A2, B2). Alternatively, a second contiguous partial sensing window starts in slot A2, and ends on or before slot B2, i.e., the contiguous partial sensing window is in the range [A2, B2].

In one example 0.1.2.1, slot A2 can be determined by one of the following example.

In one example 0.1.2.1.1, slot A2 is determined based on slot n, e.g., slot A2 is after slot n by a time $T_{nA}$, i.e., $A2 = n + T_{nA}$, or after the last slot sensed for resource selection at slot n, wherein, $T_{nA}$ can be specified in system specifications and/or pre-configured and/or configured and/or updated by RRC signaling and/or MAC CE signaling and/or L1 control signaling. In one example, $T_{nA}$ can be in units of physical time (e.g., ms) or in units of physical slots. In another example, $T_{nA}$ can be in units of logical slots that can be in a resource pool. In another example, $T_{nA}$ can be in units of logical slots in a resource pool. In one example, $T_{nA}$ can depend on a UE capability. In one example, $T_{nA}$ can depend on the sub-carrier spacing of the SL bandwidth part (e.g., of the SL channels). In another example, $T_{nA}$ can be determined by the UE's implementation. In another example, $T_{nA}$ can be determined by the UE's implementation subject to the above constraints, e.g., not to exceed a higher layer configured threshold and/or not to exceed a value that depends on a UE capability. In one example $T_{nA} = 1$ logical slot. In one example $T_{nA} = 1$ physical slot. In another example, $T_{nA} = 0$. In one example, the start of the sensing window is after the last slot sensed for the first contiguous partial sensing window. For example, if the last slot sensed for the first contiguous partial sensing window is the slot before slot $n - T_{proc,0}{}^{SL}$, the sensing window starts in slot $n - T_{proc,0}{}^{SL}$ i.e., $T_{nA} = -T_{proc,0}{}^{SL}$. In another example, if the last slot sensed for the first contiguous partial sensing window is slot $n - T_{proc,0}{}^{SL}$, the sensing window starts in slot $n - T_{proc,0}{}^{SL} + 1$, i.e., $T_{nA} = -T_{proc,0}{}^{SL} + 1$.

In another example 0.1.2.1.2, slot A2 is determined based on slot m, e.g., slot A2 is before slot m by time $T_{Am}$, i.e., A2=m−$T_{Am}$, wherein, $T_{Am}$ can be specified in system specifications and/or pre-configured and/or configured and/or updated by RRC signaling and/or MAC CE signaling and/or L1 control signaling. In one example, $T_{Am}$ can be in units of physical time (e.g., ms) or in units of physical slots. In another example, $T_{Am}$ can be in units of logical slots that can be in a resource pool. In another example, $T_{Am}$ can be in units of logical slots in a resource pool. In one example, $T_{Am}$ can depend on a UE capability. In one example, $T_{Am}$ can depend on the sub-carrier spacing of the SL bandwidth part (e.g., of the SL channels). In one example, the farthest aperiodic reservation that can be indicated in an SCI is after W logical slots from a slot of the SCI, $T_{Am}$ corresponds to the physical duration of W logical slots before slot m. Alternatively, $T_{Am}$ is in logical slots, and is equal to W. Wherein, W can be specified in system specifications and/or pre-configured and/or configured and/or updated by RRC signaling and/or MAC CE signaling and/or L1 control signaling. In one example, W can be in units of physical time (e.g., ms) or in units of physical slots. In another example, W can be in units of logical slots that can be in a resource pool. In another example, W can be in units of logical slots in a resource pool. In one example, W can depend on a UE capability. In one example, W can depend on the sub-carrier spacing of the SL bandwidth part (e.g., of the SL channels). In one example, W is 31 logical slots. In another example, $T_{Am}$ can be determined by the UE's implementation. In another example, $T_{Am}$ can be determined by the UE's implementation subject to the above constraints, e.g., $T_{Am} \geq W$, wherein $T_{Am}$ and W are converted to the same time unit, e.g., logical slots in a resource pool or physical time or physical slots.

In another example 0.1.2.1.3, slot A2 is the furthest in time of $n+T_{nA}$ and $m-T_{Am}$. i.e., $A2=\max(n+T_{nA}, m-T_{Am})$. Wherein, $T_{nA}$ and $T_{Am}$ follow from example 0.1.2.1.1 and example 0.1.2.1.2. In one example, $n+T_{nA}=n-T_{proc,0}^{SL}$ and $m-T_{Am}=m-31$, hence $A2=\max(n-T_{proc,0}, m-31)$. In another example, $n+T_{nA}=n-T_{proc,0}^{SL}+1$ and $m-T_{Am}=m-31$, hence $A2=\max(n-T_{proc,0}^{SL}+1, m-31)$.

In another example 0.1.2.1.4, slot A2 is the earliest in time of $n+T_{nA}$ and $m-T_{Am}$. i.e., $A2=\min(n+T_{nA}, m-T_{Am})$. Wherein, $T_{nA}$ and $T_{Am}$ follow from example 0.1.2.1.1 and example 0.1.2.1.2. In one example, $n+T_{nA}=n-T_{proc,0}^{SL}$ and $m-T_{Am}=m-31$, hence $A2=\min(n-T_{proc,0}^{SL}, m-31)$. In another example, $n+T_{nA}=n-T_{proc,0}^{SL}+1$ and $m-T_{Am}=m-31$, hence $A2=\min(n-T_{proc,0}^{SL}+1, m-31)$.

In another example 0.1.2.1.5, slot A2 is a function of $n+T_{nA}$ and $m-T_{Am}$. i.e., $A2=f(n+T_{nA}, m-T_{Am})$. Wherein, $T_{nA}$ and $T_{Am}$ follow from example 0.1.2.1.1 and example 0.1.2.1.2. In one example, $n+T_{nA}=n-T_{proc,0}^{SL}$ and $m-T_{Am}=m-31$, hence $A2=f(n-T_{proc,0}^{SL}, m-31)$. In another example, $n+T_{nA}=n-T_{proc,0}^{SL}+1$ and $m-T_{Am}=m-31$, hence $A2=f(n-T_{proc,0}^{SL}+1, m-31)$.

In another example 0.1.2.1.6, slot A2 is determined based on slot C, e.g., slot A2 is before slot C by time $T_{AC}$, i.e., $A2=C-T_{AC}$, wherein, $T_{AC}$ can be specified in system specifications and/or pre-configured and/or configured and/or updated by RRC signaling and/or MAC CE signaling and/or L1 control signaling. In one example, $T_{AC}$ can be in units of physical time (e.g., ms) or in units of physical slots. In another example, $T_{AC}$ can be in units of logical slots that can be in a resource pool. In another example, $T_{AC}$ can be in units of logical slots in a resource pool. In one example, $T_{AC}$ can depend on a UE capability. In one example, $T_{AC}$ can depend on the sub-carrier spacing of the SL bandwidth part (e.g., of the SL channels). In one example, the farthest aperiodic reservation that can be indicated in an SCI is after W logical slots from a slot of the SCI, $T_{AC}$ corresponds to the physical duration of W logical slots before slot C. Alternatively, $T_{AC}$ is in logical slots, and is equal to W. Wherein, W can be specified in system specifications and/or pre-configured and/or configured and/or updated by RRC signaling and/or MAC CE signaling and/or L1 control signaling. In one example, W can be in units of physical time (e.g., ms) or in units of physical slots. In another example, W can be in units of logical slots that can be in a resource pool. In another example, W can be in units of logical slots in a resource pool. In one example, W is 31 logical slots. In one example, W can depend on a UE capability. In one example, W can depend on the sub-carrier spacing of the SL bandwidth part (e.g., of the SL channels). In another example, $T_{AC}$ can be determined by the UE's implementation. In another example, $T_{AC}$ can be determined by the UE's implementation subject to the above constraints, e.g., $T_{AC} \geq W$, wherein $T_{AC}$ and W are converted to the same time unit, e.g., logical slots in a resource pool or physical time or physical slots.

In another example 0.1.2.1.7, slot A2 is the furthest in time of $n+T_{nA}$ and $C-T_{AC}$ i.e., $A2=\max(n+T_{nA}, C-T_{AC})$. Wherein, $T_{nA}$ and $T_{AC}$ follow from example 0.1.2.1.1 and example 0.1.2.1.6.

In another example 0.1.2.1.8, slot A2 is the earliest in time of $n+T_{nA}$ and $C-T_{AC}$. i.e., $A2=\min(n+T_{nA}, C-T_{AC})$. Wherein, $T_{nA}$ and $T_{AC}$ follow from example 0.1.2.1.1 and example 0.1.2.1.6.

In another example 0.1.2.1.9, slot A2 is a function of $n+T_{nA}$ and $C-T_{AC}$. i.e., $A2=f(n+T_{nA}, C-T_{AC})$. Wherein, $T_{nA}$ and $T_{AC}$ follow from example 0.1.2.1.1 and example 0.1.2.1.6.

In another example 0.1.2.1.10, slot A2 is determined by UE's own implementation.

In another example 0.1.2.1.11, slot A2 is configured or indicated by higher layers.

In one example 0.1.2.2, slot B2 can be determined by one of the following example.

In one example 0.1.2.2.1, slot B2 is determined based on slot m, e.g., slot B2 is before slot m by time $T_{Bm}$, i.e., $B2=m-T_{Bm}$, wherein, $T_{Bm}$ can be specified in system specifications and/or pre-configured and/or configured and/or updated by RRC signaling and/or MAC CE signaling and/or L1 control signaling. In one example, $T_{Bm}$ can be in units of physical time (e.g., ms) or in units of physical slots. In another example, $T_{Bm}$ can be in units of logical slots that can be in a resource pool. In another example, $T_{Bm}$ can be in units of logical slots in a resource pool. In one example, $T_{Bm}$ can depend on a UE capability. In one example, $T_{Bm}$ can depend on the sub-carrier spacing of the SL bandwidth part (e.g., of the SL channels). In another example, $T_{Bm}$ can be determined by the UE's implementation. In another example, $T_{Bm}$ can be determined by the UE's implementation subject to the above constraints, e.g., not to exceed a higher layer configured threshold and/or not to exceed a value that depends on a UE capability.

In another example 0.1.2.2.2, slot B2 is determined based on slot m, e.g., slot B2 is before slot m by time $T_{Bm}$, i.e., $B2=m-T_{Bm}$, wherein, $T_{Bm} \leq T_{proc,0}^{SL}+T_{proc,1}^{SL}$ or $T_{Bm}=T_{proc,0}^{SL}+T_{proc,1}^{SL}$ or $T_{Bm}<T_{proc,0}^{SL}+T_{proc,1}^{SL}$, alternatively, $T_{Bm} \leq T_{proc,0}^{SL}+T_{proc,1}^{SL}+K$, wherein K is an additional latency. Wherein, $T_{proc,0}^{SL}$ is latency for sensing from the end of the sensing window last slot be sensed to the slot where re-evaluation check occurs, $T_{proc,1}^{SL}$ is latency between the slot where re-evaluation check occurs and slot m. In one example, the time between the slot of the re-evaluation check and slot m (where the SL transmission would take place) is denoted as $T_3$, wherein $T_3$ replaces $T_{proc,1}^{SL}$ in this example. In one example, $T_{proc,0}^{SL}$ and/or $T_{proc,1}^{SL}$ and/or K can depend on a UE capability. In one example, $T_{proc,0}^{SL}$ and/or $T_{proc,1}^{SL}$ and/or K can depend on the sub-carrier spacing of the SL bandwidth part (e.g., of the SL channels). In another example $T_{proc,0}^{SL}$ and/or $T_{proc,1}^{SL}$ and/or K can be specified in system specifications and/or pre-configured and/or configured and/or updated by RRC signaling and/or MAC CE signaling and/or L1 control signaling. In one example, $T_{proc,0}^{SL}$ and/or $T_{proc,1}^{SL}$ and/or K can be in units of physical time (e.g., ms) or in units of physical slots. In another example, $T_{proc,0}^{SL}$ and/or $T_{proc,1}^{SL}$ and/or K can be in units of logical slots that can be in a resource pool. In another example, $T_{proc,0}^{SL}$ and/or $T_{proc,1}^{SL}$ and/or K can be in units of logical slots in a resource pool. In one example, $T_{proc,0}^{SL}$ and/or $T_{proc,1}^{SL}$ can be the same as the corresponding parameters of re-evaluation check for full sensing. In another example, $T_{proc,0}^{SL}$ and/or $T_{proc,1}^{SL}$ can be separate parameters from those of re-evaluation check for full sensing. In another example, $T_{Bm}$ can be determined by the UE's implementation. In another example, $T_{Bm}$ can be determined by the UE's implementation subject to the above constraints, e.g., $T_{Bm} \leq T_{proc,0}^{SL} + T_{proc,1}^{SL}$ or $T_{Bm} = T_{proc,0}^{SL} + T_{proc,1}^{SL}$ or $T_{Bm} < T_{proc,0}^{SL} + T_{proc,1}^{SL}$ or $T_{Bm} \leq T_{proc,0}^{SL} + T_{proc,1}^{SL} + K$. Wherein, $T_{Bm}$, $T_{proc,0}^{SL}$, $T_{proc,1}^{SL}$ and K are converted to the same time unit, e.g., logical slots in a resource pool or physical time or physical slots. $T_{proc,0}^{SL}$ depends on sub-carrier spacing is as illustrated in TABLE 2. $T_{proc,1}^{SL}$ depends on sub-carrier spacing is as illustrated in TABLE 3.

TABLE 3

Example of dependence of $T_{proc,1}^{SL}$ on Sub-carrier spacing. For example, $T_{proc,1}^{SL}$ is the resource selection processing time. For example, $T_{proc,1}^{SL}$ is as described in Table 8.1.4-2 of TS 38.214.

| Sidelink Sub-carrier spacing ($\mu_{SL}$) | $T_{proc,1}^{SL}$ in slots |
|---|---|
| 15 kHz ($\mu_{SL}$ = 0) | 3 |
| 30 kHz ($\mu_{SL}$ = 1) | 5 |
| 60 kHz ($\mu_{SL}$ = 2) | 9 |
| 120 kHz ($\mu_{SL}$ = 3) | 17 |

In one example 0.1.2.2.3, slot B2 is determined based on slot C, e.g., slot B2 is before slot C by time $T_{BC}$, i.e., B2=C−$T_{BC}$, wherein, $T_{BC}$ can be specified in system specifications and/or pre-configured and/or configured and/or updated by RRC signaling and/or MAC CE signaling and/or L1 control signaling. In one example, $T_{BC}$ can be in units of physical time (e.g., ms) or in units of physical slots. In another example, $T_{BC}$ can be in units of logical slots that can be in a resource pool. In another example, $T_{BC}$ can be in units of logical slots in a resource pool. In one example, $T_{BC}$ can depend on a UE capability. In one example, $T_{BC}$ can depend on the sub-carrier spacing of the SL bandwidth part (e.g., of the SL channels). In another example, $T_{BC}$ can be determined by the UE's implementation. In another example, $T_{BC}$ can be determined by the UE's implementation subject to the above constraints, e.g., not to exceed a higher layer configured threshold and/or not to exceed a value that depends on a UE capability.

In one example 0.1.2.2.4, slot B2 is determined based on slot C, e.g., slot B2 is before slot C by time $T_{BS}$, i.e., B2=C−$T_{BC}$, wherein, $T_{BC}=T_{proc,0}^{SL}$. Wherein, $T_{proc,0}^{SL}$ is latency for sensing from the end of the sensing window last slot be sensed to the slot where re-evaluation check occurs, e.g., slot C. In one example, $T_{proc,0}^{SL}$ can depend on a UE capability. In one example, $T_{proc,0}^{SL}$ can depend on the sub-carrier spacing of the SL bandwidth part (e.g., of the SL channels). In another example, $T_{proc,0}^{SL}$ can be specified in system specifications and/or pre-configured and/or configured and/or updated by RRC signaling and/or MAC CE signaling and/or L1 control signaling. In one example, $T_{proc,0}^{SL}$ can be in units of physical time (e.g., ms) or in units of physical slots. In another example, $T_{proc,0}^{SL}$ can be in units of logical slots that can be in a resource pool. In another example, $T_{proc,0}^{SL}$ can be in units of logical slots in a resource pool. In one example, $T_{proc,0}^{SL}$ can be the same as the corresponding parameters of re-evaluation check for full sensing. In another example, $T_{proc,0}^{SL}$ can be a separate parameter from that of re-evaluation check for full sensing. In another example, $T_{BC}$ can be determined by the UE's implementation. In another example, $T_{BC}$ can be determined by the UE's implementation subject to the above constraints, e.g., $T_{BC} \leq T_{proc,0}^{SL}$. Wherein, $T_{BC}$, and $T_{proc,0}^{SL}$ are converted to the same time unit, e.g., logical slots in a resource pool or physical time or physical slots. $T_{proc,0}^{SL}$ depends on sub carrier spacing is as illustrated in TABLE 2.

In one example 0.1.2.2.5, slot B2 is determined based on slot n, e.g., slot B2 is after slot n by a time $T_{nB}$, i.e., B2=n+$T_{nB}$, wherein, $T_{nB}$ can be specified in system specifications and/or pre-configured and/or configured and/or updated by RRC signaling and/or MAC CE signaling and/or L1 control signaling. In one example, $T_{nB}$ can be in units of physical time (e.g., ms) or in units of physical slots. In another example, $T_{nB}$ can be in units of logical slots that can be in a resource pool. In another example, $T_{nB}$ can be in units of logical slots in a resource pool. In one example, $T_{nB}$ can depend on a UE capability. In one example, $T_{nB}$ can depend on the sub-carrier spacing of the SL bandwidth part (e.g., of the SL channels). In another example, $T_{nB}$ can be determined by the UE's implementation. In another example, $T_{nB}$ can be determined by the UE's implementation subject to the above constraints, e.g., not to be less than a higher layer configured threshold and/or not to be less than a value that depends on a UE capability.

In another example 0.1.2.2.6, slot B2 is determined by UE's own implementation.

In another example 0.1.2.2.7, slot B2 is configured or indicated by higher layers.

In one example 0.1.2.3, slot C can be the slot where the re-evaluation check takes place, slot C can be determined by one of the following examples.

In one example 0.1.2.3.1, slot C is determined based on slot m, e.g., slot C is before slot m by time $T_{Cm}$, i.e., C=m−$T_{Cm}$, wherein, $T_{Cm}$ can be specified in system specifications and/or pre-configured and/or configured and/or updated by RRC signaling and/or MAC CE signaling and/or L1 control signaling. In one example, the time between the slot of the re-evaluation check and slot m (where the SL transmission would take place) is denoted as $T_3$, i.e., $T_{Cm}=T_3$. In one example, $T_{Cm}$ can be in units of physical time (e.g., ms) or in units of physical slots. In another example, $T_{Cm}$ can be in units of logical slots that can be in a resource pool. In another example, $T_{Cm}$ can be in units of logical slots in a resource pool. In one example, $T_{Cm}$ can depend on a UE capability. In one example, $T_{Cm}$ can depend on the sub-carrier spacing of the SL bandwidth part (e.g., of the SL channels). In another example, $T_{Cm}$ can be determined by the UE's implementation. In another example, $T_{Cm}$ can be determined by the UE's implementation subject to the above constraints, e.g., not to exceed a higher layer configured threshold and/or not to exceed a value that depends on a UE capability. In another example, there is more than one re-evaluation check slot C determined by the UE's implementation. In another example, there is more than one re-evaluation check slot C determined by the UE's implementation, with one of the slots determined by $T_{Cm}$ as specified in system specifications/pre-configured/configured and/or determined by the UE's capability.

In one example 0.1.2.3.2, slot C is determined based on slot m, e.g., slot C is before slot m by time $T_{Cm}$, i.e., $C=m-T_{Cm}$, wherein, $T_{Cm}=T_{proc,1}^{SL}$ Wherein, $T_{proc,1}^{SL}$ is latency between the slot where re-evaluation check occurs and slot m. In one example, $T_{proc,1}^{SL}$ can depend on a UE capability. In one example, $T_{proc,1}^{SL}$ can depend on the sub-carrier spacing of the SL bandwidth part (e.g., of the SL channels). In another example $T_{proc,1}^{SL}$ can be specified in system specifications and/or pre-configured and/or configured and/or updated by RRC signaling and/or MAC CE signaling and/or L1 control signaling. In one example, $T_{proc,1}^{SL}$ can be in units of physical time (e.g., ms) or in units of physical slots. In another example, $T_{proc,1}^{SL}$ can be in units of logical slots that can be in a resource pool. In another example, $T_{proc,1}^{SL}$ can be in units of logical slots in a resource pool. In one example, $T_{proc,1}^{SL}$ can be the same as the corresponding parameters of re-evaluation check for full sensing. In another example, $T_{proc,1}^{SL}$ can be separate parameters from those of re-evaluation check for full sensing. In another example, $T_{Cm}$ can be determined by the UE's implementation. In another example, $T_{Cm}$ can be determined by the UE's implementation subject to the above constraints, e.g., $T_{Cm} \leq T_{proc,1}^{SL}$. Wherein, $T_{Cm}$, and $T_{proc,1}^{SL}$ are converted to the same time unit, e.g., logical slots in a resource pool or physical time or physical slots. In another example, there is more than one re-evaluation check slot C determined by the UE's implementation, with one of the slots determined by $T_{Cm}$ subject to the above constraints, e.g., nearest slot satisfying $T_{Cm} \leq T_{proc,1}^{SL}$ or nearest slot satisfying $T_{Cm} \geq T_{proc,1}^{SL}$. $T_{proc,1}^{SL}$ depends on sub-carrier spacing is as illustrated in TABLE 3.

In one example 0.1.2.3.3, slot C is determined based on slot n, e.g., slot C is after slot n by a time $T_{nC}$, i.e., $C=n+T_{nC}$, wherein, $T_{nC}$ can be specified in system specifications and/or pre-configured and/or configured and/or updated by RRC signaling and/or MAC CE signaling and/or L1 control signaling. In one example, $T_{nC}$ can be in units of physical time (e.g., ms) or in units of physical slots. In another example, $T_{nC}$ can be in units of logical slots that can be in a resource pool. In another example, $T_{nC}$ can be in units of logical slots in a resource pool. In one example, $T_{nC}$ can depend on a UE capability. In one example, $T_{nC}$ can depend on the sub-carrier spacing of the SL bandwidth part (e.g., of the SL channels). In another example, $T_{nC}$ can be determined by the UE's implementation. In another example, $T_{nC}$ can be determined by the UE's implementation subject to the above constraints, e.g., not to exceed a higher layer configured threshold and/or not to exceed a value that depends on a UE capability.

In another example 0.1.2.3.4, slot C is determined by UE's own implementation.

In another example 0.1.2.3.5, slot C is configured or indicated by higher layers.

In another example 0.1.2.4, a second contiguous partial sensing window starting in slot A2, continues until slot B2 with no further (re-)transmissions that have been previously reserved. A UE performing resource selection/re-selection in a slot selects one or more SL resources for future (re-)transmissions. Before transmission on a SL resource a UE performs re-evaluation check for SL resources to be signaled or used in the SL transmission that have been previously selected, but not yet signaled in a previous SL transmission, if any of the SL resources to be used or signaled is not available, a new resource selection/re-selection procedure is performed. Before transmission on a SL resource a UE performs pre-emption check for SL resources to be signaled or used in the SL transmission that have been previously signaled (e.g., reserved) in a previous SL transmission, if any of the SL resources to be used or signaled is pre-empted, a new resource selection/re-selection procedure is performed on the pre-empted resources. After the initial resource selection for a SL resource that has not been previously signaled a second contiguous partial sensing window starts in slot A2. Wherein, slot A2 is determined as described in example 0.1.2.1 based on one or more of the following: (1) slot n, where the SL transmission (resource selection/re-selection) is triggered by higher layers and initial resource selection occurs; (2) slot $m_1$, where the first would-be SL transmission can occur (in one example $m_1$ is $t'_{y,0}^{SL}$ first of the Y candidate slots); and/or (3) slot $C_1$, where the re-evaluation check for the first would-be SL transmission can occur.

The second contiguous partial sensing window continues until slot B2 determined by one of the following example.

In one example, no more SL resources can be selected because of the end of the resource selection window and/or the packet delay budget would-be exceeded.

FIG. 10 illustrates yet another example of contiguous partial sensing operation 1000 according to embodiments of the present disclosure. An embodiment of the contiguous partial sensing operation 1000 shown in FIG. 10 is for illustration only.

In one example, the transmission of a SL resource with no additional reserved resources. This is illustrated in FIG. 10. The second sensing window starts before slot $m_1$ of the first would-be SL transmission and until before slot $m_x$ of the last SL transmission with no reserved resources. If the transmission of a SL resources with no additional reserved resources is in slot $m_x$, and the re-evaluation or pre-emption check of the corresponding resource is in slot $C_x$, the sensing window ends in slot B2. Wherein, slot B2 can be determined following the example/sub-examples of example 0.1.2.2, and slot C, can be determined following the example/sub-examples of example 0.1.2.3.

In one example 0.1.2.4.1, a SL (re-)transmission in slot $m_x$, with no additional reserved resource can happen when the SL (re-)transmission in slot $m_x$ reaches the maximum number of re-transmissions.

In another example 0.1.2.4.2, a SL (re-)transmission in slot $m_x$, with no additional reserved resource can happen when the SL (re-)transmission in slot $m_x$ reaches the maximum number of re-transmissions, and there no new transmission to reserve resources for.

In another example 0.1.2.4.3, a SL (re-)transmission in slot $m_x$, with no additional reserved resource can happen when there are no available resources in the resource selection window to reserve for a future SL transmission.

In another example 0.1.2.4.4, a SL (re-)transmission in slot $m_x$, with no additional reserved resource can happen when there are no available resources within the packet delay budget to reserve for a future SL transmission.

Figure 11:
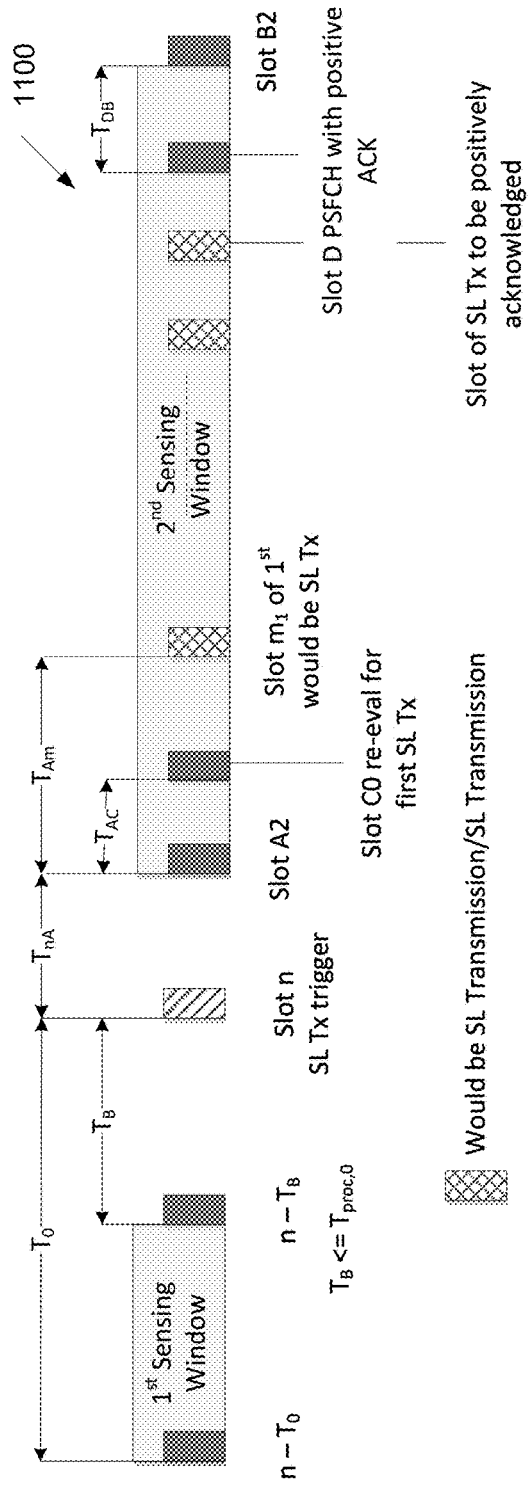

FIG. 11 illustrates yet another example of contiguous partial sensing operation 1100 according to embodiments of the present disclosure. An embodiment of the contiguous partial sensing operation 1100 shown in FIG. 11 is for illustration only.

In one example, a SL transmission is positively acknowledged. The sensing window ends after the reception of the positive acknowledgement. This is illustrated in FIG. 11. In this example, the slot of the PSFCH resource that can indicate, implicitly or explicitly a positive acknowledgment is slot D. The sensing window ends in slot B2, wherein, B2=D+$T_{DB}$, wherein, $T_{DB}$ can be specified in system specifications and/or pre-configured and/or configured and/or updated by RRC signaling and/or MAC CE signaling and/or L1 control signaling. In one example, $T_{DB}$ can be in units of physical time (e.g., ms) or in units of physical slots. In another example, $T_{DB}$ can be in units of logical slots that can be in a resource pool. In another example, $T_{DB}$ can be in units of logical slots in a resource pool. In one example, $T_{DB}$ can depend on a UE capability. In one example, $T_{DB}$ can depend on the sub-carrier spacing of the SL bandwidth part (e.g., of the SL channels). In another example, $T_{DB}$ can be determined by the UE's implementation. In another example, $T_{DB}$ can be determined by the UE's implementation subject to the above constraints, e.g., not to exceed a higher layer configured threshold and/or not to exceed a value that depends on a UE capability. In another example, $T_{DB}$ can be determined by the UE's implementation subject to the above constraints, e.g., not to be less than a higher layer configured threshold and/or not to be less than a value that depends on a UE capability. In one alternative, sensing ends after a UE receives an indication (implicit or explicit) of the successful reception of the pervious (re-) transmission. In a second alternative, sensing ends after a UE receives an indication (implicit or explicit) of the successful reception of the pervious (re-)transmission and there are no new SL transmissions, i.e., last packet in a sequence of packets.

Figure 12:
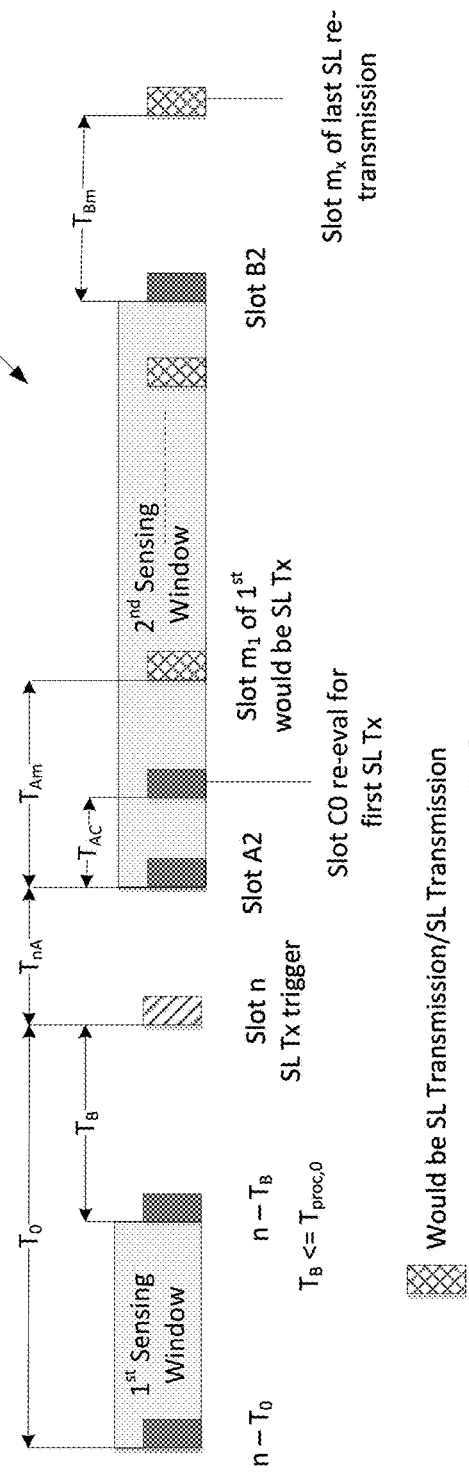

FIG. 12 illustrates yet another example of contiguous partial sensing operation 1200 according to embodiments of the present disclosure. An embodiment of the contiguous partial sensing operation 1200 shown in FIG. 12 is for illustration only.

In one example, a SL transmission with or without HARQ-ACK feedback, has a maximum number of re-transmissions. The sensing window ends before the last HARQ re-transmission. This is illustrated in FIG. 12. In this example, the slot of the last HARQ re-transmission is slot $m_x$. The sensing window ends in slot B2, wherein, B2=$m_x$-$T_{Bm}$, wherein, $T_{Bm}$ can be specified in system specifications and/or pre-configured and/or configured and/or updated by RRC signaling and/or MAC CE signaling and/or L1 control signaling. Slot B2 is before the slot of the re-evaluation check or pre-emption check of the last HARQ re-transmission, $T_{Bm}$ can be determined in part based on $T_{proc,0}^{SL}$. In one example, $T_{Bm}$ can be in units of physical time (e.g., ms) or in units of physical slots. In another example, $T_{Bm}$ can be in units of logical slots that can be in a resource pool. In another example, $T_{Bm}$ can be in units of logical slots in a resource pool. In one example, $T_{Bm}$ can depend on a UE capability. In one example, $T_{Bm}$ can depend on the sub-carrier spacing of the SL bandwidth part (e.g., of the SL channels). In another example, $T_{Bm}$ can be determined by the UE's implementation. In another example, $T_{Bm}$ can be determined by the UE's implementation subject to the above constraints, e.g., not to exceed a higher layer configured threshold and/or not to exceed a value that depends on a UE capability. In another example, $T_{Bm}$ can be determined by the UE's implementation subject to the above constraints, e.g., not to be less than a higher layer configured threshold and/or not to be less than a value that depends on a UE capability. In one alternative, sensing ends before a UE transmits the last HARQ re-transmission. In a second alternative, sensing ends before a UE transmits the last HARQ re-transmission and there are no new SL transmissions, i.e., last packet in a sequence of packets.

In another example 0.1.2.5, a second contiguous partial sensing window occur before slot m for each SL transmission or would-be SL transmission in a slot m. A slot C can be associated with each SL transmission or would-be SL transmission in a slot m, wherein a slot C can be the slot of a re-evaluation check or pre-emption check for a SL transmission in slot m. Slot C can be determined following the example/sub-examples of example 0.1.2.3. The second contiguous partial sensing window can start in slot A2 and end in slot B2. Wherein, slot A2 can be determined following the example/sub-examples of example 0.1.2.1, and slot B2 can be determined following the example/sub-examples of example 0.1.2.2 for each SL transmission or would-be SL transmission in a slot m and corresponding re-evaluation or pre-emption slot C. In one example, the more than one second contiguous partial sensing window can partially overlap, wherein a group overlapping windows are merged into a second contiguous partial sensing window starting at the earliest starting time of a second contiguous partial sensing window in the group of overlapping second contiguous partial sensing windows, and ending at the latest ending time of a second contiguous partial sensing window in the group of overlapping second contiguous partial sensing windows.

Figure 13:
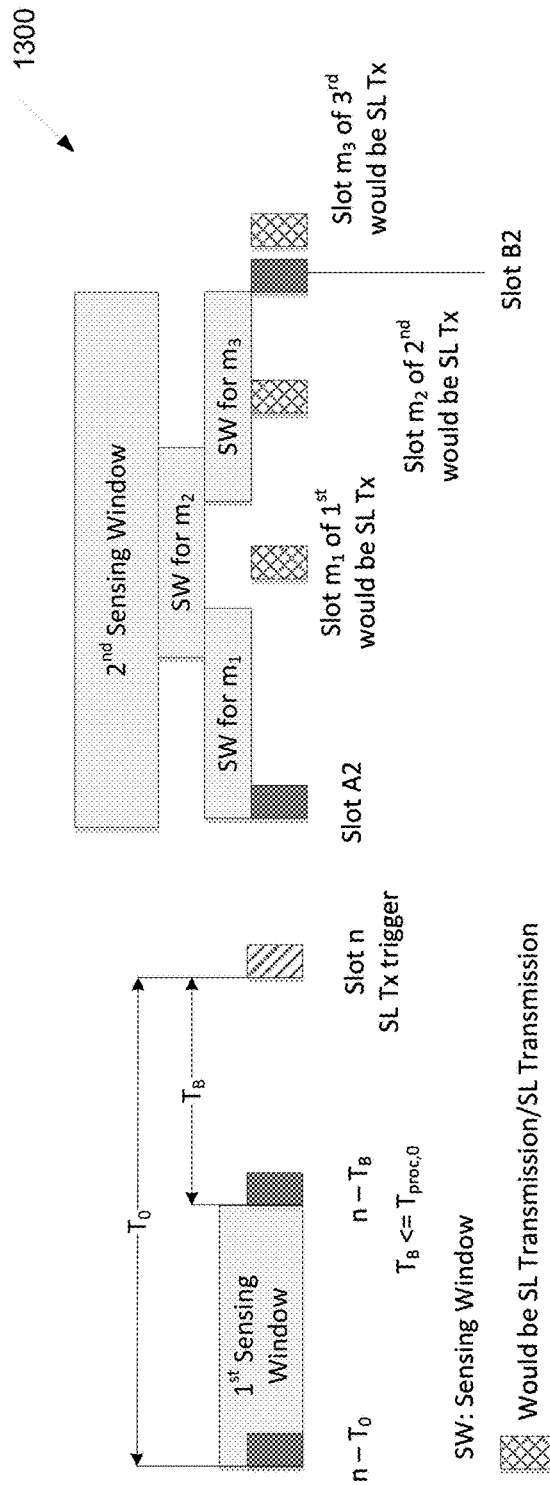

FIG. 13 illustrates yet another example of contiguous partial sensing operation 1300 according to embodiments of the present disclosure. An embodiment of the contiguous partial sensing operation 1300 shown in FIG. 13 is for illustration only.

This is illustrated by way of example in FIG. 13. In FIG. 13, there are 3 slots for SL transmission or would-be SL transmission in slots $m_1$, $m_2$ and $m_3$, a contiguous partial sensing window is determined for each slot $m_x$ (in this example x=1, 2, 3 as described above and illustrated by way of example in FIG. 13. The sensing windows overlap, and hence are merged into one contiguous partial sensing window as illustrated in FIG. 13, starting in slot A2 of the earliest start of an overlapping contiguous partial sensing window and ending at or before slot B2 of the latest end of an overlapping contiguous partial sensing window. It is also possible the windows don't overlap, or some overlap and some don't overlap.

In another example 0.1.2.6, consider a SL transmission would occur in slot $m_i$ and in slot $m_{i+1}$ with no other SL transmission occurring between slots $m_i$ and $m_{i+1}$. The sensing window for re-evaluation/pre-emption check for a transmission in slot $m_i$, extends between slots $A_i$ and $B_i$, i.e., [$A_i$, $B_i$] or [$A_i$, $B_i$). The sensing window for re-evaluation/pre-emption check for a transmission in slot $m_{i+1}$, extends between slots $A_{i+1}$ and $B_{i+1}$, i.e., [$A_{i+1}$, $B_{i+1}$] or [$A_{i+1}$, $B_{i+1}$). In one example, if the sensing window is [$A_i$, $B_i$] and [$A_{i+1}$, $B_{i+1}$], $A_{i+1}$>$B_i$. In another example, if the sensing window is [$A_i$, $B_i$) and [$A_{i+1}$, $B_{i+1}$), $A_{i+1}$≥$B_i$. In one example, if $m_{i+1}$ is determined before the re-evaluation/pre-emption check of $m_i$, according to 0.1.2.2.2, $B_i$=$m_i$-$T_{proc,0}^{SL}$-$T_{proc,1}^{SL}$, and $A_{i+1}$ starts 31 logical slots before $m_{i+1}$, hence $A_{i+1}$=max ($B_i$+1, $m_{i+1}$-31) (i.e., max ($m_i$-$T_{proc,0}^{SL}$-$T_{proc,1}^{SL}$+1, $m_{i+1}$-31)), or $A_{i+1}$=max ($B_i$, $m_{i+1}$-31) (i.e., max ($m_i$-$T_{proc,0}^{SL}$-$T_{proc,1}^{SL}$, $m_{i+1}$-31)). In another example, $m_{i+1}$ is determined during the re-evaluation/pre-emption check of slot $m_i$, the sensing window for $m_{i+1}$ can only start in the slot after the slot for which the re-evaluation/pre-emption check for slot $m_i$ has occurred, i.e., slot $m_i$-$T_{proc,1}^{SL}$ (or $m_i$-$T_3$), therefore $A_{i+1}$=max ($m_i$-$T_{proc,1}^{SL}$+1, $m_{i+1}$-31) or $A_{i+1}$=max ($m_i$-$T_{proc,1}^{SL}$, $m_{i+1}$-31).

In one example 0.2, contiguous partial sensing starts before slot n and ends after slot n or ends on or after slot n.

In one example 0.2.1, contiguous partial sensing starts in slot A, wherein $A=n-T_0$ or $t'_{n1}{}^{SL}-31$ or $t'_{y0}{}^{SL}-31$, and ends before slot B, i.e., the contiguous partial sensing window is in the range [A, B). Alternatively, contiguous partial sensing starts in slot A, wherein $A=n-T_0$ or $t'_{n1}{}^{SL}-31$ or $t'_{y0}{}^{SL}-31$, and ends on or before slot B, i.e., the contiguous partial sensing window is in the range [A, B]. In this example, the contiguous partial sensing window ends before the slot of the first SL transmission.

In one example 0.2.1.1, $n-T_0$ (e.g., $t'_{n1}{}^{SL}-31$ or $t'_{y0}{}^{SL}-31$) is determined is determined following the example/sub-examples of example 0.1.1.1.

Figure 14:
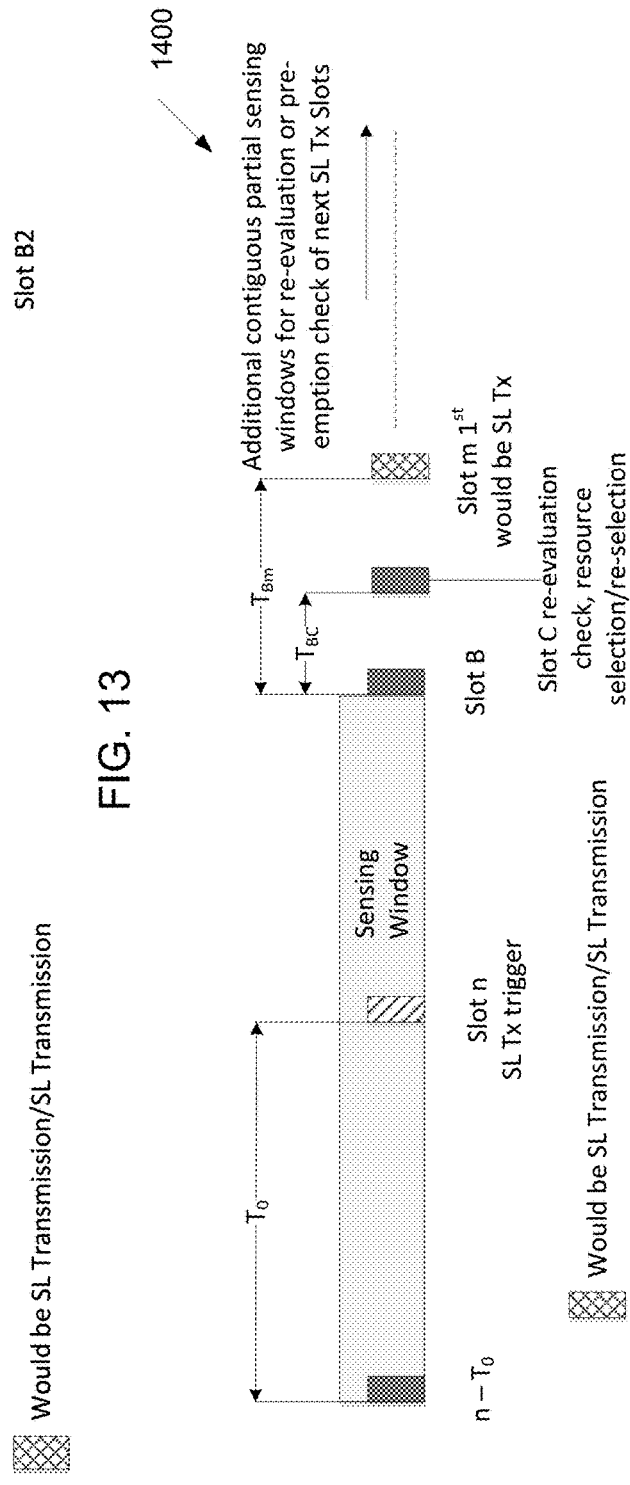

FIG. 14 illustrates yet another example of contiguous partial sensing operation 1400 according to embodiments of the present disclosure. An embodiment of the contiguous partial sensing operation 1400 shown in FIG. 14 is for illustration only.

In one example 0.2.1.2, for a first SL transmission occurring in slot m, as a result of a resource selection/re-selection in slot n, a resource re-evaluation check can occur in slot C, wherein slot C can be given as $m-T_C$. Slot B can be determined following the example/sub-examples of example 0.1.2.2, and slot C can be determined following the example/sub-examples of example 0.1.2.3. This is illustrated in FIG. 14.

In another example 0.2.2, a first contiguous partial sensing window ends before slot C of re-evaluation check of the first SL transmission or would SL transmission as illustrated in FIG. 14 for SL transmission (resource selection/re-selection) triggered by higher layers in slot n. When re-evaluation and/or pre-emption check is enabled, one or more second contiguous partial sensing windows are used for re-evaluation check and/or pre-emption check for the next SL transmissions.

Figure 15:
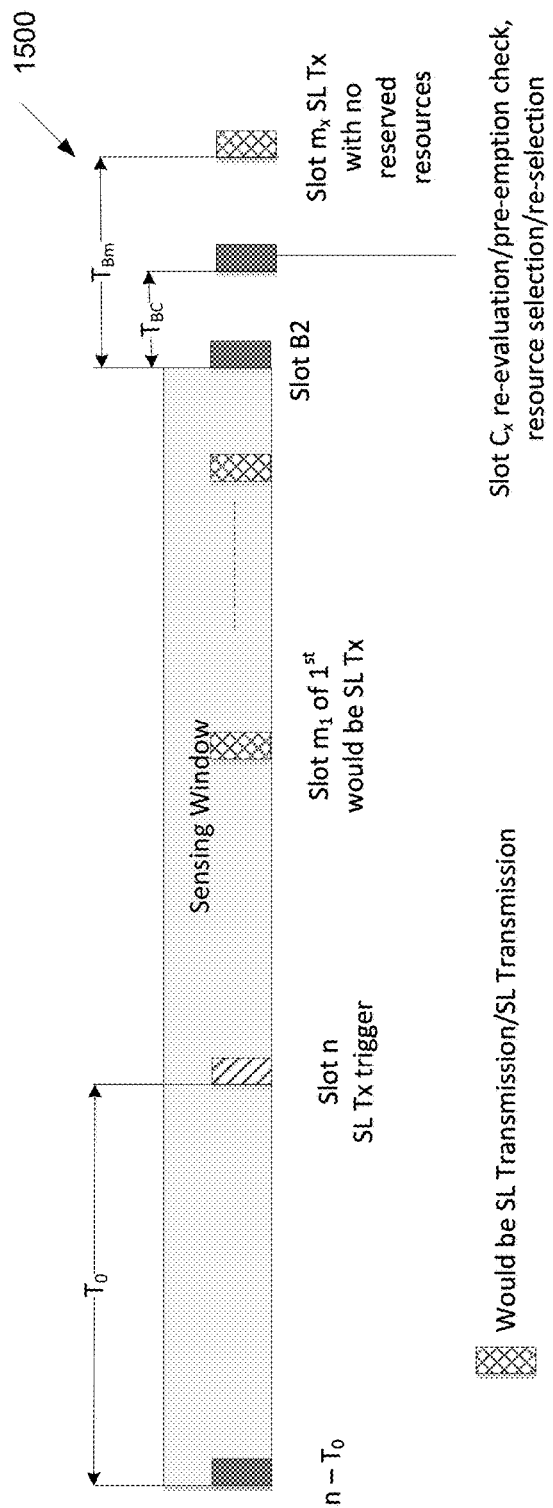

FIG. 15 illustrates yet another example of contiguous partial sensing operation 1500 according to embodiments of the present disclosure. An embodiment of the contiguous partial sensing operation 1500 shown in FIG. 15 is for illustration only.

In another example 0.2.3, contiguous partial sensing starts in slot A equal to $n-T_0$ or $t'_{n1}{}^{SL}-31$ or $t'_{y0}{}^{SL}-31$, and ends before slot B, i.e., the contiguous partial sensing window is in the range [A, B). Alternatively, contiguous partial sensing starts in slot A equal to $n-T_0$ or $t'_{n1}{}^{SL}-T_0$ or $t'_{y0}{}^{SL}-T_0$ and ends on or before slot B, i.e., the contiguous partial sensing window is in the range [A, B]. A resource transmitted in a slot can indicate reserved resource for a future SL (re-)transmission until slot $m_x$ for which a SL transmission includes no reservation for a future SL (re-)transmission. In this example, when re-evaluation and/or pre-emption check is enabled, the contiguous partial sensing window ends before the slot of the SL transmission with no reservation for a future SL transmission. This is illustrated in FIG. 15.

In one example 0.2.3.1, $n-T_0$ (e.g., $t'_{n1}{}^{SL}-31$ or $t'_{y0}{}^{SL}-31$) is determined is determined following the example/sub-examples of example 0.1.1.1.

In one example 0.2.3.2, for a SL transmission occurring in slot $m_x$, with no additional reserved resources, and the re-evaluation or pre-emption check of the corresponding resource is in slot C, the sensing window ends in slot B. Wherein, slot B can be determined following the example/sub-examples of example 0.1.2.2, and slot C, can be determined following the example/sub-examples of example 0.1.2.3.

In one example 0.2.3.3, a SL (re-)transmission in slot $m_x$, with no additional reserved resource can happen when the SL (re-)transmission in slot $m_x$ reaches the maximum number of re-transmissions.

In another example 0.2.3.4, a SL (re-)transmission in slot $m_x$, with no additional reserved resource can happen when the SL (re-)transmission in slot $m_x$ reaches the maximum number of re-transmissions, and there no new transmission to reserve resources for.

In another example 0.2.3.5, a SL (re-)transmission in slot $m_x$, with no additional reserved resource can happen when there are no available resources in the resource selection window to reserve for a future SL transmission.

In another example 0.2.3.6, a SL (re-)transmission in slot $m_x$, with no additional reserved resource can happen when there are no available resources within the packet delay budget to reserve for a future SL transmission.

In another example 0.2.4, contiguous partial sensing starts in slot A equal to $n-T_0$ or $t'_{n1}{}^{SL}-T_0$ or $t'_{y0}{}^{SL}-T_0$, and ends before slot B, i.e., the contiguous partial sensing window is in the range [A, B). Alternatively, contiguous partial sensing starts in slot A equal to $n-T_0$ or $t'_{n1}{}^{SL}-T_0$ or $t'_{y0}{}^{SL}-T_0$, and ends on or before slot B, i.e., the contiguous partial sensing window is in the range [A, B]. In this example, when re-evaluation and/or pre-emption check is enabled, the slot of the PSFCH resource that can indicate, implicitly or explicitly a positive acknowledgment is slot D. In one alternative, sensing ends after a UE receives an indication (implicit or explicit) of the successful reception of the pervious (re-)transmission. This is illustrated in FIG. 16.

Figure 16:
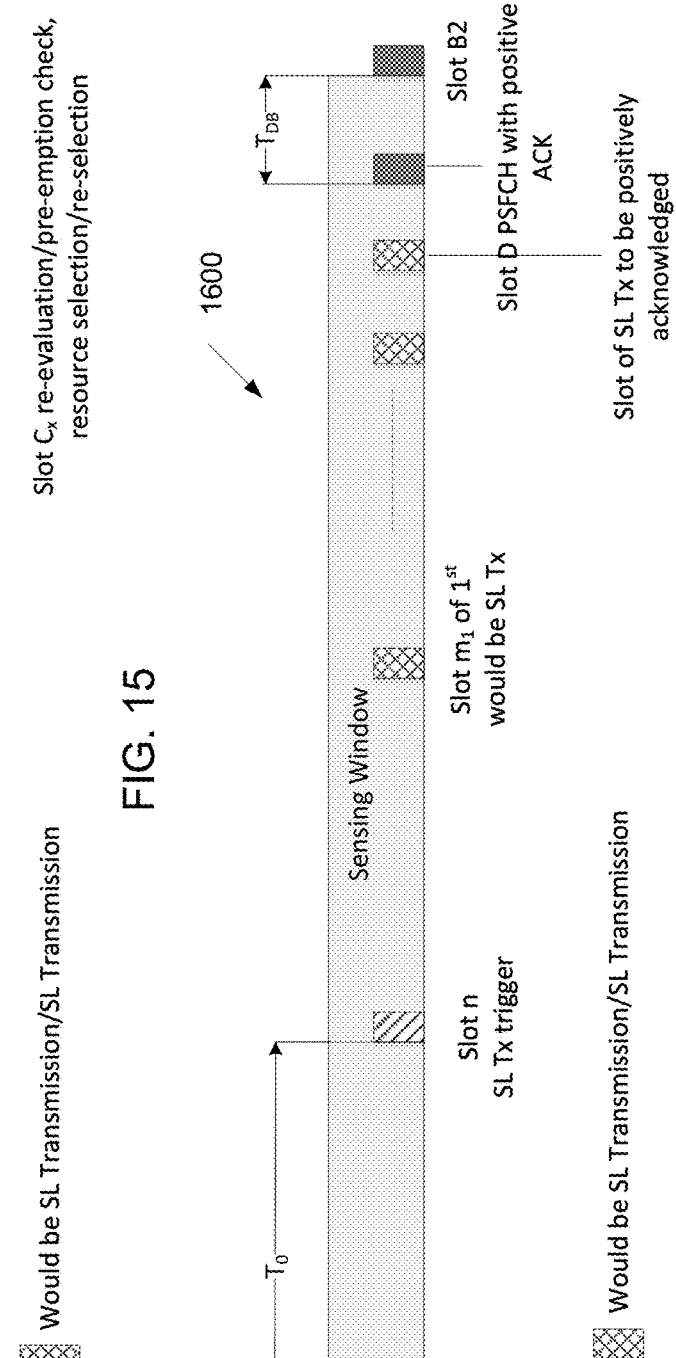

FIG. 16 illustrates yet another example of contiguous partial sensing operation 1600 according to embodiments of the present disclosure. An embodiment of the contiguous partial sensing operation 1600 shown in FIG. 16 is for illustration only.

In a second alternative, sensing ends after a UE receives an indication (implicit or explicit) of the successful reception of the pervious (re-)transmission and there are no new SL transmissions, i.e., last packet in a sequence of packets.

In one example 0.2.4.1, $n-T_0$ (e.g., $t'_{n1}{}^{SL}-31$ or $t'_{y0}{}^{SL}-31$) is determined is determined following the example/sub-examples of example 0.1.1.1.

In one example 0.2.4.2, the sensing window ends in slot B, wherein, $B=D+T_{DB}$, wherein, $T_{DB}$ can be specified in system specifications and/or pre-configured and/or configured and/or updated by RRC signaling and/or MAC CE signaling and/or L1 control signaling. In one example, $T_{DB}$ can be in units of physical time (e.g., ms) or in units of physical slots. In another example, $T_{DB}$ can be in units of logical slots that can be in a resource pool. In another example, $T_{DB}$ can be in units of logical slots in a resource pool. In one example, $T_{DB}$ can depend on a UE capability. In one example, $T_{DB}$ can depend on the sub-carrier spacing of the SL bandwidth part (e.g., of the SL channels). In another example, $T_{DB}$ can be determined by the UE's implementation. In another example, $T_{DB}$ can be determined by the UE's implementation subject to the above constraints, e.g., not to exceed a higher layer configured threshold and/or not to exceed a value that depends on a UE capability. In another example, $T_{DB}$ can be determined by the UE's implementation subject to the above constraints, e.g., not to be less than a higher layer configured threshold and/or not to be less than a value that depends on a UE capability.

In another example 0.2.5, contiguous partial sensing starts in slot A equal to $n-T_0$ or $t'_{n1}{}^{SL}-T_0$ or $t'_{y0}{}^{SL}-T_0$, and ends before slot B, i.e., the contiguous partial sensing window is in the range [A, B). Alternatively, contiguous partial sensing starts in slot A equal to $n-T_0$ or $t'^{SL}_{n1}-T_0$ or $t'^{SL}_{y0}-T_0$, and ends on or before slot B, i.e., the contiguous partial sensing window is in the range [A, B]. In this example, a SL transmission with or without HARQ-ACK feedback, has a maximum number of re-transmissions. In this example, when re-evaluation and/or pre-emption check is enabled, the sensing window ends before the last HARQ re-transmission. In one alternative, sensing ends before the last HARQ re-transmission. This is illustrated in FIG. 17.

Figure 17:
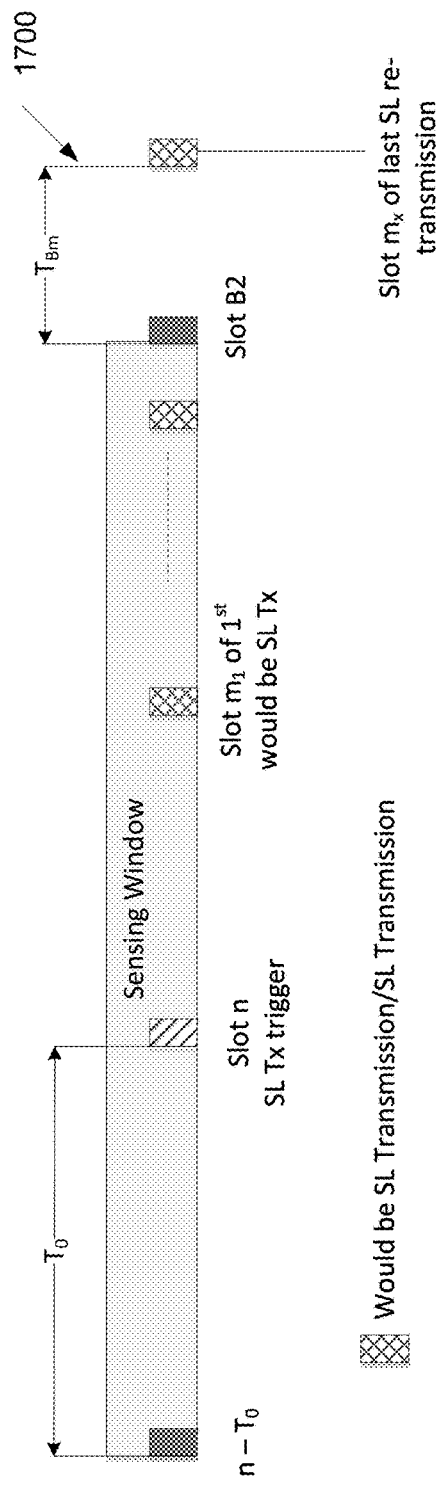

FIG. 17 illustrates yet another example of contiguous partial sensing operation 1700 according to embodiments of the present disclosure. An embodiment of the contiguous partial sensing operation 1700 shown in FIG. 17 is for illustration only.

In a second alternative, sensing ends before last HARQ re-transmission and there are no new SL transmissions, i.e., last packet in a sequence of packets.

In one example 0.2.5.1, $n-T_0$ (e.g., $t'^{SL}_{n1}-31$ or $t'^{SL}_{y0}-31$) is determined is determined following the example/sub-examples of example 0.1.1.1.

In one example 0.2.5.2, the slot of the last HARQ re-transmission is slot $m_x$, the sensing window ends in slot B, wherein, $B=m_x-T_{Bm}$, wherein, $T_{Bm}$ can be specified in system specifications and/or pre-configured and/or configured and/or updated by RRC signaling and/or MAC CE signaling and/or L1 control signaling. Slot B is before the slot of the re-evaluation check or pre-emption check of the last HARQ re-transmission, $T_{Bm}$ can be determined in part based on $T^{SL}_{proc,0}$. In one example, $T_{Bm}$ can be in units of physical time (e.g., ms) or in units of physical slots. In another example, $T_{Bm}$ can be in units of logical slots that can be in a resource pool. In another example, $T_{Bm}$ can be in units of logical slots in a resource pool. In one example, $T_{Bm}$ can depend on a UE capability. In one example, $T_{Bm}$ can depend on the sub-carrier spacing of the SL bandwidth part (e.g., of the SL channels). In another example, $T_{Bm}$ can be determined by the UE's implementation. In another example, $T_{Bm}$ can be determined by the UE's implementation subject to the above constraints, e.g., not to exceed a higher layer configured threshold and/or not to exceed a value that depends on a UE capability. In another example, $T_{Bm}$ can be determined by the UE's implementation subject to the above constraints, e.g., not to be less than a higher layer configured threshold and/or not to be less than a value that depends on a UE capability.

In another example 0.3, contiguous partial sensing occurs after slot n.

Figure 18:
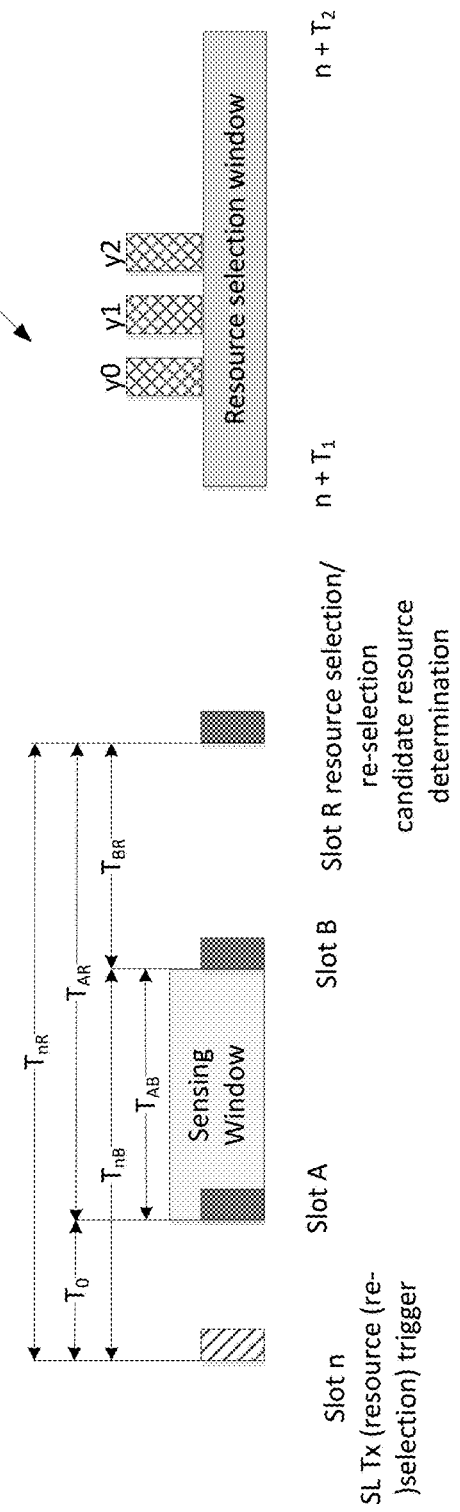

FIG. 18 illustrates yet another example of contiguous partial sensing operation 1800 according to embodiments of the present disclosure. An embodiment of the contiguous partial sensing operation 1800 shown in FIG. 18 is for illustration only.

In one example 0.3.1, as illustrated in FIG. 18, contiguous partial sensing starts in slot A, and ends before slot B, i.e., the contiguous partial sensing window is in the range [A, B). Alternatively, contiguous partial sensing starts in slot A, and ends on or before slot B, i.e., the contiguous partial sensing window is in the range [A, B]. A UE performs resource selection/re-reselection (candidate resources determination/reporting to higher layers) in slot R. Associated with a resource selection slot R is a resource selection window that extends from $R+T_1$ to $R+T_2$ or $n+T_1$ to $n+T_2$.

In one example 0.3.1.1, slot A is determined based on one of the following examples.

In one example 0.3.1.1.1, slot A is determined based on slot n, e.g., slot A is after slot n by $T_0$, i.e., $A=n+T_0$, wherein, $T_0$ is specified in system specifications and/or pre-configured and/or configured and/or updated by RRC signaling and/or MAC CE signaling and/or L1 control signaling. In one example, $T_0$ can be in units of physical time (e.g., ms) or in units of physical slots. In another example, $T_0$ can be in units of logical slots that can be in a resource pool. In another example, $T_0$ can be in units of logical slots in a resource pool. In one example, $T_0$ can depend on a UE capability. In one example, $T_0$ can depend on the sub-carrier spacing of the SL bandwidth part (e.g., of the SL channels). In another example, time $T_0$ is determined by UE's own implementation. In another example, $T_0$ can be determined by the UE's implementation subject to the above constraints, e.g., not to exceed a higher layer configured threshold and/or not exceed a value that depends on a UE capability.

In another example 0.3.1.1.2, slot A is determined based on slot R, wherein slot R is the slot where the UE performs resource selection, e.g., slot A is before slot R by $T_{AR}$, i.e., $A=R-T_{AR}$, wherein, $T_{AR}$ is specified in system specifications and/or pre-configured and/or configured and/or updated by RRC signaling and/or MAC CE signaling and/or L1 control signaling. In one example, $T_{AR}$ can be in units of physical time (e.g., ms) or in units of physical slots. In another example, $T_{AR}$ can be in units of logical slots that can be in a resource pool. In another example, $T_{AR}$ can be in units of logical slots in a resource pool. In one example, $T_{AR}$ can depend on a UE capability. In one example, $T_{AR}$ can depend on the sub-carrier spacing of the SL bandwidth part (e.g., of the SL channels). In one example, the farthest aperiodic reservation that can be indicated in an SCI is after W logical slots from a slot of the SCI, $T_{AR}$ corresponds to the physical duration of W logical slots before slot R. Alternatively, $T_{AR}$ in logical slots is equal to W. Wherein, W can be specified in system specifications and/or pre-configured and/or configured and/or updated by RRC signaling and/or MAC CE signaling and/or L1 control signaling. In one example, W can be in units of physical time (e.g., ms) or in units of physical slots. In another example, W can be in units of logical slots that can be in a resource pool. In another example, W can be in units of logical slots in a resource pool, i.e., the sensing window starts in slot $t'^{SL}_R-W$, wherein $t'^{SL}_R$ is the logical slot index within the resource pool corresponding to slot R, if slot R is not within the resource pool $t'^{SL}_R$ corresponds to the next or pervious logical slot within the resource pool after or before slot R respectively. Alternatively, the sensing window starts W logical slots before the start of the resource selection window, i.e., the sensing window starts in slot $t'^{SL}_{R1}-W$, wherein $t'^{SL}_{R1}$ is the index of the first logical slot within the resource selection window. In one example, W can depend on a UE capability. In one example, W can depend on the sub-carrier spacing of the SL bandwidth part (e.g., of the SL channels). In another example, time $T_{AR}$ is determined by UE's own implementation. In another example, $T_{AR}$ can be determined by the UE's implementation subject to the above constraints, e.g., not to be less than a higher layer configured threshold and/or not to be less than a value that depends on a UE capability. In one example, W is 31 logical slots.

In another example 0.3.1.1.3, slot A is determined based on the resource selection window. In one sub-example, the first slot of the resource selection window is $t'^{SL}_{n1}$ and slot A is given by $A=t'^{SL}_{n1}-W$. In another sub-example, the first slot of the Y candidate slots within the resource selection window is $t'^{SL}_{y0}$ and slot A is given by $A=t'^{SL}_{y0}-W$. wherein, W is specified in system specifications and/or pre-configured and/or configured and/or updated by RRC signaling and/or MAC CE signaling and/or L1 control signaling. For example, if W is not (pre-)configured, a system specified value is used. In one example, $T_{AR}$ can be in units of physical time (e.g., ms) or in units of physical slots. In another example, W can be in units of logical slots that can be in a resource pool. In another example, W can be in units of logical slots in a resource pool. In one example, W can depend on a UE capability. In one example, W can depend on the sub-carrier spacing of the SL bandwidth part (e.g., of the SL channels). In another example, time W is determined by UE's own implementation. In another example, W can be determined by the UE's implementation subject to the above constraints, e.g., not to be less than a higher layer configured threshold and/or not to be less than a value that depends on a UE capability. In one example, W is 31 logical slots.

In another example 0.3.1.6, slot A is the latest slot calculated according to: (1) Example 0.3.1.1 and example 0.3.1.2; (2) Example 0.3.1.1 and example 0.3.1.3; (3) Example 0.3.1.2 and example 0.3.1.3; and (4) Example 0.3.1.1, example 0.3.1.2 and example 0.3.1.3.

In another example 0.3.1.5, slot A is determined by UE's own implementation.

In another example 0.3.1.6, slot A is configured or indicated by higher layers.

In one example 0.3.1.2, slot B is determined based on one of the following examples.

In one example 0.3.1.2.1, slot B is determined based on slot n, e.g., slot B is after slot n by $T_{nB}$, i.e., $B=n+T_{nB}$, wherein $T_{nB}$ is specified in system specifications and/or pre-configured and/or configured and/or updated by RRC signaling and/or MAC CE signaling and/or L1 control signaling. In one example, $T_{nB}$ can be in units of physical time (e.g., ms) or in units of physical slots. In another example, $T_{nB}$ can be in units of logical slots that can be in a resource pool. In another example, $T_{nB}$ can be in units of logical slots in a resource pool. In one example, $T_{nB}$ can depend on a UE capability. In one example, $T_{nB}$ can depend on the sub-carrier spacing of the SL bandwidth part (e.g., of the SL channels). In another example, time $T_{nB}$ is determined by UE's own implementation. In another example, $T_{nB}$ can be determined by the UE's implementation subject to the above constraints, e.g., not to be less than a higher layer configured threshold and/or not to be less than a value that depends on a UE capability.

In another example 0.3.1.2.2, slot B is determined based on the start of the continuous partial sensing window, the contiguous partial sensing window starts in slot A, e.g., $B=A+T_{AB}$, wherein $T_{AB}$ is specified in system specifications and/or pre-configured and/or configured and/or updated by RRC signaling and/or MAC CE signaling and/or L1 control signaling. In one example, $T_{AB}$ can be in units of physical time (e.g., ms) or in units of physical slots. In another example, $T_{AB}$ can be in units of logical slots that can be in a resource pool. In another example, $T_{AB}$ can be in units of logical slots in a resource pool. In one example, $T_{AB}$ can depend on a UE capability. In one example, $T_{AB}$ can depend on the sub-carrier spacing of the SL bandwidth part (e.g., of the SL channels). $T_{AB}$ is the length of the contiguous partial sensing window. In another example, time $T_{AB}$ is determined by UE's own implementation. In another example, $T_{AB}$ can be determined by the UE's implementation subject to the above constraints, e.g., not to be less than a higher layer configured threshold and/or not to be less than a value that depends on a UE capability.

In another example 0.3.1.2.3, slot B is determined based on slot R, wherein slot R is the slot where the UE performs resource selection, e.g., slot B is before slot R by $T_{BR}$, i.e., $B=R-T_{BR}$, wherein $T_{BR}$ is specified in system specifications and/or pre-configured and/or configured and/or updated by RRC signaling and/or MAC CE signaling and/or L1 control signaling. In one example, $T_{BR}$ can be in units of physical time (e.g., ms) or in units of physical slots. In another example, $T_{BR}$ can be in units of logical slots that can be in a resource pool. In another example, $T_{BR}$ can be in units of logical slots in a resource pool. In one example, $T_{BR}$ can depend on a UE capability. In one example, $T_{BR}$ can depend on the sub-carrier spacing of the SL bandwidth part (e.g., of the SL channels). In one example, $T_{BR}$ is the latency for sensing (e.g., $T_{proc,0}^{SL}$). In one example, $T_{BR}$ cannot exceed the latency for sensing (e.g., $T_{proc,0}^{SL}$). In one example, $T_{BR}$ cannot be less than the latency for sensing (e.g., $T_{proc,0}^{SL}$). Wherein, $T_{proc,0}^{SL}$ can be specified in system specifications and/or pre-configured and/or configured and/or updated by RRC signaling and/or MAC CE signaling and/or L1 control signaling. In one example, $T_{proc,0}^{SL}$ can be in units of physical time (e.g., ms) or in units of physical slots. In another example, $T_{proc,0}^{SL}$ can be in units of logical slots that can be in a resource pool. In another example, $T_{proc,0}^{SL}$ can be in units of logical slots in a resource pool. In one example, $T_{proc,0}^{SL}$ can depend on a UE capability. In one example, $T_{proc,0}^{SL}$ can depend on the sub-carrier spacing of the SL bandwidth part (e.g., of the SL channels). In another example, time $T_{BR}$ is determined by UE's own implementation. In another example, $T_{BR}$ can be determined by the UE's implementation subject to the above constraints, e.g., not to exceed a higher layer configured threshold and/or not to exceed a value that depends on a UE capability, e.g., $T_B \leq T_{proc,0}^{SL}$. $T_{proc,0}^{SL}$ can be is as illustrated in TABLE 2.

In another example 0.3.1.2.4, slot B is determined based on the resource selection window. In one sub-example, the first slot of the resource selection window is $t'_{n1}{}^{SL}$ and slot B is given by $B=t'_{n1}{}^{SL}-T_{BW}$. In another sub-example, the first slot of the Y candidate slots within the resource selection window is $t'_{y0}{}^{SL}$ and slot B is given by $B=t'_{y0}{}^{SL}-T_{BW}$. Wherein $T_{BW}$ is specified in system specifications and/or pre-configured and/or configured and/or updated by RRC signaling and/or MAC CE signaling and/or L1 control signaling. In one example, $T_{BW}$ can be in units of physical time (e.g., ms) or in units of physical slots. In another example, $T_{BW}$ can be in units of logical slots that can be in a resource pool. In another example, $T_{BW}$ can be in units of logical slots in a resource pool. In one example, $T_{BW}$ can depend on a UE capability. In one example, $T_{BW}$ can depend on the sub-carrier spacing of the SL bandwidth part (e.g., of the SL channels). In one example, $T_{BW} \leq T_{proc,0}^{SL}+T_{proc,1}^{SL}$ or $T_{BW}=T_{proc,0}^{SL}+T_{proc,1}^{SL}$ or $T_{BW}<T_{proc,0}^{SL}+T_{proc,1}^{SL}$, alternatively, $T_{BW} \leq T_{proc,0}^{SL}+T_{proc,1}^{SL}+K$, wherein K is an additional latency. Wherein, $T_{proc,0}^{SL}$ is latency for sensing from the end of the sensing window last slot be sensed to the slot where resource (re-)selection takes places (e.g., slot R), $T_{proc,1}^{SL}$ is latency between the slot where resource (re-)selection takes places (e.g., slot R) and slot $t'_{n1}{}^{SL}$ or slot $t'_{y0}{}^{SL}$. In one example, $T_{proc,0}^{SL}$ and/or $T_{proc,1}^{SL}$ and/or K can depend on a UE capability. In one example, $T_{proc,0}^{SL}$ and/or $T_{proc,1}^{SL}$ and/or K can depend on the sub-carrier spacing of the SL bandwidth part (e.g., of the SL channels). In another example $T_{proc,0}^{SL}$ and/or $T_{proc,1}^{SL}$ and/or K can be specified in system specifications and/or pre-configured and/or configured and/or updated by RRC signaling and/or MAC CE signaling and/or L1 control signaling. In one example, $T_{proc,0}^{SL}$ and/or $T_{proc,1}^{SL}$ and/or K can be in units of physical time (e.g., ms) or in units of physical slots. In another example, $T_{proc,0}$ and/or $T_{proc,1}^{SL}$ and/or K can be in units of logical slots that can be in a resource pool. In another example, $T_{proc,0}^{SL}$ and/or $T_{proc,1}^{SL}$ and/or K can be in units of logical slots in a resource pool. In one example, $T_{proc,0}^{SL}$ and/or $T_{proc,1}^{SL}$ can be the same as the corresponding parameters of resource (re-) selection for full sensing. In another example, $T_{proc,0}^{SL}$ and/or $T_{proc,1}^{SL}$ can be separate parameters from those of resource (re-)selection for full sensing. In another example, $T_{BW}$ can be determined by the UE's implementation. In another example, $T_{BW}$ can be determined by the UE's implementation subject to the above constraints, e.g., $T_{BW} \leq T_{proc,0}^{SL} + T_{proc,1}^{SL}$ or $T_{BW} \leq T_{proc,0}^{SL} + T_{proc,1}^{SL} + K$. Wherein, $T_{BW}$, $T_{proc,0}^{SL}$, $T_{proc,1}^{SL}$ and K are converted to the same time unit, e.g., logical slots in a resource pool or physical time or physical slots. $T_{proc,0}^{SL}$ depends on sub-carrier spacing is as illustrated in TABLE 2. $T_{proc,0}^{SL}$ depends on sub-carrier spacing is as illustrated in TABLE 3.

In another example 0.3.1.2.5, slot B is determined by UE's own implementation.

In another example 0.3.1.2.6, slot B is configured or indicated by higher layers.

In one example 0.3.1.3, slot R is determined based on one of the following examples.

In one example 0.3.1.3.1, slot R is determined based on slot n, e.g., slot R is after slot n by $T_{nR}$, i.e., $R=n+T_{nR}$, wherein, $T_{nR}$ is specified in system specifications and/or pre-configured and/or configured and/or updated by RRC signaling and/or MAC CE signaling and/or L1 control signaling. In one example, $T_{nR}$ can be in units of physical time (e.g., ms) or in units of physical slots. In another example, $T_{nR}$ can be in units of logical slots that can be in a resource pool. In another example, $T_{nR}$ can be in units of logical slots in a resource pool. In one example, $T_{nR}$ can depend on a UE capability. In one example, $T_{nR}$ can depend on the sub-carrier spacing of the SL bandwidth part (e.g., of the SL channels). In another example, time $T_{nR}$ is determined by UE's own implementation. In another example, $T_{nR}$ can be determined by the UE's implementation subject to the above constraints, e.g., not to exceed a higher layer configured threshold and/or not to exceed a value that depends on a UE capability.

In another example 0.3.1.3.2, slot R is determined based on slot A, e.g., slot R is after slot A by $T_{AR}$, i.e., $R=A+T_{AR}$, wherein, $T_{AR}$ is specified in system specifications and/or pre-configured and/or configured and/or updated by RRC signaling and/or MAC CE signaling and/or L1 control signaling. In one example, $T_{AR}$ can be in units of physical time (e.g., ms) or in units of physical slots. In another example, $T_{AR}$ can be in units of logical slots that can be in a resource pool. In another example, $T_{AR}$ can be in units of logical slots in a resource pool. In one example, $T_{AR}$ can depend on a UE capability. In one example, $T_{AR}$ can depend on the sub-carrier spacing of the SL bandwidth part (e.g., of the SL channels). In one example, $T_{AR}$ can depend on the sub-carrier spacing of the SL bandwidth part (e.g., of the SL channels). In one example, the farthest aperiodic reservation that can be indicated in an SCI is after W logical slots from a slot of the SCI, $T_{AR}$ corresponds to the physical duration of W logical slots before slot R. Alternatively, $T_{AR}$ in logical slots is equal to W. Wherein, W can be specified in system specifications and/or pre-configured and/or configured and/or updated by RRC signaling and/or MAC CE signaling and/or L1 control signaling. In one example, W can be in units of physical time (e.g., ms) or in units of physical slots. In another example, W can be in units of logical slots that can be in a resource pool. In another example, W can be in units of logical slots in a resource pool. In one example, W can depend on a UE capability. In one example, W can depend on the sub-carrier spacing of the SL bandwidth part (e.g., of the SL channels). In another example, time $T_{AR}$ is determined by UE's own implementation. In another example, $T_{AR}$ can be determined by the UE's implementation subject to the above constraints, e.g., not to be less than a higher layer configured threshold and/or not to be less than a value that depends on a UE capability.

In another example 0.3.1.3.3, slot R is determined based on slot B, e.g., slot R is after slot B by $T_{BR}$, i.e., $R=B+T_{BR}$, wherein, $T_{BR}$ is specified in system specifications and/or pre-configured and/or configured and/or updated by RRC signaling and/or MAC CE signaling and/or L1 control signaling. In one example, $T_{BR}$ can be in units of physical time (e.g., ms) or in units of physical slots. In another example, $T_{BR}$ can be in units of logical slots that can be in a resource pool. In another example, $T_{BR}$ can be in units of logical slots in a resource pool. In one example, $T_{BR}$ can depend on a UE capability. In one example, $T_{BR}$ can depend on the sub-carrier spacing of the SL bandwidth part (e.g., of the SL channels). In one example, $T_{BR}$ is the latency for sensing (e.g., $T_{proc,0}^{SL}$). In one example, $T_{BR}$ cannot exceed the latency for sensing (e.g., $T_{proc,0}^{SL}$). In one example, $T_{BR}$ cannot less than the latency for sensing (e.g., $T_{proc,0}^{SL}$). Wherein, $T_{proc,0}^{SL}$ can be specified in system specifications and/or pre-configured and/or configured and/or updated by RRC signaling and/or MAC CE signaling and/or L1 control signaling. In one example, $T_{proc,0}^{SL}$ can be in units of physical time (e.g., ms) or in units of physical slots. In another example, $T_{proc,0}^{SL}$ can be in units of logical slots that can be in a resource pool. In another example, $T_{proc,0}^{SL}$ can be in units of logical slots in a resource pool. In one example, $T_{proc,0}^{SL}$ can depend on a UE capability. In one example, $T_{proc,0}^{SL}$ can depend on the sub-carrier spacing of the SL bandwidth part (e.g., of the SL channels). In another example, time $T_{BR}$ is determined by UE's own implementation. In another example, $T_{BR}$ can be determined by the UE's implementation subject to the above constraints, e.g., not to exceed a higher layer configured threshold and/or not to exceed a value that depends on a UE capability, e.g., $T_B \leq T_{proc,0}^{SL}$. $T_{proc,0}^{SL}$ can be as illustrated in TABLE 2.

In another example 0.3.1.3.4, slot R is determined based on the resource selection window. In one sub-example, the first slot of the resource selection window is $t'_{n1}^{SL}$ and slot R is given by $R=t'_{n1}^{SL}-T_{RW}$. In another sub-example, the first slot of the Y candidate slots within the resource selection window is $t'_{y0}^{SL}$ and slot R is given by $R=t'_{y0}^{SL}-T_{RW}$. Wherein, $T_{RW}$ is specified in system specifications and/or pre-configured and/or configured and/or updated by RRC signaling and/or MAC CE signaling and/or L1 control signaling. In one example, $T_{RW}$ can be in units of physical time (e.g., ms) or in units of physical slots. In another example, $T_{RW}$ can be in units of logical slots that can be in a resource pool. In another example, $T_{RW}$ can be in units of logical slots in a resource pool. In one example, $T_{RW}$ can depend on a UE capability. In one example, $T_{RW}$ can depend on the sub-carrier spacing of the SL bandwidth part (e.g., of the SL channels). In one example, $T_{RW}$ is the latency for resource (re-)selection (e.g., $T_{proc,1}^{SL}$). In one example, $T_{RW}$ cannot exceed the latency for (re-)selection (e.g., $T_{proc,1}^{SL}$). In one example, $T_{RW}$ cannot less than the latency for (re)selection (e.g., $T_{proc,1}^{SL}$). Wherein, $T_{proc,1}^{SL}$ can be specified in system specifications and/or pre-configured and/or configured and/or updated by RRC signaling and/or MAC CE signaling and/or L1 control signaling. In one example, $T_{proc,1}^{SL}$ can be in units of physical time (e.g., ms) or in units of physical slots. In another example, $T_{proc,1}^{SL}$ can be in units of logical slots that can be in a resource pool. In another example, $T_{proc,1}^{SL}$ can be in units of logical slots in a resource pool. In one example, $T_{proc,1}^{SL}$ can depend on a UE capability. In one example, $T_{proc,1}^{SL}$ can depend on the sub-carrier spacing of the SL bandwidth part (e.g., of the SL channels). In another example, time $T_{RW}$ is determined by UE's own implementation. In another example, $T_{RW}$ can be determined by the UE's implementation subject to the above constraints, e.g., not to exceed a higher layer configured threshold and/or not to exceed a value that depends on a UE capability, e.g., $T_{RW} \leq T_{proc,1}^{SL}$. $T_{proc,1}^{SL}$ can be as illustrated in TABLE 3.

In another example 0.3.1.3.5, slot R is determined by UE's own implementation.

In another example 0.3.1.3.6, slot R is configured or indicated by higher layers.

In one example 0.3.1.4, the first slots of the resource selection window W is determined based on one of the following examples.

In one example 0.3.1.4.1, slot W is determined based on slot n, e.g., slot W is after slot n by $T_{AW}$, i.e., W=n+$T_{nW}$, wherein, $T_{nW}$ is specified in system specifications and/or pre-configured and/or configured and/or updated by RRC signaling and/or MAC CE signaling and/or L1 control signaling. In one example, $T_{nW}$ can be in units of physical time (e.g., ms) or in units of physical slots. In another example, $T_{nW}$ can be in units of logical slots that can be in a resource pool. In another example, $T_{nW}$ can be in units of logical slots in a resource pool. In one example, $T_{nW}$ can depend on a UE capability. In one example, $T_{nW}$ can depend on the sub-carrier spacing of the SL bandwidth part (e.g., of the SL channels). In another example, time $T_{nW}$ is determined by UE's own implementation. In another example, $T_{nW}$ can be determined by the UE's implementation subject to the above constraints, e.g., not to exceed a higher layer configured threshold and/or not exceed a value that depends on a UE capability.

In another example 0.3.1.4.2, slot W is determined based on slot A, wherein slot A is the first slot of the sensing window, e.g., slot W is after slot A by $T_{AW}$, i.e., W=A+$T_{AW}$, wherein, $T_{AW}$ is specified in system specifications and/or pre-configured and/or configured and/or updated by RRC signaling and/or MAC CE signaling and/or L1 control signaling. In one example, $T_{AW}$ can be in units of physical time (e.g., ms) or in units of physical slots. In another example, $T_{AW}$ can be in units of logical slots that can be in a resource pool. In another example, $T_{AW}$ can be in units of logical slots in a resource pool. In one example, $T_{AW}$ can depend on a UE capability. In one example, $T_{AW}$ can depend on the sub-carrier spacing of the SL bandwidth part (e.g., of the SL channels). In one example, the farthest aperiodic reservation that can be indicated in an SCI is after W logical slots from a slot of the SCI, $T_{AW}$ corresponds to the physical duration of W logical slots before slot R. Alternatively, $T_{AW}$ in logical slots is equal to W. Wherein, W can be specified in system specifications and/or pre-configured and/or configured and/or updated by RRC signaling and/or MAC CE signaling and/or L1 control signaling. In one example, W can be in units of physical time (e.g., ms) or in units of physical slots. In another example, W can be in units of logical slots that can be in a resource pool. In another example, W can be in units of logical slots in a resource pool, i.e., the resource (re-)selection window starts in slot $t'_A{}^{SL}$+W, wherein $t'_A{}^{SL}$ is the logical slot index within the resource pool corresponding to slot A. In one example, W can depend on a UE capability. In one example, W can depend on the sub-carrier spacing of the SL bandwidth part (e.g., of the SL channels). In another example, time $T_{AW}$ is determined by UE's own implementation. In another example, $T_{AW}$ can be determined by the UE's implementation subject to the above constraints, e.g., not to be less than a higher layer configured threshold and/or not to be less than a value that depends on a UE capability. In one example, W is 31 logical slots.

In another example 0.3.1.4.3, slot W is determined based on slot B, wherein, W=B+$T_{BW}$. Wherein $T_{BW}$ is specified in system specifications and/or pre-configured and/or configured and/or updated by RRC signaling and/or MAC CE signaling and/or L1 control signaling. In one example, $T_{BW}$ can be in units of physical time (e.g., ms) or in units of physical slots. In another example, $T_{BW}$ can be in units of logical slots that can be in a resource pool. In another example, $T_{BW}$ can be in units of logical slots in a resource pool. In one example, $T_{BW}$ can depend on a UE capability. In one example, $T_{BW}$ can depend on the sub-carrier spacing of the SL bandwidth part (e.g., of the SL channels). In one example, $T_{BW} \leq T_{proc,0}^{SL} + T_{proc,1}^{SL}$ or $T_{BW} = T_{proc,0}^{SL} + T_{proc,1}^{SL}$ or $T_{BW} < T_{proc,0}^{SL} + T_{proc,1}^{SL}$, alternatively, $T_{BW} \leq T_{proc,0}^{SL} + T_{proc,1}^{SL} + K$, wherein K is an additional latency. Wherein, $T_{proc,0}^{SL}$ is latency for sensing from the end of the sensing window last slot be sensed to the slot where resource (re-)selection takes places (e.g., slot R), $T_{proc,0}^{SL}$ is latency between the slot where resource (re-) selection takes places (e.g., slot R) and slot W. In one example, $T_{proc,0}^{SL}$ and/or $T_{proc,1}^{SL}$ and/or K can depend on a UE capability. In one example, $T_{proc,0}^{SL}$ and/or $T_{proc,1}^{SL}$ and/or K can depend on the sub-carrier spacing of the SL bandwidth part (e.g., of the SL channels). In another example $T_{proc,0}^{SL}$ and/or $T_{proc,1}^{SL}$ and/or K can be specified in system specifications and/or pre-configured and/or configured and/or updated by RRC signaling and/or MAC CE signaling and/or L1 control signaling. In one example, $T_{proc,0}^{SL}$ and/or $T_{proc,1}^{SL}$ and/or K can be in units of physical time (e.g., ms) or in units of physical slots. In another example, $T_{proc,0}^{SL}$ and/or $T_{proc,1}^{SL}$ and/or K can be in units of logical slots that can be in a resource pool. In another example, $T_{proc,0}^{SL}$ and/or $T_{proc,1}^{SL}$ and/or K can be in units of logical slots in a resource pool. In one example, $T_{proc,0}^{SL}$ and/or $T_{proc,1}^{SL}$ can be the same as the corresponding parameters of resource (re-) selection for full sensing. In another example, $T_{proc,0}^{SL}$ and/or $T_{proc,1}^{SL}$ can be separate parameters from those of resource (re-)selection for full sensing. In another example, $T_{BW}$ can be determined by the UE's implementation. In another example, $T_{BW}$ can be determined by the UE's implementation subject to the above constraints, e.g., $T_{BW} \leq T_{proc,0}^{SL} + T_{proc,1}^{SL}$ or $T_{BW} \leq T_{proc,0}^{SL} + T_{proc,1}^{SL} + K$. Wherein, $T_{BW}$, $T_{proc,0}^{SL}$, $T_{proc,1}^{SL}$ and K are converted to the same time unit, e.g., logical slots in a resource pool or physical time or physical slots. $T_{proc,0}^{SL}$ depends on sub-carrier spacing is as illustrated in TABLE 2. $T_{proc,1}^{SL}$ depends on sub-carrier spacing is as illustrated in TABLE 3.

In another example 0.3.1.4.4, slot W is determined based on slot R, e.g., slot W is after slot R by $T_{RW}$, i.e., W=R+$T_{RW}$, wherein, $T_{RW}$ is specified in system specifications and/or pre-configured and/or configured and/or updated by RRC signaling and/or MAC CE signaling and/or L1 control signaling. In one example, $T_{RW}$ can be in units of physical time (e.g., ms) or in units of physical slots. In another example, $T_{RW}$ can be in units of logical slots that can be in a resource pool. In another example, $T_{RW}$ can be in units of logical slots in a resource pool. In one example, $T_{RW}$ can depend on a UE capability. In one example, $T_{RW}$ can depend on the sub-carrier spacing of the SL bandwidth part (e.g., of the SL channels). In one example, $T_{RW}$ is the latency for resource (re)selection (e.g., $T_{proc,1}^{SL}$). In one example, $T_{RW}$ cannot exceed the latency for (re-)selection (e.g., $T_{proc,1}^{SL}$). In one example, $T_{RW}$ cannot less than the latency for (re-)selection (e.g., $T_{proc,1}^{SL}$). Wherein, $T_{proc,1}^{SL}$ can be specified in system specifications and/or pre-configured and/or configured and/or updated by RRC signaling and/or MAC CE signaling and/or L1 control signaling. In one example, $T_{proc,1}^{SL}$ can be in units of physical time (e.g., ms) or in units of physical slots. In another example, $T_{proc,1}^{SL}$ can be in units of logical slots that can be in a resource pool. In another example, $T_{proc,1}^{SL}$ can be in units of logical slots in a resource pool. In one example, $T_{proc,1}^{SL}$ can depend on a UE capability. In one example, $T_{proc,1}^{SL}$ can depend on the sub-carrier spacing of the SL bandwidth part (e.g., of the SL channels). In another example, time $T_{RW}$ is determined by UE's own implementation. In another example, $T_{RW}$ can be determined by the UE's implementation subject to the above constraints, e.g., not to exceed a higher layer configured threshold and/or not to exceed a value that depends on a UE capability, e.g., $T_{RW} \le T_{proc,1}^{SL}$. $T_{proc,1}^{SL}$ can be as illustrated in TABLE 3.

In another example 0.3.1.4.5, slot W is determined by UE's own implementation.

In another example 0.3.1.4.6, slot W is configured or indicated by higher layers.

Figure 19:
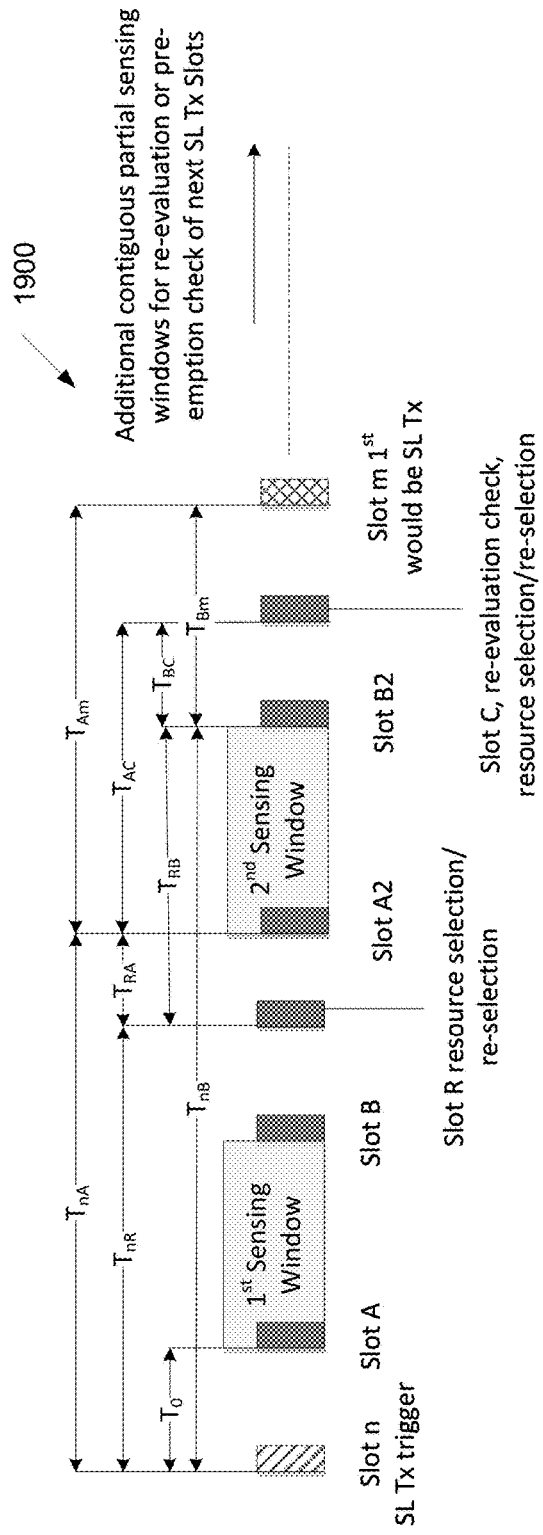

FIG. 19 illustrates yet another example of contiguous partial sensing operation 1900 according to embodiments of the present disclosure. An embodiment of the contiguous partial sensing operation 1900 shown in FIG. 19 is for illustration only.

In another example 0.3.2, as illustrated in FIG. 19, a first contiguous partial sensing window occurs before resource selection/re-selection (e.g., in slot R) as described in example 0.3.1, and one or more second contiguous partial sensing windows occur for re-evaluation and/or pre-emption. For a first SL transmission or would-be SL transmission occurring in slot m, as a result of a resource selection/re-selection in slot R, a resource re-evaluation check can occur in slot C, wherein slot C can be given as $m-T_C$ (e.g., $T_C=T_3$ as defined in release 16). A second contiguous partial sensing window can start in slot A2, and end before slot B2, i.e., the second contiguous partial sensing window is in the range [A2, B2). Alternatively, a second contiguous partial sensing window starts in slot A2, and ends on or before slot B2, i.e., the contiguous partial sensing window is in the range [A2, B2].

In one example 0.3.2.1, slot A2 can be determined by one of the following examples.

In one example 0.3.2.1.1, slot A2 is determined based on slot n, e.g., slot A2 is after slot n by a time $T_{nA}$, i.e., A2=n+$T_{nA}$, wherein, $T_{nA}$ can be specified in system specifications (e.g., $T_{nA}=0$ or $T_{nA}=1$) and/or pre-configured and/or configured and/or updated by RRC signaling and/or MAC CE signaling and/or L1 control signaling. In one example, $T_{nA}$ can be in units of physical time (e.g., ms) or in units of physical slots. In another example, $T_{nA}$ can be in units of logical slots that can be in a resource pool. In another example, $T_{nA}$ can be in units of logical slots in a resource pool. In one example, $T_{nA}$ can depend on a UE capability. In one example, $T_{nA}$ can depend on the sub-carrier spacing of the SL bandwidth part (e.g., of the SL channels). In another example, time $T_{nA}$ is determined by UE's own implementation. In another example, $T_{nA}$ can be determined by the UE's implementation subject to the above constraints, e.g., not to exceed a higher layer configured threshold and/or not exceed a value that depends on a UE capability.

In one example 0.3.2.1.2, slot A2 is determined based on slot R, e.g., slot A2 is after slot R by a time $T_{RA}$, i.e., A2=R+$T_{RA}$, or after the last slot sensed for resource selection at slot R, wherein, $T_{RA}$ can be specified in system specifications (e.g. $T_{RA}=0$ or $T_{RA}=1$) and/or pre-configured and/or configured and/or updated by RRC signaling and/or MAC CE signaling and/or L1 control signaling. In one example, $T_{RA}$ can be in units of physical time (e.g., ms) or in units of physical slots. In another example, $T_{RA}$ can be in units of logical slots that can be in a resource pool. In another example, $T_{RA}$ can be in units of logical slots in a resource pool. In one example, $T_{RA}$ can depend on a UE capability. In one example, $T_{RA}$ can depend on the sub-carrier spacing of the SL bandwidth part (e.g., of the SL channels). In another example, time $T_{RA}$ is determined by UE's own implementation. In another example, $T_{RA}$ can be determined by the UE's implementation subject to the above constraints, e.g., not to exceed a higher layer configured threshold and/or not exceed a value that depends on a UE capability. In one example $T_{RA}=1$ logical slot. In one example $T_{RA}=1$ physical slot. In another example, $T_{RA}=0$. In one example, the start of the sensing window is after the last slot sensed for the first contiguous partial sensing window. For example, if the last slot sensed for the first contiguous partial sensing window is the slot before slot $R-T_{proc,0}^{SL}$, the sensing window starts in slot $R-T_{proc,0}^{SL}$, i.e., $T_{RA}=-T_{proc,0}^{SL}$. In another example, if the last slot sensed for the first contiguous partial sensing window is slot $R-T_{proc,0}^{SL}$, the sensing window starts in slot $R-T_{proc,0}^{SL}+1$, i.e., $T_{RA}=-T_{proc,0}^{SL}+1$. $T_{proc,0}^{SL}$ can be as illustrated in TABLE 2.

In another example 0.3.2.1.3, slot A2 is determined based on slot m, e.g., slot A2 is before slot m by time $T_{Am}$, i.e., A2=m-$T_{Am}$, wherein, $T_{Am}$ can be specified in system specifications and/or pre-configured and/or configured and/or updated by RRC signaling and/or MAC CE signaling and/or L1 control signaling. In one example, $T_{Am}$ can be in units of physical time (e.g., ms) or in units of physical slots. In another example, $T_{Am}$ can be in units of logical slots that can be in a resource pool. In another example, $T_{Am}$ can be in units of logical slots in a resource pool. In one example, $T_{Am}$ can depend on a UE capability. In one example, $T_{Am}$ can depend on the sub-carrier spacing of the SL bandwidth part (e.g., of the SL channels). In one example, the farthest aperiodic reservation that can be indicated in an SCI is after W logical slots from a slot of the SCI, $T_{Am}$ corresponds to the physical duration of W logical slots before slot m. Alternatively, $T_{Am}$ in logical slots is equal to W. Wherein, W can be specified in system specifications and/or pre-configured and/or configured and/or updated by RRC signaling and/or MAC CE signaling and/or L1 control signaling. In one example, W can be in units of physical time (e.g., ms) or in units of physical slots. In another example, W can be in units of logical slots that can be in a resource pool. In another example, W can be in units of logical slots in a resource pool. In one example, W can depend on a UE capability. In one example, W can depend on the sub-carrier spacing of the SL bandwidth part (e.g., of the SL channels). In one example, W is 31 logical slots. In another example, time $T_{Am}$ is determined by UE's own implementation. In another example, $T_{Am}$ can be determined by the UE's implementation subject to the above constraints, e.g., not to be less than a higher layer configured threshold and/or not be less than a value that depends on a UE capability.

In another example 0.3.2.1.4, slot A2 is the furthest in time of n+$T_{nA}$ and m-$T_{Am}$. i.e., A2=max(n+$T_{nA}$, m-$T_{Am}$). Wherein, $T_{nA}$ and $T_{Am}$ follow from example 0.3.2.1.1 and example 0.3.2.1.3.

In another example 0.3.2.1.5, slot A2 is the earliest in time of n+$T_{nA}$ and m-$T_{Am}$ i.e., A2=min(n+$T_{nA}$, m-$T_{Am}$). Wherein, $T_{nA}$ and $T_{Am}$ follow from example 0.3.2.1.1 and example 0.3.2.1.3.

In another example 0.3.2.1.6, slot A2 is a function of $n+T_{nA}$ and $m-T_{Am}$. i.e., $A2=f(n+T_{nA}, m-T_{Am})$. Wherein, $T_{nA}$ and $T_{Am}$ follow from example 0.3.2.1.1 and example 0.3.2.1.3.

In another example 0.3.2.1.7, slot A2 is the furthest in time of $R+T_{RA}$ and $m-T_{Am}$ i.e., $A2=\max(R+T_{RA}, m-T_{Am})$. Wherein, $T_{RA}$ and $T_{Am}$ follow from example 0.3.2.1.2 and example 0.3.2.1.3. In one example, $R+T_{RA}=R-T_{proc,0}^{SL}$ and $m-T_{Am}=m-31$, hence $A2=\max(R-T_{proc,0}^{SL}, m-31)$. In another example, $R+T_{RA}=R-T_{proc,0}^{SL}+1$ and $m-T_{Am}=m-31$, hence $A2=\max(R-T_{proc,0}^{SL}+1, m-31)$.

In another example 0.3.2.1.8, slot A2 is the earliest in time of $R+T_{RA}$ and $m-T_{Am}$ i.e., $A2=\min(R+T_{RA}, m-T_{Am})$. Wherein, $T_{RA}$ and $T_{Am}$ follow from example 0.3.2.1.2 and example 0.3.2.1.3. In one example, $R+T_{RA}=R-T_{proc,0}^{SL}$ and $m-T_{Am}=m-31$, hence $A2=\min(R-T_{proc,0}^{SL}, m-31)$. In another example, $R+T_{RA}=R-T_{proc,0}^{SL}+1$ and $m-T_{Am}=m-31$, hence $A2=\min(R-T_{proc,0}^{SL}+1, m-31)$.

In another example 0.3.2.1.9, slot A2 is a function of $R+T_{RA}$ and $m-T_{Am}$. i.e., $A2=f(R+T_{RA}, m-T_{Am})$. Wherein, $T_{RA}$ and $T_{Am}$ follow from example 0.3.2.1.2 and example 0.3.2.1.3. In one example, $R+T_{RA}=R-T_{proc,0}^{SL}$ and $m-T_{Am}=m-31$, hence $A2=f(R-T_{proc,0}^{SL}, m-31)$. In another example, $R+T_{RA}=R-T_{proc,0}^{SL}+1$ and $m-T_{Am}=m-31$, hence $A2=f(R-T_{proc,0}^{SL}+1, m-31)$.

In another example 0.3.2.1.10, slot A2 is determined based on slot C, e.g., slot A2 is before slot C by time $T_{AC}$, i.e., $A2=C-T_{AC}$, wherein, $T_{AC}$ can be specified in system specifications and/or pre-configured and/or configured and/or updated by RRC signaling and/or MAC CE signaling and/or L1 control signaling. In one example, $T_{AC}$ can be in units of physical time (e.g., ms) or in units of physical slots. In another example, $T_{AC}$ can be in units of logical slots that can be in a resource pool. In another example, $T_{AC}$ can be in units of logical slots in a resource pool. In one example, $T_{AC}$ can depend on a UE capability. In one example, $T_{AC}$ can depend on the sub-carrier spacing of the SL bandwidth part (e.g., of the SL channels). In one example, the farthest aperiodic reservation that can be indicated in an SCI is after W logical slots from a slot of the SCI, $T_{AC}$ corresponds to the physical duration of W logical slots before slot C. Alternatively, $T_{AC}$ in logical slots is equal to W. In another example, time $T_{AC}$ is determined by UE's own implementation. In another example, $T_{AC}$ can be determined by the UE's implementation subject to the above constraints, e.g., not to be less than a higher layer configured threshold and/or not be less than a value that depends on a UE capability. In one example, W is 31 logical slots.

In another example 0.3.2.1.11, slot A2 is the furthest in time of $n+T_{nA}$ and $C-T_{AC}$. i.e., $A2=\max(n+T_{nA}, C-T_{AC})$. Wherein, $T_{nA}$ and $T_{AC}$ follow from example 0.3.2.1.1 and example 0.3.2.1.10.

In another example 0.3.2.1.12, slot A2 is the earliest in time of $n+T_{nA}$ and $C-T_{AC}$. i.e., $A2=\min(n+T_{nA}, C-T_{AC})$. Wherein, $T_{RA}$ and $T_{AC}$ follow from example 0.3.2.1.1 and example 0.3.2.1.10.

In another example 0.3.2.1.13, slot A2 is a function of $n+T_{nA}$ and $C-T_{AC}$. i.e., $A=f(n+T_{nA}, C-T_{AC})$. Wherein, $T_{nA}$ and $T_{AC}$ follow from example 0.3.2.1.1 and example 0.3.2.1.10.

In another example 0.3.2.1.14, slot A2 is the furthest in time of $R+T_{RA}$ and $C-T_{AC}$. i.e., $A2=\max(R+T_{RA}, C-T_{AC})$. Wherein, $T_{RA}$ and $T_{AC}$ follow from example 0.3.2.1.2 and example 0.3.2.1.10.

In another example 0.3.2.1.15, slot A2 is the earliest in time of $R+T_{RA}$ and $C-T_{AC}$. i.e., $A2=\min(R+T_{RA}, C-T_{AC})$. Wherein, $T_{RA}$ and $T_{AC}$ follow from example 0.3.2.1.2 and example 0.3.2.1.10.

In another example 0.3.2.1.16, slot A2 is a function of $R+T_{RA}$ and $C-T_{AC}$. i.e., $A=f(R+T_{RA}, C-T_{AC})$. Wherein, $T_{nA}$ and $T_{AC}$ follow from example 0.3.2.1.2 and example 0.3.2.1.10.

In another example 0.3.2.1.17, slot R is determined by UE's own implementation.

In another example 0.3.2.1.18, slot R is configured or indicated by higher layers.

In one example 0.3.2.2, slot B2 can be determined by one of the following examples.

In one example 0.3.2.2.1, slot B2 is determined based on slot m, e.g., slot B2 is before slot m by time $T_{Bm}$, i.e., $B2=m-T_{Bm}$, wherein, $T_{Bm}$ can be specified in system specifications and/or pre-configured and/or configured and/or updated by RRC signaling and/or MAC CE signaling and/or L1 control signaling. In one example, $T_{Bm}$ can be in units of physical time (e.g., ms) or in units of physical slots. In another example, $T_{Bm}$ can be in units of logical slots that can be in a resource pool. In another example, $T_{Bm}$ can be in units of logical slots in a resource pool. In one example, $T_{Bm}$ can depend on a UE capability. In one example, $T_{Bm}$ can depend on the sub-carrier spacing of the SL bandwidth part (e.g., of the SL channels). In another example, $T_{Bm}$ can be determined by the UE's implementation. In another example, $T_{Bm}$ can be determined by the UE's implementation subject to the above constraints, e.g., not to exceed a higher layer configured threshold and/or not to exceed a value that depends on a UE capability.

In one example 0.3.2.2.2, slot B2 is determined based on slot m, e.g., slot B2 is before slot m by time $T_{Bm}$, i.e., $B=m-T_{Bm}$, wherein, $T_{Bm} \leq T_{proc,0}^{SL}+T_{proc,1}^{SL}$ or $T_{Bm}=T_{proc,0}^{SL}+T_{proc,1}^{SL}$, or $T_{Bm}<T_{proc,0}^{SL}+T_{proc,1}^{SL}$, alternatively, $T_{Bm} \leq T_{proc,0}^{SL}+T_{proc,1}^{SL}+K$, wherein K is an additional latency. Wherein, $T_{proc,0}^{SL}$ is latency for sensing from the end of the sensing window last slot be sensed to the slot where re-evaluation check occurs, $T_{proc,1}^{SL}$ is latency between the slot where re-evaluation check occurs and slot m. In one example, the time between the slot of the re-evaluation check and slot m (where the SL transmission would take place) is denoted as $T_3$, wherein $T_3$ replaces $T_{proc,1}^{SL}$ in this example. In one example, $T_{proc,0}^{SL}$ and/or $T_{proc,1}^{SL}$ and/or K can depend on a UE capability. In one example, $T_{proc,0}^{SL}$ and/or $T_{proc,1}^{SL}$ and/or K can depend on the sub-carrier spacing of the SL bandwidth part (e.g., of the SL channels). In another example $T_{proc,0}^{SL}$ and/or $T_{proc,1}^{SL}$ and/or K can be specified in system specifications and/or pre-configured and/or configured and/or updated by RRC signaling and/or MAC CE signaling and/or L1 control signaling. In one example, $T_{proc,0}^{SL}$ and/or $T_{proc,1}^{SL}$ and/or K can be in units of physical time (e.g., ms) or in units of physical slots. In another example, $T_{proc,0}^{SL}$ and/or $T_{proc,1}^{SL}$ and/or K can be in units of logical slots that can be in a resource pool. In another example, $T_{proc,0}^{SL}$ and/or $T_{proc,1}^{SL}$ and/or K can be in units of logical slots in a resource pool. In one example, $T_{proc,0}^{SL}$ and/or $T_{proc,1}^{SL}$ can be the same as the corresponding parameters of re-evaluation check for full sensing. In another example, $T_{proc,0}^{SL}$ and/or $T_{proc,1}^{SL}$ can be separate parameters from those of re-evaluation check for full sensing. In another example, $T_{Bm}$ can be determined by the UE's implementation. In another example, $T_{Bm}$ can be determined by the UE's implementation subject to the above constraints, e.g., $T_{Bm} \leq T_{proc,0}^{SL}+T_{proc,1}^{SL}$ or $T_{Bm} \leq T_{proc,0}^{SL}+T_{proc,1}^{SL}+K$. Wherein, $T_{Bm}$, $T_{proc,0}^{SL}$, $T_{proc,1}^{SL}$ and K are converted to the same time unit, e.g., logical slots in a resource pool or physical time or physical slots. $T_{proc,0}^{SL}$ depends on sub-carrier spacing is as illustrated in TABLE 2. $T_{proc,1}^{SL}$ depends on sub-carrier spacing is as illustrated in TABLE 3.

In one example 0.3.2.2.3, slot B2 is determined based on slot C, e.g., slot B2 is before slot C by time $T_{BC}$, i.e., $B2=C-T_{BC}$, wherein, $T_{BC}$ can be specified in system specifications and/or pre-configured and/or configured and/or updated by RRC signaling and/or MAC CE signaling and/or L1 control signaling. In one example, $T_{BC}$ can be in units of physical time (e.g., ms) or in units of physical slots. In another example, $T_{BC}$ can be in units of logical slots that can be in a resource pool. In another example, $T_{BC}$ can be in units of logical slots in a resource pool. In one example, $T_{BC}$ can depend on a UE capability. In one example, $T_{BC}$ can depend on the sub-carrier spacing of the SL bandwidth part (e.g., of the SL channels). In another example, $T_{BC}$ can be determined by the UE's implementation. In another example, $T_{BC}$ can be determined by the UE's implementation subject to the above constraints, e.g., not to exceed a higher layer configured threshold and/or not to exceed a value that depends on a UE capability.

In one example 0.3.2.2.4, slot B2 is determined based on slot C, e.g., slot B2 is before slot C by time $T_{BS}$, i.e., $B2=C-T_{BC}$, wherein, $T_{BC}=T_{proc,0}^{SL}$. Wherein, $T_{proc,0}^{SL}$ is latency for sensing from the end of the sensing window last slot be sensed to the slot where re-evaluation check occurs, e.g., slot C. In one example, $T_{proc,0}^{SL}$ can depend on a UE capability. In one example, $T_{proc,0}^{SL}$ can depend on the sub-carrier spacing of the SL bandwidth part (e.g., of the SL channels). In another example, $T_{proc,0}^{SL}$ can be specified in system specifications and/or pre-configured and/or configured and/or updated by RRC signaling and/or MAC CE signaling and/or L1 control signaling. In one example, $T_{proc,0}^{SL}$ can be in units of physical time (e.g., ms) or in units of physical slots. In another example, $T_{proc,0}^{SL}$ can be in units of logical slots that can be in a resource pool. In another example, $T_{proc,0}^{SL}$ can be in units of logical slots in a resource pool. In one example, $T_{proc,0}^{SL}$ can be the same as the corresponding parameters of re-evaluation check for full sensing. In another example, $T_{proc,0}^{SL}$ can be a separate parameter from that of re-evaluation check for full sensing. In another example, $T_{BC}$ can be determined by the UE's implementation. In another example, $T_{BC}$ can be determined by the UE's implementation subject to the above constraints, e.g., $T_{BC} \leq$ UE's. Wherein, $T_{BS}$, and $T_{proc,0}^{SL}$ are converted to the same time unit, e.g., logical slots in a resource pool or physical time or physical slots. $T_{proc,0}^{SL}$ depends on sub carrier spacing is as illustrated in TABLE 2.

In one example 0.3.2.2.5, slot B2 is determined based on slot n, e.g., slot B2 is after slot n by a time $T_{nB}$, i.e., $B2=n+T_{nB}$, wherein, $T_{nB}$ can be specified in system specifications and/or pre-configured and/or configured and/or updated by RRC signaling and/or MAC CE signaling and/or L1 control signaling. In one example, $T_{nB}$ can be in units of physical time (e.g., ms) or in units of physical slots. In another example, $T_{nB}$ can be in units of logical slots that can be in a resource pool. In another example, $T_{nB}$ can be in units of logical slots in a resource pool. In one example, $T_{nB}$ can depend on a UE capability. In one example, $T_{nB}$ can depend on the sub-carrier spacing of the SL bandwidth part (e.g., of the SL channels). In another example, $T_{nB}$ can be determined by the UE's implementation. In another example, $T_{nB}$ can be determined by the UE's implementation subject to the above constraints, e.g., not to be less than a higher layer configured threshold and/or not to be less than a value that depends on a UE capability.

In one example 0.3.2.2.6, slot B2 is determined based on slot R, e.g., slot B2 is after slot R by a time $T_{RB}$, i.e., $B2=R+T_{RB}$, wherein, $T_{RB}$ can be specified in system specifications and/or pre-configured and/or configured and/or updated by RRC signaling and/or MAC CE signaling and/or L1 control signaling. In one example, $T_{RB}$ can be in units of physical time (e.g., ms) or in units of physical slots. In another example, $T_{RB}$ can be in units of logical slots that can be in a resource pool. In another example, $T_{RB}$ can be in units of logical slots in a resource pool. In one example, $T_{RB}$ can depend on a UE capability. In one example, $T_{RB}$ can depend on the sub-carrier spacing of the SL bandwidth part (e.g., of the SL channels). In another example, $T_{RB}$ can be determined by the UE's implementation. In another example, $T_{RB}$ can be determined by the UE's implementation subject to the above constraints, e.g., not to be less than a higher layer configured threshold and/or not to be less than a value that depends on a UE capability.

In one example 0.3.2.3, slot C can be the slot where the re-evaluation check takes place, slot C can be determined by one of the following examples.

In one example 0.3.2.3.1, slot C is determined based on slot m, e.g., slot C is before slot m by time $T_{Cm}$, i.e., $C=m-T_{Cm}$, wherein, $T_{Cm}$ can be specified in system specifications and/or pre-configured and/or configured and/or updated by RRC signaling and/or MAC CE signaling and/or L1 control signaling. In one example, the time between the slot of the re-evaluation check and slot m (where the SL transmission would take place) is denoted as $T_3$, i.e., $T_{Cm}=T_3$. In one example, $T_{Cm}$ can be in units of physical time (e.g., ms) or in units of physical slots. In another example, $T_{Cm}$ can be in units of logical slots that can be in a resource pool. In another example, $T_{Cm}$ can be in units of logical slots in a resource pool. In one example, $T_{Cm}$ can depend on a UE capability. In one example, $T_{Cm}$ can depend on the sub-carrier spacing of the SL bandwidth part (e.g., of the SL channels). In another example, $T_{Cm}$ can be determined by the UE's implementation. In another example, $T_{Cm}$ can be determined by the UE's implementation subject to the above constraints, e.g., not to exceed a higher layer configured threshold and/or not to exceed a value that depends on a UE capability. In another example, there is more than one re-evaluation check slot C determined by the UE's implementation. In another example, there is more than one re-evaluation check slot C determined by the UE's implementation, with one of the slots determined by $T_{Cm}$ as specified in system specifications/pre-configured/configured and/or determined by the UE's capability.

In one example 0.3.2.3.2, slot C is determined based on slot m, e.g., slot C is before slot m by time $T_{Cm}$, i.e., $C=m-T_{Cm}$, wherein, $T_{Bm}=T_{proc,1}^{SL}$. Wherein, $T_{proc,1}^{SL}$ is latency between the slot where re-evaluation check occurs and slot m. In one example, $T_{proc,1}^{SL}$ can depend on a UE capability. In one example, $T_{proc,1}^{SL}$ can depend on the sub-carrier spacing of the SL bandwidth part (e.g., of the SL channels). In another example $T_{proc,1}^{SL}$ can be specified in system specifications and/or pre-configured and/or configured and/or updated by RRC signaling and/or MAC CE signaling and/or L1 control signaling. In one example, $T_{proc,1}^{SL}$ can be in units of physical time (e.g., ms) or in units of physical slots. In another example, $T_{proc,1}^{SL}$ can be in units of logical slots that can be in a resource pool. In another example, $T_{proc,1}^{SL}$ can be in units of logical slots in a resource pool. In one example, $T_{proc,1}^{SL}$ can be the same as the corresponding parameters of re-evaluation check for full sensing. In another example, $T_{proc,1}^{SL}$ can be separate parameters from those of re-evaluation check for full sensing. In another example, $T_{Cm}$ can be determined by the UE's implementation. In another example, $T_{Cm}$ can be determined by the UE's implementation subject to the above constraints, e.g., $T_{Cm} \leq T_{proc,1}^{SL}$. Wherein, $T_{Cm}$, and $T_{proc,1}^{SL}$ are converted to the same time unit, e.g., logical slots in a resource pool or physical time or physical slots. In another example, there is more than one re-evaluation check slot C determined by the UE's implementation, with one of the slots determined by $T_{Cm}$ subject to the above constraints, e.g., nearest slot satisfying $T_{Cm} \leq T_{proc,1}^{SL}$ or nearest slot satisfying $T_{Cm} \geq T_{proc,1}^{SL}$. $T_{proc,1}^{SL}$ depends on sub-carrier spacing is as illustrated in TABLE 3.

In one example 0.3.2.3.3, slot C is determined based on slot n, e.g., slot C is after slot n by a time $T_{nC}$, i.e., $C=n+T_{nC}$, wherein, $T_{nC}$ can be specified in system specifications and/or pre-configured and/or configured and/or updated by RRC signaling and/or MAC CE signaling and/or L1 control signaling. In one example, $T_{nC}$ can be in units of physical time (e.g., ms) or in units of physical slots. In another example, $T_{nC}$ can be in units of logical slots that can be in a resource pool. In another example, $T_{nC}$ can be in units of logical slots in a resource pool. In one example, $T_{nC}$ can depend on a UE capability. In one example, $T_{nC}$ can depend on the sub-carrier spacing of the SL bandwidth part (e.g., of the SL channels). In another example, $T_{nC}$ can be determined by the UE's implementation. In another example, $T_{nC}$ can be determined by the UE's implementation subject to the above constraints, e.g., not to exceed a higher layer configured threshold and/or not to exceed a value that depends on a UE capability.

In one example 0.3.2.3.4, slot C is determined based on slot R, e.g., slot C is after slot R by a time $T_{RC}$, i.e., $C=R+T_{RC}$, wherein, $T_{RC}$ can be specified in system specifications and/or pre-configured and/or configured and/or updated by RRC signaling and/or MAC CE signaling and/or L1 control signaling. In one example, $T_{RC}$ can be in units of physical time (e.g., ms) or in units of physical slots. In another example, $T_{RC}$ can be in units of logical slots that can be in a resource pool. In another example, $T_{RC}$ can be in units of logical slots in a resource pool. In one example, $T_{RC}$ can depend on a UE capability. In one example, $T_{RC}$ can depend on the sub-carrier spacing of the SL bandwidth part (e.g., of the SL channels). In another example, $T_{RC}$ can be determined by the UE's implementation. In another example, $T_{RC}$ can be determined by the UE's implementation subject to the above constraints, e.g., not to exceed a higher layer configured threshold and/or not to exceed a value that depends on a UE capability.

In another example 0.3.3, as illustrated in FIG. 19, a first contiguous partial sensing window occurs before resource selection/re-selection (e.g., in slot R) as described in example 0.3.1, and a second contiguous partial sensing window occur before a slot m for each SL transmission or would-be SL transmission in each slot m. A slot C can be associated with each SL transmission or would-be SL transmission in a slot m, wherein a slot C can be the slot of a re-evaluation check or pre-emption check for a SL transmission in slot m. Slot C can be determined following the example/sub-examples of example 0.3.2.3. The second contiguous partial sensing window can start in slot A2 and end in slot B2. Wherein, slot A2 can be determined following the example/sub-examples of example 0.3.2.1, and slot B2 can be determined following the example/sub-examples of example 0.3.2.2 for each SL transmission or would-be SL transmission in a slot m and corresponding re-evaluation or pre-emption slot C. In one example, the more than one second contiguous partial sensing window can partially overlap, wherein a group overlapping windows are merged into a second contiguous partial sensing window starting at the earliest starting time of a second contiguous partial sensing window in the group of overlapping second contiguous partial sensing windows, and ending at the latest ending time of a second contiguous partial sensing window in the group of overlapping second contiguous partial sensing windows. In another example, contiguous partial sensing windows don't overlap or partially overlap.

Figure 20:
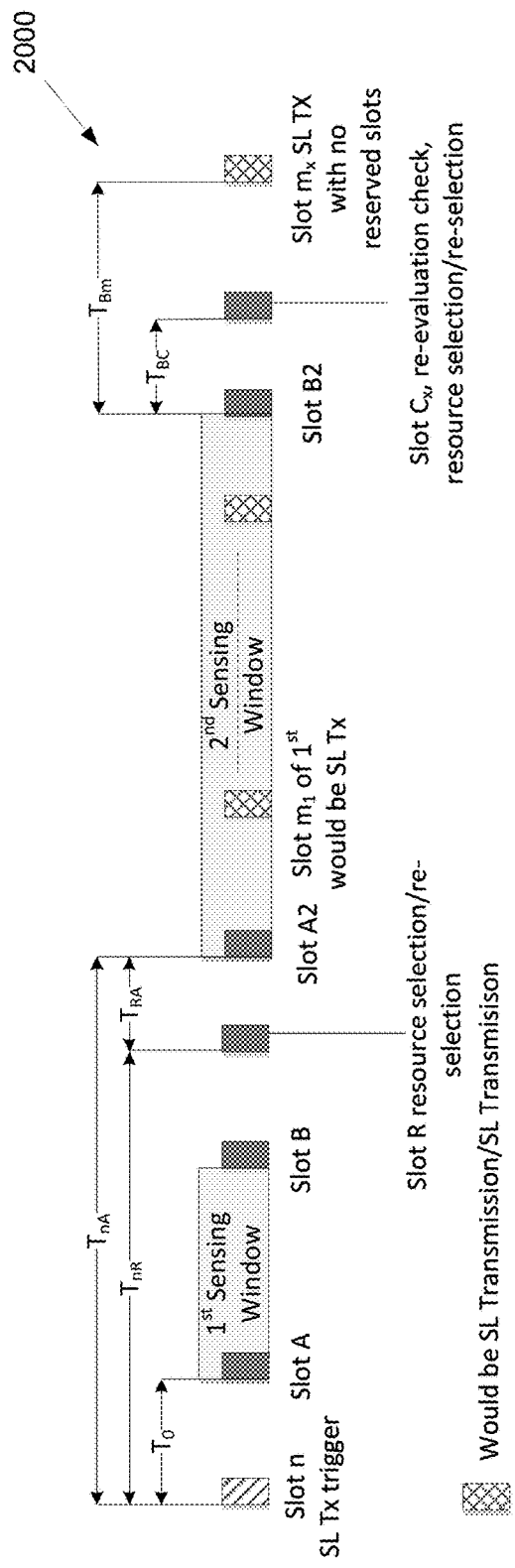

FIG. 20 illustrates yet another example of contiguous partial sensing operation 2000 according to embodiments of the present disclosure. An embodiment of the contiguous partial sensing operation 2000 shown in FIG. 20 is for illustration only.

In another example 0.3.4, as illustrated in FIG. 20, a first contiguous partial sensing window occurs before resource selection/re-selection (e.g., in slot R) as described in example 0.3.1, a second contiguous partial sensing window starting in slot A2, continues until slot B2 with no further (re-)transmissions that have been previously reserved. After the initial resource selection for a SL resource that has not been previously signaled a second contiguous partial sensing window starts in slot A2.

Wherein, slot A2 is determined as described in example 0.3.2.1 based on one or more of the following: (1) slot n, where the SL transmission (resource selection/re-selection procedure) is triggered by higher layers; (2) slot R, where initial SL resource selection/re-selection and candidate resources determination/reporting to higher layers occurs; and (3) slot $m_1$, where the first would-be SL transmission can occur (in one example $m_1$ is $t'_{y,0}^{SL}$ first of the Y candidate slots); (4) slot $C_1$, where the re-evaluation check for the first would-be SL transmission can occur.

The second contiguous partial sensing window continues until slot B2 determined by one of the following: (1) no more SL resources can be selected because of the end of the resource selection window and/or the packet delay budget would-be exceeded; and (2) the transmission of a SL resource with no additional reserved resources. This is illustrated in FIG. 20. The second sensing window starts before slot $m_1$ of the first would-be SL transmission and until before slot $m_x$ of the last SL transmission with no reserved resources. If the transmission of a SL resources with no additional reserved resources is in slot $m_x$, and the re-evaluation or pre-emption check of the corresponding resource is in slot $C_x$, the sensing window ends in slot B2. Wherein, slot B2 can be determined following the example/sub-examples of example 0.3.2.2, and slot C, can be determined following the example/sub-examples of example 0.3.2.3.

In one example 0.3.4.1, a SL (re-)transmission in slot $m_x$, with no additional reserved resource can happen when the SL (re-)transmission in slot $m_x$ reaches the maximum number of re-transmissions.

In another example 0.3.4.2, a SL (re-)transmission in slot $m_x$, with no additional reserved resource can happen when the SL (re-)transmission in slot $m_x$ reaches the maximum number of re-transmissions, and there no new transmission to reserve resources for.

In another example 0.3.4.3, a SL (re-)transmission in slot $m_x$, with no additional reserved resource can happen when there are no available resources in the resource selection window to reserve for a future SL transmission.

In another example 0.3.4.4, a SL (re-)transmission in slot $m_x$, with no additional reserved resource can happen when there are no available resources within the packet delay budget to reserve for a future SL transmission.

Figure 21:
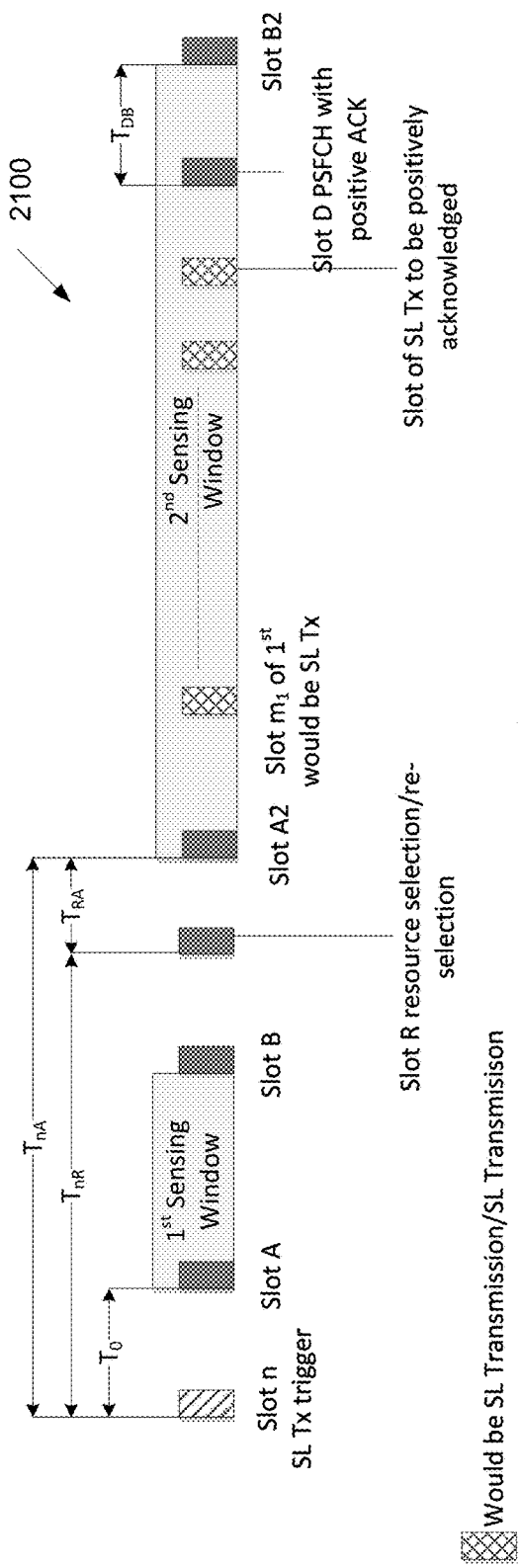

FIG. 21 illustrates yet another example of contiguous partial sensing operation 2100 according to embodiments of the present disclosure. An embodiment of the contiguous partial sensing operation 2100 shown in FIG. 21 is for illustration only.

In another example 0.3.5, as illustrated in FIG. 21, a first contiguous partial sensing window occurs before resource selection/re-selection (e.g., in slot R) as described in example 0.3.1, a second contiguous partial sensing window starting in slot A2, continues until slot B2 with no further (re-)transmissions. After the initial resource selection for a SL resource that has not been previously signaled a second contiguous partial sensing window starts in slot A2.

Wherein, slot A2 is determined as described in example 0.3.2.1 based on one or more of the following: (1) slot n, where the SL transmission (resource selection/re-selection procedure) is triggered by higher layers; (2) slot R, where initial SL resource selection/re-selection and candidate resources determination/reporting to higher layers occurs; (3) slot $m_1$, where the first would-be SL transmission can occur (in one example $m_1$ is $t'_{y,0}{}^{SL}$ first of the Y candidate slots); and (4) slot $C_1$, where the re-evaluation check for the first would-be SL transmission can occur.

The second contiguous partial sensing window continues until slot B2 determined by: a SL transmission is positively acknowledged. The sensing window ends after the reception of the positive acknowledgement. This is illustrated in FIG. 21. In this example, the slot of the PSFCH resource that can indicate, implicitly or explicitly a positive acknowledgment is slot D. The sensing window ends in slot B2, wherein, $B2=D+T_{DB}$, wherein, $T_{DB}$ can be specified in system specifications and/or pre-configured and/or configured and/or updated by RRC signaling and/or MAC CE signaling and/or L1 control signaling. In one example, $T_{DB}$ can be in units of physical time (e.g., ms) or in units of physical slots. In another example, $T_{DB}$ can be in units of logical slots that can be in a resource pool. In another example, $T_{DB}$ can be in units of logical slots in a resource pool. In one example, $T_{DB}$ can depend on a UE capability. In one example, $T_{DB}$ can depend on the sub-carrier spacing of the SL bandwidth part (e.g., of the SL channels). In another example, $T_{DB}$ can be determined by the UE's implementation. In another example, $T_{DB}$ can be determined by the UE's implementation subject to the above constraints, e.g., not to exceed a higher layer configured threshold and/or not to exceed a value that depends on a UE capability. In another example, $T_{DB}$ can be determined by the UE's implementation subject to the above constraints, e.g., not to be less than a higher layer configured threshold and/or not to be less than a value that depends on a UE capability. In one alternative, sensing ends after a UE receives an indication (implicit or explicit) of the successful reception of the pervious (re-)transmission. In a second alternative, sensing ends after a UE receives an indication (implicit or explicit) of the successful reception of the pervious (re-)transmission and there are no new SL transmissions, i.e., last packet in a sequence of packets.

Figure 22:
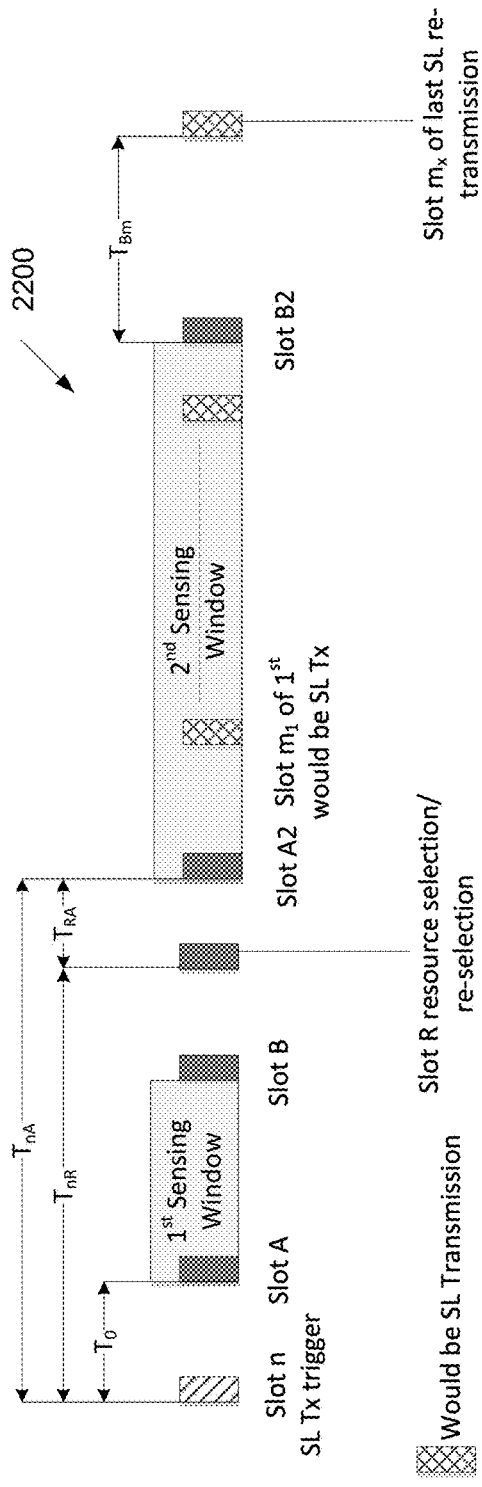

FIG. 22 illustrates yet another example of contiguous partial sensing operation 2200 according to embodiments of the present disclosure. An embodiment of the contiguous partial sensing operation 2200 shown in FIG. 22 is for illustration only.

In another example 0.3.6, as illustrated in FIG. 22, a first contiguous partial sensing window occurs before resource selection/re-selection (and candidate resources determination/reporting to higher layers) (e.g., in slot R) as described in example 0.3.1, a second contiguous partial sensing window starting in slot A2, continues until slot B2. After the initial resource selection for a SL resource that has not been previously signaled a second contiguous partial sensing window starts in slot A2.

Wherein, slot A2 is determined as described in example 0.3.2.1 based on one or more of the following: (1) slot n, where the SL transmission (resource selection/re-selection procedure) is triggered by higher layers; (2) slot R, where initial SL resource selection/re-selection and candidate resources determination/reporting to higher layers occurs; (3) slot $m_1$, where the first would-be SL transmission can occur (in one example $m_1$ is $t'_{y,0}{}^{SL}$ first of the Y candidate slots); and (4) slot $C_1$, where the re-evaluation check for the first would-be SL transmission can occur.

The second contiguous partial sensing window continues until slot B2 determined by: a SL transmission with or without HARQ-ACK feedback, has a maximum number of re-transmissions. The sensing window ends before the last HARQ re-transmission. This is illustrated in FIG. 22. In this example, the slot of the last HARQ re-transmission is slot $m_x$. The sensing window ends in slot B2, wherein, $B2=m_x-T_{Bm}$, wherein, $T_{Bm}$ can be specified in system specifications and/or pre-configured and/or configured and/or updated by RRC signaling and/or MAC CE signaling and/or L1 control signaling. Slot B2 is before the slot of the re-evaluation check or pre-emption check of the last HARQ re-transmission, $T_{Bm}$ can be determined in part based on $T_{proc,0}{}^{SL}$. In one example, $T_{Bm}$ can be in units of physical time (e.g., ms) or in units of physical slots. In another example, $T_{Bm}$ can be in units of logical slots that can be in a resource pool. In another example, $T_{Bm}$ can be in units of logical slots in a resource pool. In one example, $T_{Bm}$ can depend on a UE capability. In one example, $T_{Bm}$ can depend on the sub-carrier spacing of the SL bandwidth part (e.g., of the SL channels). In another example, $T_{Bm}$ can be determined by the UE's implementation. In another example, $T_{Bm}$ can be determined by the UE's implementation subject to the above constraints, e.g., not to exceed a higher layer configured threshold and/or not to exceed a value that depends on a UE capability. In another example, $T_{Bm}$ can be determined by the UE's implementation subject to the above constraints, e.g., not to be less than a higher layer configured threshold and/or not to be less than a value that depends on a UE capability. In one alternative, sensing ends before a UE transmits the last HARQ re-transmission. In a second alternative, sensing ends before a UE transmits the last HARQ re-transmission and there are no new SL transmissions, i.e., last packet in a sequence of packets.

Figure 23:
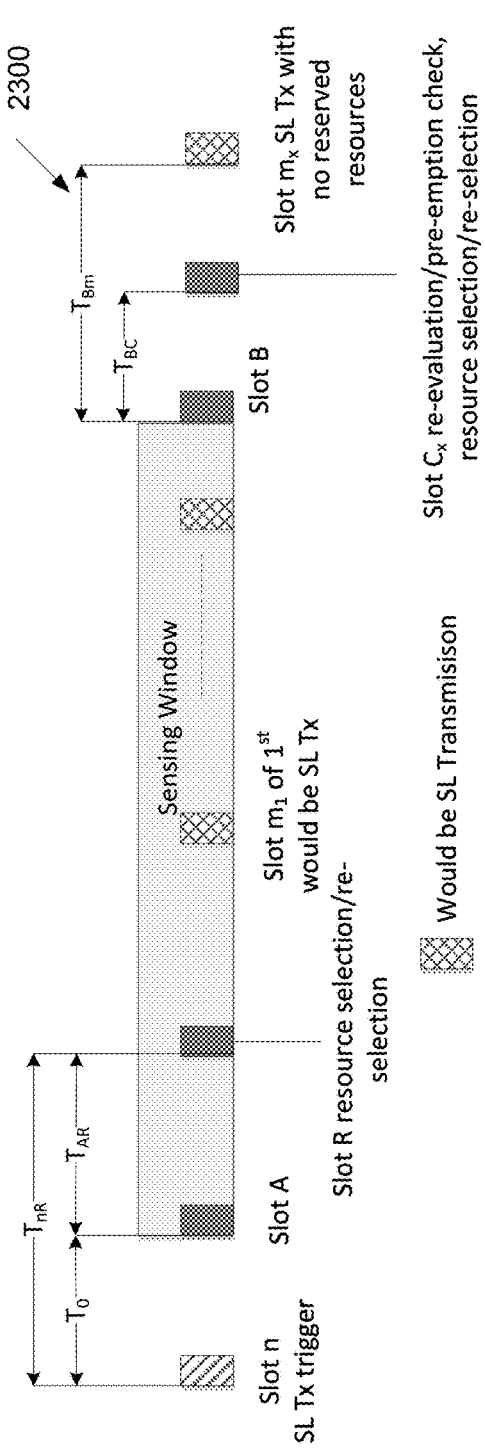

FIG. 23 illustrates yet another example of contiguous partial sensing operation 2300 according to embodiments of the present disclosure. An embodiment of the contiguous partial sensing operation 2300 shown in FIG. 23 is for illustration only.

In another example 0.3.7, as illustrated in FIG. 23, a contiguous partial sensing starts in slot A, and ends before slot B, i.e., the contiguous partial sensing window is in the range [A, B). Alternatively, contiguous partial sensing starts in slot A, and ends on or before slot B, i.e., the contiguous partial sensing window is in the range [A, B]. The contiguous partial sensing window starting in slot A, continues until slot B with no further (re-)transmissions that have been previously reserved.

Wherein, slot A is determined as described in example 0.3.1.1 based on one or more of the following: (1) slot n, where the SL transmission (resource selection/re-selection procedure) is triggered by higher layers; and (2) slot R, where initial SL resource selection/re-selection and candidate resources determination/reporting to higher layers occurs.

The contiguous partial sensing window continues until slot B determined by one of the following: (1) no more SL resources can be selected because of the end of the resource selection window and/or the packet delay budget would-be exceeded; and (2) the transmission of a SL resource with no additional reserved resources. This is illustrated in FIG. 23. The sensing window ends before slot $m_x$ of the last SL transmission with no reserved resources. If the transmission of a SL resources with no additional reserved resources is in slot $m_x$, and the re-evaluation or pre-emption check of the corresponding resource is in slot $C_x$, the sensing window ends in slot B. Wherein, slot B can be determined following the example/sub-examples of example 0.3.2.2, and slot $C_x$ can be determined following the example/sub-examples of example 0.3.2.3.

In one example 0.3.7.1, a SL (re-)transmission in slot $m_x$, with no additional reserved resource, can happen when the SL (re-)transmission in slot $m_x$ reaches the maximum number of re-transmissions.

In another example 0.3.7.2, a SL (re-)transmission in slot $m_x$, with no additional reserved resource, can happen when the SL (re-)transmission in slot $m_x$ reaches the maximum number of re-transmissions, and there no new transmission to reserve resources for.

In another example 0.3.7.3, a SL (re-)transmission in slot $m_x$, with no additional reserved resource, can happen when there are no available resources in the resource selection window to reserve for a future SL transmission.

In another example 0.3.7.4, a SL (re-)transmission in slot $m_x$, with no additional reserved resource, can happen when there are no available resources within the packet delay budget to reserve for a future SL transmission.

Figure 24:
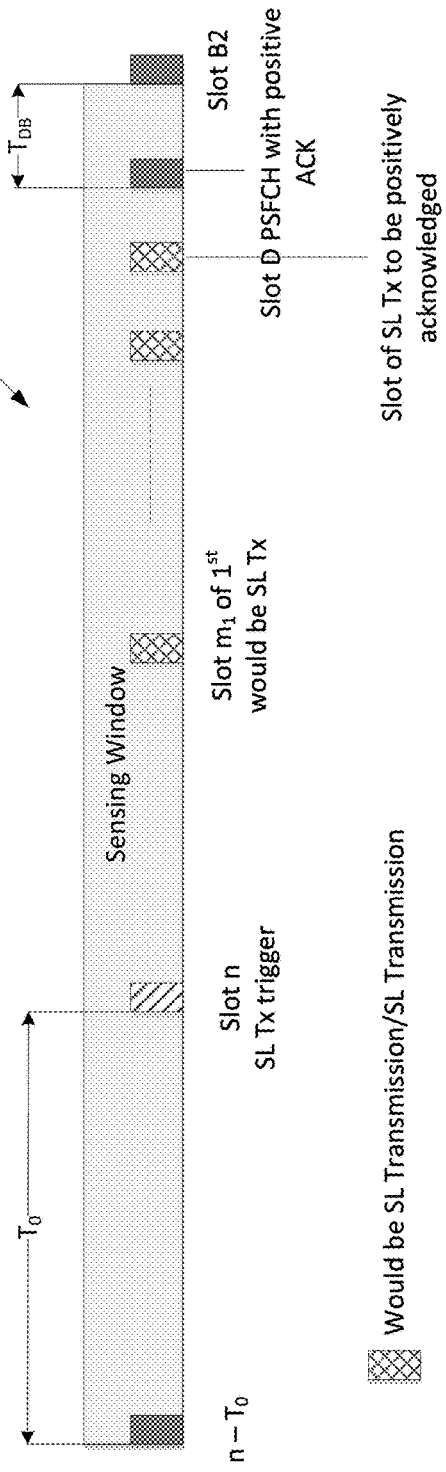

FIG. 24 illustrates yet another example of contiguous partial sensing operation 2400 according to embodiments of the present disclosure. An embodiment of the contiguous partial sensing operation 2400 shown in FIG. 24 is for illustration only.

In another example 0.3.8, as illustrated in FIG. 24, a contiguous partial sensing starts in slot A, and ends before slot B, i.e., the contiguous partial sensing window is in the range [A, B). Alternatively, contiguous partial sensing starts in slot A, and ends on or before slot B, i.e., the contiguous partial sensing window is in the range [A, B]. The contiguous partial sensing window starting in slot A, continues until slot B with no further (re-)transmissions.

Wherein, slot A is determined as described in example 0.3.1.1 based on one or more of the following: (1) slot n, where the SL transmission (resource selection/re-selection procedure) is triggered by higher layers; and (2) slot R, where initial SL resource selection/re-selection and candidate resources determination/reporting to higher layers occurs.

The contiguous partial sensing window continues until slot B determined by a SL transmission that is positively acknowledged. The sensing window ends after the reception of the positive acknowledgement. This is illustrated in FIG. 24. In this example, the slot of the PSFCH resource that can indicate, implicitly or explicitly a positive acknowledgment is slot D. The sensing window ends in slot B2, wherein, B2=D+$T_{DB}$, wherein, $T_{DB}$ can be specified in system specifications and/or pre-configured and/or configured and/or updated by RRC signaling and/or MAC CE signaling and/or L1 control signaling. In one example, $T_{DB}$ can be in units of physical time (e.g., ms) or in units of physical slots. In another example, $T_{DB}$ can be in units of logical slots that can be in a resource pool. In another example, $T_{DB}$ can be in units of logical slots in a resource pool. In one example, $T_{DB}$ can depend on a UE capability. In one example, $T_{DB}$ can depend on the sub-carrier spacing of the SL bandwidth part (e.g., of the SL channels). In another example, $T_{DB}$ can be determined by the UE's implementation. In another example, $T_{DB}$ can be determined by the UE's implementation subject to the above constraints, e.g., not to exceed a higher layer configured threshold and/or not to exceed a value that depends on a UE capability. In another example, $T_{DB}$ can be determined by the UE's implementation subject to the above constraints, e.g., not to be less than a higher layer configured threshold and/or not to be less than a value that depends on a UE capability. In one alternative, sensing ends after a UE receives an indication (implicit or explicit) of the successful reception of the pervious (re-)transmission. In a second alternative, sensing ends after a UE receives an indication (implicit or explicit) of the successful reception of the pervious (re-)transmission and there are no new SL transmissions, i.e., last packet in a sequence of packets.

Figure 25:
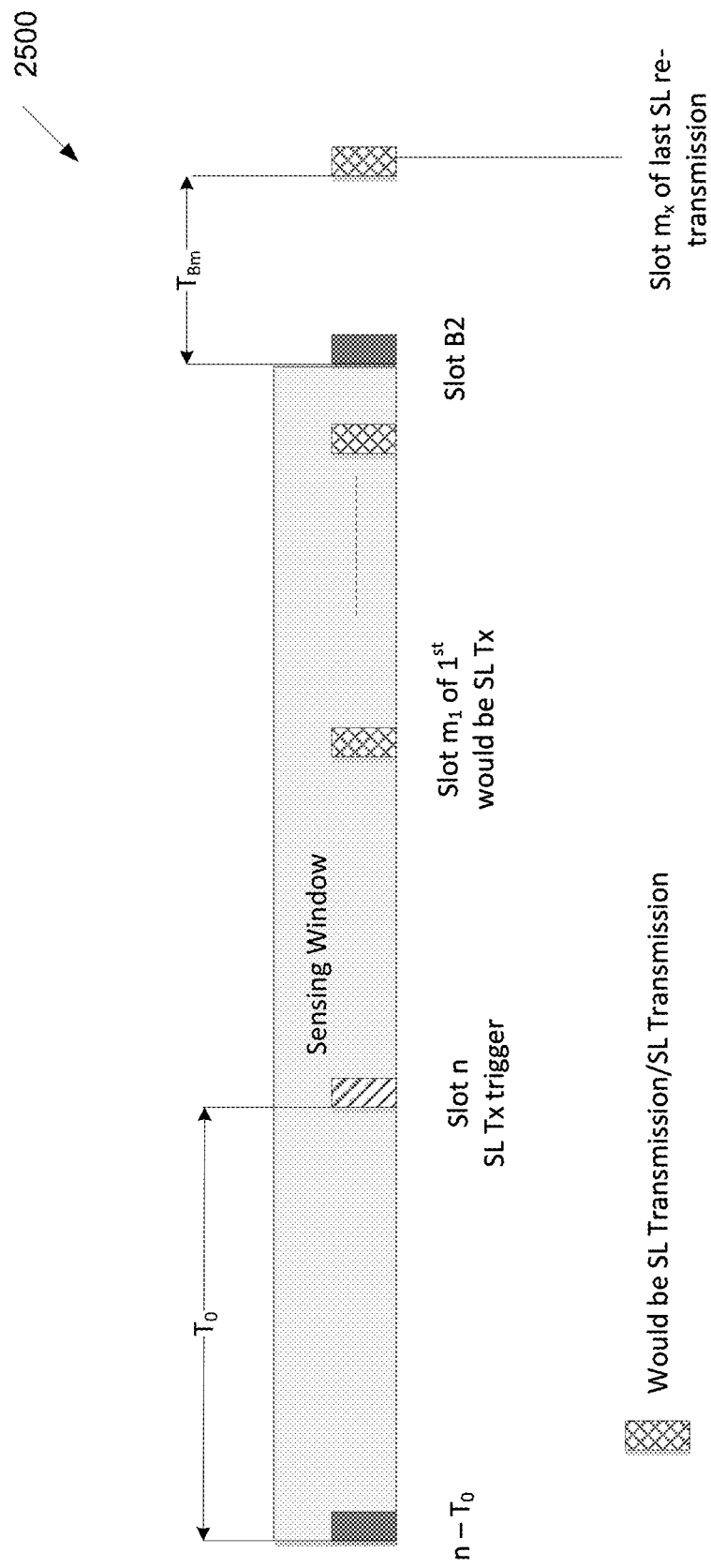

FIG. 25 illustrates yet another example of contiguous partial sensing operation 2500 according to embodiments of the present disclosure. An embodiment of the contiguous partial sensing operation 2500 shown in FIG. 25 is for illustration only.

In another example 0.3.9, as illustrated in FIG. 25, a contiguous partial sensing starts in slot A, and ends before slot B, i.e., the contiguous partial sensing window is in the range [A, B). Alternatively, contiguous partial sensing starts in slot A, and ends on or before slot B, i.e., the contiguous partial sensing window is in the range [A, B]. The contiguous partial sensing window starting in slot A, continues until slot B with no further (re-)transmissions.

Wherein, slot A is determined as described in example 0.3.1.1 based on one or more of the following: (1) slot n, where the SL transmission (resource selection/re-selection procedure) is triggered by higher layers; and (2) slot R, where initial SL resource selection/re-selection and candidate resources determination/reporting to higher layers occurs.

The contiguous partial sensing window continues until slot B determined by a SL transmission with or without HARQ-ACK feedback, has a maximum number of re-transmissions. The sensing window ends before the last HARQ re-transmission. This is illustrated in FIG. 25. In this example, the slot of the last HARQ re-transmission is slot $m_x$. The sensing window ends in slot B2, wherein, B2=$m_x$−$T_{Bm}$, wherein, $T_{Bm}$ can be specified in system specifications and/or pre-configured and/or configured and/or updated by RRC signaling and/or MAC CE signaling and/or L1 control signaling. Slot B2 is before the slot of the re-evaluation check or pre-emption check of the last HARQ re-transmission, $T_{Bm}$ can be determined in part based on $T_{proc,0}^{SL}$. In one example, $T_{Bm}$ can be in units of physical time (e.g., ms) or in units of physical slots. In another example, $T_{Bm}$ can be in units of logical slots that can be in a resource pool. In another example, $T_{Bm}$ can be in units of logical slots in a resource pool. In one example, $T_{Bm}$ can depend on a UE capability. In one example, $T_{Bm}$ can depend on the sub-carrier spacing of the SL bandwidth part (e.g., of the SL channels). In another example, $T_{Bm}$ can be determined by the UE's implementation. In another example, $T_{Bm}$ can be determined by the UE's implementation subject to the above constraints, e.g., not to exceed a higher layer configured threshold and/or not to exceed a value that depends on a UE capability. In another example, $T_{Bm}$ can be determined by the UE's implementation subject to the above constraints, e.g., not to be less than a higher layer configured threshold and/or not to be less than a value that depends on a UE capability. In one alternative, sensing ends before a UE transmits the last HARQ re-transmission. In a second alternative, sensing ends before a UE transmits the last HARQ re-transmission and there are no new SL transmissions, i.e., last packet in a sequence of packets.

In another example 0.3.10, consider a SL transmission would occur in slot $m_i$ and in slot $m_{i+1}$ with no other SL transmission occurring between slots $m_i$ and $m_{i+1}$. The sensing window for re-evaluation/pre-emption check for a transmission in slot $m_i$, extends between slots $A_i$ and $B_i$, i.e., $[A_i, B_i]$ or $[A_i, B_i)$. The sensing window for re-evaluation/pre-emption check for a transmission in slot $m_{i+1}$, extends between slots $A_{i+1}$ and $B_{i+1}$, i.e., $[A_{i+1}, B_{i+1}]$ or $[A_{i+1}, B_{i+1})$. In one example, if the sensing window is $[A_i, B_i]$ and $[A_{i+1}, B_{i+1}]$, $A_{i+1} > B_i$. In another example, if the sensing window is $[A_i, B_i)$ and $[A_{i+1}, B_{i+1})$, $A_{i+1} \geq B_i$. In one example, if $m_{i+1}$ is determined before the re-evaluation/pre-emption check of $m_i$, according to 0.3.2.2.2, $B_i = m_i - T_{proc,0}^{SL} - T_{proc,1}^{SL}$ and $A_{i+1}$ starts 31 logical slots before $m_{i+1}$, hence $A_{i+1} = \max(B_i+1, m_{i+1}-31)$ (i.e., $\max(m_i-T_{proc,0}^{SL}-T_{proc,1}^{SL}+1, m_{i+1}-31)$), or $A_{i+1} = \max(B_i, m_{i+1}-31)$ (i.e., $\max(m_i-T_{proc,0}^{SL}-T_{proc,1}^{SL}, m_{i+1}-31)$). In another example, $m_{i+1}$ is determined during the re-evaluation/pre-emption check of slot $m_i$, the sensing window for $m_{i+1}$ can only start in the slot after the slot for which the re-evaluation/pre-emption check for slot $m_i$ has occurred, i.e., slot $m_i - T_{proc,1}^{SL}$ (or $m_i - T_3$), therefore $A_{i+1} = \max(m_i - T_{proc,1}^{SL}+1, m_{i+1}-31)$ or $A_{i+1} = \max(m_i - T_{proc,0}^{SL}, m_{i+1}-31)$.

In another example 0.3.11, as a variant of the sub-examples of example 0.3 (i.e., examples 0.3.1 to 0.3.9), the first sensing window can start before slot n, i.e., the quantity $T_0$ is a negative value.

In the examples and sub-examples of example 0.x, a size of the contiguous partial sensing window for sensing, before resource selection/re-selection and/or re-evaluation check and/or pre-emption check, can be specified in system specifications and/or pre-configured and/or configured and/or updated by RRC signaling and/or MAC CE signaling and/or L1 control signaling. In one example, the sensing window size can be in units of physical time (e.g., ms) or in units of physical slots. In another example, the sensing window size can be in units of logical slots that can be in a resource pool. In another example, the sensing window size can be in units of logical slots in a resource pool. In one example, the sensing window size can depend on a UE capability and/or a power configuration setting (e.g., can be pre-configured and/or configured by higher layers). In one example, the sensing window size can depend on the sub-carrier spacing of the SL bandwidth part (e.g., of the SL channels). In another example, the sensing window size can be determined by the UE's implementation. In another example, the sensing window size can be determined by the UE's implementation subject to the above constraints, e.g., not to be less than a higher layer configured value and/or not to be less than a value that depends on a UE capability and/or a power configuration setting. In another example, the sensing window size can be determined by the UE's implementation subject to the above constraints, e.g., not to exceed a higher layer configured value and/or not to exceed a value that depends on a UE capability and/or a power configuration setting. A power configuration setting is a pre-configured and/or configured value that determines the power consumption level for sensing and hence can control the sensing parameters such as the sensing window size.

TABLE 4 shows for resource pools with and without periodic reservations, and for different traffic types (periodic or aperiodic) the type of sensing that can be performed for initial resource/re-selection and for re-evaluation check and per-emption check.

TABLE 4

Type of sensing with different resource pool types and different traffic types

| Resource Pool | Traffic Type | Sensing |
|---|---|---|
| With periodic reservations | Periodic | Slot n is where SL transmission (resource selection/re-selection procedure) is triggered. Slot R is where SL resource selection/re-selection and candidate resources determination/reporting to higher layers occurs. One of {Random resource selection, Example 1, Example 2, Example 3, Example 4, Example 5 or Example 6 for initial resource selection} + one of {no re-evaluation check/pre-emption check, Example 7, Example 8, Example 9 for re-evaluation/pre-emption check}. Example 1: Resource selection/re-selection in slot n. Periodic-based partial sensing and contiguous partial sensing before slot n. Example 2: Resource selection/re-selection in slot R. Slot R after slot n. Periodic-based partial sensing, and contiguous partial sensing starts before or after slot n. Example 3: Resource selection/re-selection in slot n. Periodic-based partial sensing before slot n. Example 4: Resource selection/re-selection in slot R. Periodic-based partial sensing can start before or after slot n. Example 5: Resource selection/re-selection in slot n. Contiguous partial sensing before slot n. Example 6: Resource selection/re-selection in slot R. Contiguous partial sensing can start before or after slot n. |

TABLE 4-continued

Type of sensing with different resource pool types and different traffic types

| Resource Pool | Traffic Type | Sensing |
|---|---|---|
| With periodic reservations | Aperiodic | Example 7: Contiguous partial sensing and periodic-based partial sensing for re-evaluation check and/or pre-emption check.<br>Example 8: Periodic-based partial sensing for re-evaluation check and/or pre-emption check.<br>Example 9: Contiguous partial sensing for re-evaluation check and/or pre-emption check.<br>Slot n is where SL transmission (resource selection/re-selection procedure) is triggered.<br>Slot R is where SL resource selection/re-selection and candidate resources determination/reporting to higher layers occurs.<br>One of {Random resource selection, Example 1, Example 2 or Example 3 for initial resource selection} + one of {no re-evaluation check/pre-emption check, Example 4, Example 5, Example 6 for re-evaluation/pre-emption check}.<br>Example 1: Resource selection/re-selection in slot R. Slot R after slot n.<br>Periodic-based partial sensing, and contiguous partial sensing starts before or after slot n.<br>Example 2: Resource selection/re-selection in slot R. Periodic-based partial sensing can start before or after slot n.<br>Example 3: Resource selection/re-selection in slot R. Contiguous partial sensing can start before or after slot n.<br>Example 4: Contiguous partial sensing and periodic-based partial sensing for re-evaluation check and/or pre-emption check.<br>Example 5: Periodic-based partial sensing for re-evaluation check and/or pre-emption check.<br>Example 6: Contiguous partial sensing for re-evaluation check and/or pre-emption check. |
| Without periodic reservations | Periodic | Slot n is where SL transmission (resource selection/re-selection procedure) is triggered.<br>Slot R is where SL resource selection/re-selection and candidate resources determination/reporting to higher layers occurs.<br>One of {Random resource selection, Example 1 or Example 2 for initial resource selection} + one of {no re-evaluation check/pre-emption check or Example 3 for re-evaluation/pre-emption check}.<br>Example 1: Resource selection/re-selection in slot n. Contiguous partial sensing before slot n.<br>Example 2: Resource selection/re-selection in slot R. Slot R after slot n.<br>Contiguous partial sensing starts before or after slot n.<br>Example 3: Contiguous partial sensing for re-evaluation check and/or pre-emption check. |
| Without periodic reservations | Aperiodic | Slot n is where SL transmission (resource selection/re-selection procedure) is triggered.<br>Slot R is where SL resource selection/re-selection and candidate resources determination/reporting to higher layers occurs.<br>One of {Random resource selection or Example 1 for initial resource selection} + one of {no re-evaluation check/pre-emption check or Example 2 for re-evaluation/pre-emption check}.<br>Example 1: Resource selection/re-selection in slot R. Slot R after slot n.<br>Contiguous partial sensing starts before or after slot n.<br>Example 2: Contiguous partial sensing for re-evaluation check and/or pre-emption check. |

In one embodiment of Component 1, resource pool with periodic reservations and UE with periodic traffic is provided.

In one example, a UE is configured with a resource pool with periodic reservations. The UE is further configured to transmit periodic traffic. The periodicity of the periodic traffic is $T_{per}$ slots.

In one example 1.1.1, $T_{per}$ slots is given in number of physical slots.

In another example 1.1.2, $T_{per}$ slots is given as the corresponding physical time duration e.g., in units of ms.

In another example 1.1.3, $T_{per}$ slots is given in number of logical slots that can be in a resource pool.

In another example 1.1.4, $T_{per}$ slots is given in number of logical slots that are in a resource pool.

A resource pool can be configured with one or more periodic reservation periods given by higher layer parameter sl-ResourceReservationPeriodList.

For the identification of the candidate resources for resource selection/reselection for a UE operating in power saving mode, sensing can be performed (or not performed) at least based on one of the following: (1) periodic-based partial sensing, wherein the sensing is performed repeatedly at periodic intervals; (2) contiguous partial sensing, wherein sensing is one shot aperiodic sensing; and (3) random resource selection, wherein the identification of the candidate resources is performed with no sensing.

In one example 1.2, a UE is triggered by higher layers in slot n for resource selection/reselection, e.g., for identification of candidate resources for resource selection/reselection.

In one example 1.2.1, slot n is a physical slot number.

In another example 1.2.2, slot n corresponds to logical slot index $t_n^{SL}$ of a slot that can be in a resource pool.

In another example 1.2.3, slot n corresponds to logical slot index $t'_n^{SL}$ of a slot that is in a resource pool.

In one example 1.2.4, a UE is provided or determines (1) slot n for resource selection/reselection and (2) a periodicity $T_{per}$ for periodic traffic. The UE determines the slots for resource/reselection for future periods as: for example, for a future period i, wherein i=1, 2, . . . the slot for resource selection/reselection is $n_i$, wherein $n_i=n+i \times T_{per}$.

A UE can determine sensing occasions for future resource selection/re-selection slots.

In one example 1.2.4.1, n is a physical slot number and $T_{per}$ is provided or configured in number of physical slots or in a physical duration scaled by the slot duration. Alternatively, $T_{per}$ is provided in a different time unit and is converted to physical slots.

In another example 1.2.4.2, n corresponds to a logical slot $t_n^{SL}$ that can be in a resource pool. If n is provided as a physical slot that is not in the slots that can be in a resource pool, the logical slot is the next (or pervious) slot after (or before) slot n that can be in a resource pool. $T'_{per}$ is the duration in logical slots that can be in a resource pool. $T'_{per}$ is provided or configured in logical slots that can be in a resource pool, or is provided or configured in a different time unit and is converted to logical slots that can be in a resource pool.

In another example 1.2.4.3, n corresponds to a logical slot $t'_n^{SL}$ that is within a resource pool. If n is provided as a physical slot (or a logical slot that can be in a resource pool) and that is not in the slots that are within the resource pool, the logical slot is the next (or pervious) slot after (or before) slot n that is within the resource pool. $T'_{per}$ is the duration in logical slots that is within a resource pool. $T'_{per}$ is provided or configured in logical slots that is within a resource pool, or is provided or configured in a different time unit and is converted to logical slots that is within a resource pool.

Figure 26:
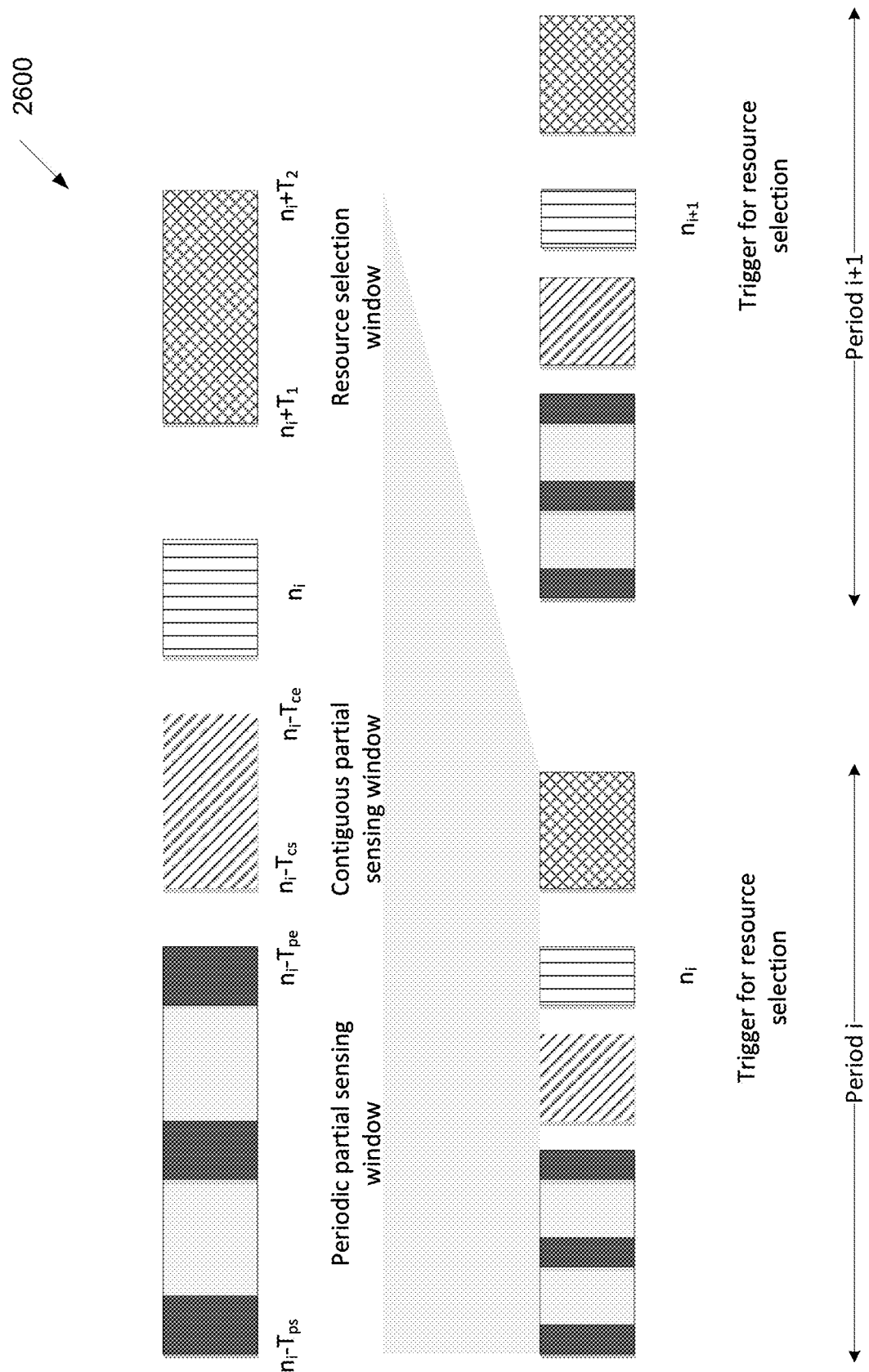
FIG. 26 illustrates an example of sensing windows for a UE according to embodiments of the present disclosure.

FIG. 26 illustrates an example of sensing windows for a UE 2600 according to embodiments of the present disclosure. An embodiment of the sensing windows for a UE 2600 shown in FIG. 26 is for illustration only.

FIG. 26 illustrates an example of the sensing windows for a UE operating in low power mode. For periodic traffic in period i, a UE is triggered by higher layers for resource selection/reselection in slot $n_i$.

In one example, associated with resource selection/reselection in slot $n_i$ is at least one of the following example.

In one example, a periodic-based partial sensing window, wherein the periodic-based partial sensing window starts at $n_i-T_{ps}$ and ends at $n_i-T_{pe}$. Wherein, $T_{ps}$ and $T_{pe}$ can be specified in the system specifications and/or pre-configured and/or configured and/or updated by RRC signaling and/or MAC CE signaling and/or L1 control signaling. Alternatively or additionally, $T_{ps}$ and $T_{pe}$ can depend on a UE capability. Alternatively or additionally, $T_{ps}$ and $T_{pe}$ can depend on the sub-carrier spacing of the SL bandwidth part (e.g., of the SL channels). Alternatively or additionally, $T_{ps}$ and $T_{pe}$ can be determined implicitly for example based on the partial sensing period, the index of the periods sensed (sensing occasions), and the Y slots selected in the resource selection window.

In another example, a continuous sensing window, wherein the contiguous partial sensing window starts at slot A, which corresponds to $n_i-T_{cs}$ and ends at slot B which corresponds to $n_i-T_{ce}$. Wherein: (1) slot A and slot B can be determined as described in the examples associated with FIG. 8 to FIG. 25; and (2) alternatively, $T_{cs}$ and $T_{ce}$ can be specified in the system specifications and/or pre-configured and/or configured and/or updated by RRC signaling and/or MAC CE signaling and/or L1 control signaling. Alternatively or additionally, $T_{cs}$ and $T_{ce}$ can depend on a UE capability. Alternatively or additionally, $T_{cs}$ and $T_{ce}$ can depend on the sub-carrier spacing of the SL bandwidth part (e.g., of the SL channels). Alternatively or additionally, $T_{cs}$ and $T_{ce}$ can depend on a UE's own implementation. Alternatively or additionally, $T_{cs}$ and $T_{ce}$ can depend on a UE's own implementation subject to the above configurations or restrictions. The start of the contiguous partial sensing window in slot $n_i-T_{cs}$ can be determined such that the earliest sensed slot is W logical slots (e.g., 31 logical slots) before the first logical slot in the resource selection window.

In yet another example, a resource selection window, wherein the resource selection window starts at time $n_i+T_1$ and ends at time $n_i+T_2$. Wherein, $T_1$ and $T_2$ can be specified in the system specifications and/or pre-configured and/or configured and/or updated by RRC signaling and/or MAC CE signaling and/or L1 control signaling. Alternatively or additionally, $T_1$ and $T_2$ can depend on a UE capability. Alternatively or additionally, $T_1$ and $T_2$ can depend on the sub-carrier spacing of the SL bandwidth part (e.g., of the SL channels). Alternatively or additionally, $T_1$ and $T_2$ can depend on a UE's own implementation. Alternatively or additionally, $T_1$ and $T_2$ can depend on a UE's own implementation subject to the above configurations or restrictions. A same resource selection window can apply to periodic-based partial sensing and contiguous partial sensing. Furthermore, a same set of candidate slots Y can be selected within the resource selection window for periodic-based partial sensing and contiguous partial sensing.

In one example 1.3.1, as illustrated in FIG. 26, the periodic-based partial sensing window and the contiguous partial sensing window are not overlapping for period i.

In a further example 1.3.2, the periodic-based partial sensing window and the contiguous partial sensing window can be partially overlapping for period i, i.e., some of the sensed slots can be included in both the partial sensing window and the contiguous partial sensing window.

In one example 1.3.3, as illustrated in FIG. 26, the periodic-based partial sensing window and the contiguous partial sensing window for periodic data in period i is not overlapping with the periodic-based partial sensing window and the contiguous partial sensing window for any other period e.g., period i+1.

In a further example 1.3.4, the periodic-based partial sensing window and the contiguous partial sensing window for periodic data in period i can overlap with the periodic-based partial sensing window and/or the contiguous partial sensing window of another period, i.e., some of the sensed slots can be applied to resource selection/reselection in more than one period.

In one example 1.3.5, as illustrated in FIG. 26, the contiguous partial sensing window of period i ends before slot $n_i$, for example the end of the contiguous partial sensing window in slot $n_i-T_{ce}$, wherein $T_{ce}$ is at least large enough to account for the latency of the UE to process the sensed slots for resource selection. $T_{ce}$ can depend on a UE capability and can depend on the sub-carrier spacing of the SL bandwidth part (e.g., of the SL channels), as described in example 0.1.x. The start of the contiguous partial sensing window in slot $n_i-T_{cs}$ can be determined such that the earliest sensed slot is W logical slots (e.g., 31 logical slots) before the first logical slot in the resource selection window (e.g., the first logical slot in the set of Y candidate slots $t'_{y,0}{}^{SL}$).

In a further example 1.3.6, the contiguous partial sensing window can continue beyond slot $n_i$, for example the contiguous partial sensing window can continue beyond slot $n_i$ for re-evaluation check and pre-emption check. The contiguous partial sensing window can end when the last (re-)transmission associated with period i is either transmitted or acknowledged that it has been received by the one or more target UEs, as described in example 0.2.x or example 0.3.x.

In a further example 1.3.7, a first contiguous partial sensing window of period i ends before slot $n_i$, for example the end of the contiguous partial sensing window in slot $n_i-T_{ce}$, wherein $T_{ce}$ is at least large enough to account for the latency of the UE to process the sensed slots for resource selection. $T_{ce}$ can depend on a UE capability and can depend on the sub-carrier spacing of the SL bandwidth part (e.g., of the SL channels). A second contiguous partial sensing window is associated with each SL (re-)transmission associated within period i for re-evaluation check and pre-emption check as described in example 0.1.x.

In a further example 1.3.8, the periodic-based partial sensing window can continue beyond slot $n_i$, for example the periodic-based partial sensing window can continue beyond slot $n_i$ for re-evaluation check and pre-emption check. The periodic-based partial sensing window can end when the last (re-)transmission associated with period i is either transmitted or acknowledged that it has been received by the one or more target UEs.

In one example 1.4.1, for periodic traffic, a UE can anticipate the slot $n_i$, during which SL transmission (resource selection/re-selection procedure) is triggered by higher layers. Periodic-based partial sensing and/or contiguous partial sensing can start and end before slot $n_i$ and resource selection/re-selection occurs in slot $n_i$. The UE would need to anticipate the SL transmission (resource selection/re-selection procedure) trigger by higher layers in slot $n_i$ early enough, before $n_i-T_{ps}$ and before $n_i-T_{cs}$, to start periodic-based partial sensing and contiguous partial sensing respectively. The following examples can apply, this can be based on system specifications and/or pre-configuration and/or higher-layer configuration and/or UE's own implementation and/or based on a condition (e.g., SL traffic priority and/or HARQ-ACK error rate and/or CBR and/or CR and/or power configuration setting).

In one example 1.4.1.1, sensing for initial resource selection/re-selection in slot $n_i$ is based on periodic-based partial sensing and contiguous partial sensing.

In another example 1.4.1.2, sensing for initial resource selection/re-selection in slot $n_i$ is based on periodic-based partial sensing.

In another example 1.4.1.3, sensing for initial resource selection/re-selection in slot $n_i$ is based on contiguous partial sensing.

In another example 1.4.2, for periodic-based traffic, SL transmission (resource selection/re-selection procedure) is triggered by higher layers in slot $n_i$. Resource selection/re-selection and candidate resources determination/reporting to higher layers is in slot $R_i$. Wherein, slot $R_i$ is after slot $n_i$. Periodic-based partial sensing and/or contiguous partial sensing starts in slot $R_i-T_{ps}$ and slot $R_i-T_{cs}$ respectively. Slot $R_i-T_{ps}$ and slot $R_i-T_{cs}$ can be after slot $n_i$ if the UE can't anticipate the SL traffic before slot $n_i$. Alternatively, slot $R_i-T_{ps}$ and slot $R_i-T_{cs}$ are determined by the earliest time (that could be before or after slot $n_i$) a UE can anticipate traffic for period i, which, for example, can be based on higher layer (e.g., application layer) signaling in the UE before slot $n_i$. The start of the contiguous partial sensing window in slot $R_i-T_{cs}$ can be determined such that the earliest sensed slot is W logical slots (e.g., 31 logical slots) before the first logical slot in the resource selection window (e.g., the first logical slot in the set of Y candidate slots $t'_{y,0}{}^{SL}$). The following examples can apply, this can be based on system specifications and/or pre-configuration and/or higher-layer configuration and/or UE's own implementation and/or based on a condition (e.g., SL traffic priority and/or HARQ-ACK error rate and/or CBR and/or CR and/or power configuration setting);

In one example 1.4.2.1, sensing for initial resource selection/re-selection in slot $R_i$ is based on periodic-based partial sensing and contiguous partial sensing. When the UE performs periodic-based partial sensing and contiguous partial sensing, the UE uses a same resource selection window and a same set of Y candidate slots within the resource selection window for periodic-based partial sensing and contiguous partial sensing.

In another example 1.4.2.2, sensing for initial resource selection/re-selection in slot $R_i$ is based on periodic-based partial sensing.

In another example 1.4.2.3, sensing for initial resource selection/re-selection in slot $R_i$ is based on contiguous partial sensing.

In another example 1.4.3, for periodic traffic, SL transmission (resource selection/re-selection procedure) is triggered by higher layers in slot $n_i$, resource selection is based on no-sensing, i.e., random resource selection.

The choice between example 1.4.1 or 1.4.2 and 1.4.3 can be based on system specifications and/or pre-configuration and/or higher-layer configuration and/or UE's own implementation and/or based on a condition (e.g., SL traffic priority and/or HARQ-ACK error rate and/or CBR and/or CR and/or power configuration setting).

In one example 1.5, for re-evaluation check and pre-emption check, one of the following examples can apply, this can be based on system specifications and/or pre-configuration and/or higher-layer configuration and/or UE's own implementation and/or based on a condition (e.g., SL traffic priority and/or HARQ-ACK error rate and/or CBR and/or CR and/or power configuration setting).

In one example 1.5.1, there is no re-evaluation check and/or pre-emption check.

In another example 1.5.2, sensing for re-evaluation check and/or pre-emption check is based on periodic-based partial sensing and contiguous partial sensing.

In another example 1.5.3, sensing for re-evaluation check and/or pre-emption check is based on periodic-based partial sensing.

In another example 1.5.4, sensing for re-evaluation check and/or pre-emption check is based on contiguous partial sensing.

In one embodiment of Component 2, resource pool with periodic reservations and UE with aperiodic traffic is provided.

In another example 2.1, a UE is configured with a resource pool with periodic reservations. The UE is further configured to transmit aperiodic traffic. Aperiodic traffic occurs at irregular time intervals.

A resource pool can be configured with one or more periodic reservation periods given by higher layer parameter sl-ResourceReservationPeriodList.

In one example, before the SL data is available for transmission, the UE becomes aware it will be transmitting in a future slot (e.g., by application layer signaling): (1) let slot n be the slot in which resource selection/reselection or sensing is triggered by higher layers. This is the slot the UE becomes aware of a future SL transmission for which data would become available in slot m; (2) let slot m be the slot in which SL data becomes available for transmission. In one example slot m is the first of the Y candidate slots, e.g., $m=t'_{y,0}{}^{SL}$; and (3) let slot R be the slot of resource selection/re-selection and candidate resources determination/reporting to higher layers.

In one example 2.1.1, a UE can be configured, in slot n, with a period $T_a$, wherein $T_a$ is the time after slot n when the SL data becomes available for SL transmission.

In another example 2.1.2, a UE can be configured, in slot n, with a slot m, wherein slot m is the slot when the SL data becomes available for SL transmission.

In one example, $m=n+T_a$.

Figure 27:
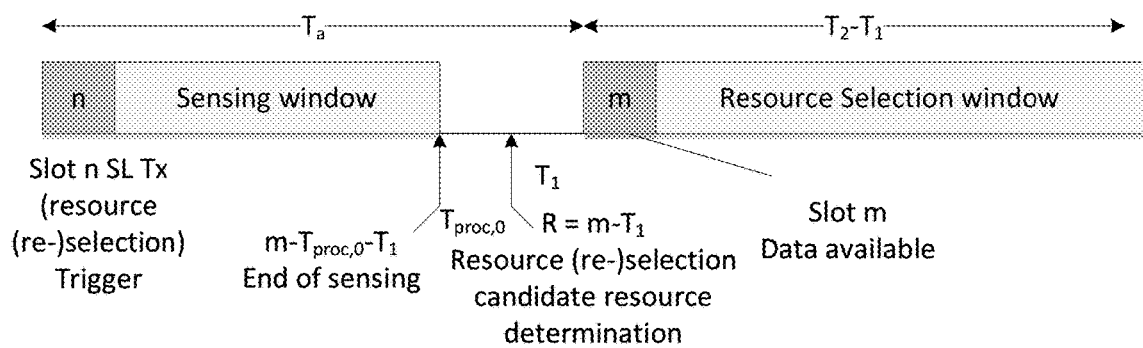
FIG. 27 illustrates an example of sensing windows when a UE is triggered according to embodiments of the present disclosure.

FIG. 27 illustrates an example of sensing windows when a UE is triggered 2700 according to embodiments of the present disclosure. An embodiment of the sensing windows when a UE is triggered 2700 shown in FIG. 27 is for illustration only.

In one example 2.2.1, illustrated in FIG. 27 when a UE is triggered by higher layers in slot n: (1) it performs sensing from slot n+1 to slot $m-T_{proc,0}{}^{SL}-T_1$, alternative, the UE performs sensing from slot $n+T_0$ to slot $m-T_{proc,0}{}^{SL}-T_1$, wherein $T_0$ can be specified in the system specifications and/or pre-configured and/or configured and/or updated by RRC signaling and/or MAC CE signaling and/or L1 control signaling, see example 0.3.x. The start of the sensing window in slot $n+T_0$ can be determined such that the earliest sensed slot is W logical slots (e.g., 31 logical slots) before the first logical slot in the resource selection window; (2) it performs candidate resource selection in slot $m-T_1$, i.e., $R=m-T_1$; (3) the candidate resource selection window starts in slot m to slot $m+T_2-T_1$; (4) wherein, $T_{proc,0}{}^{SL}$ is the sensing latency, which is the time between the end of the sensing window and the resource selection/reselection. $T_1$ is the time between the resource selection/reselection and the start of the resource selection window. $T_2$ is the time between the resource selection/reselection and the end of the resource selection window. $T_2-T_1$ is the length of the resource selection window; and (5) in this example $T_1 \leq T_{proc,1}{}^{SL}$, alternatively $T_1 = T_{proc,1}{}^{SL}$.

In another example 2.2.2, illustrated in FIG. 27, when a UE is triggered by higher layers in slot n: (1) it performs sensing from slot n+1 to slot $n+T_a-T_{proc,0}{}^{SL}-T_1$, alternative, the UE performs sensing from slot $n+T_0$ to slot $n+T_a-T_{proc,0}{}^{SL}-T_1$, wherein $T_0$ can be specified in the system specifications and/or pre-configured and/or configured and/or updated by RRC signaling and/or MAC CE signaling and/or L1 control signaling, see example 0.3.x; (2) it performs candidate resource selection in slot $n+T_a-T_1$, i.e., $R=n+T_a-T_1$; (3) the candidate resource selection window starts in slot $n+T_a$ to slot $n+T_a+T_2-T_1$; (4) wherein, $T_{proc,0}{}^{SL}$ is the sensing latency, which is the time between the end of the sensing window and the resource selection/reselection. $T_1$ is the time between the resource selection/reselection and the start of the resource selection window. $T_2$ is the time between the resource selection/reselection and the end of the resource selection window. $T_2-T_1$ is the length of the resource selection window; and (5) in this example $T_1 \leq T_{proc,1}{}^{SL}$ alternatively $T_1 = T_{proc,1}{}^{SL}$.

Figure 28:
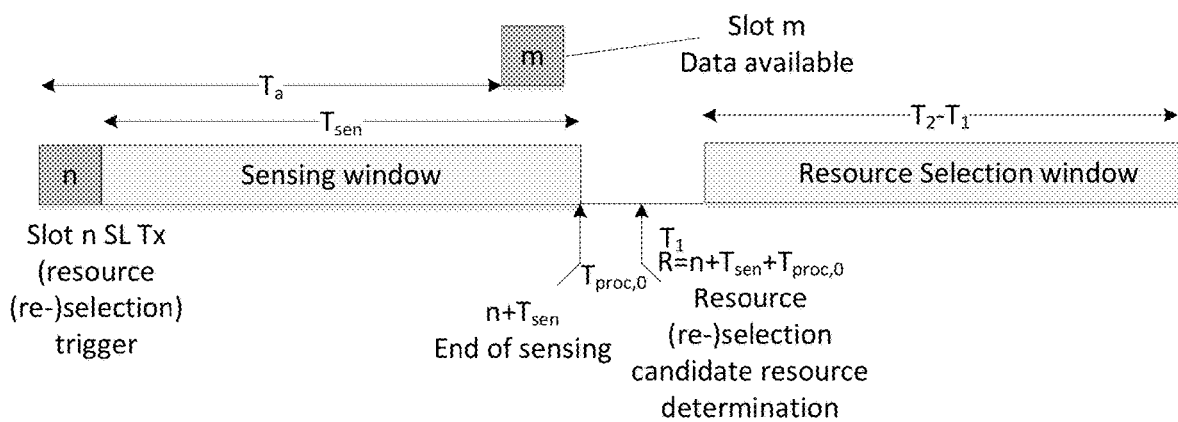
FIG. 28 illustrates another example of sensing windows when a UE is triggered according to embodiments of the present disclosure.

FIG. 28 illustrates another example of sensing windows when a UE is triggered 2800 according to embodiments of the present disclosure. An embodiment of the sensing windows when a UE is triggered 2800 shown in FIG. 28 is for illustration only.

In another example 2.2.3, illustrated in FIG. 28, when a UE is triggered by higher layers in slot n: (1) it performs sensing from slot n+1 to slot $n+T_{sen}$, alternative, the UE performs sensing from slot $n+T_0$ to slot $n+T_{sen}$, wherein $T_0$ can be specified in the system specifications and/or pre-configured and/or configured and/or updated by RRC signaling and/or MAC CE signaling and/or L1 control signaling, see example 0.3.x; (2) it performs candidate resource selection and candidate resources determination/reporting to higher layers in slot $n+T_{sen}+T_{proc,0}{}^{SL}$, i.e., $R=n+T_{sen}+T_{proc,0}{}^{SL}$; (3) the candidate resource selection window starts in slot $n+T_{sen}+T_{proc,0}{}^{SL}+T_1$ to slot $n+T_{sen}+T_2+T_{proc,0}{}^{SL}$. In one example, $T_1 \leq T_{proc,1}{}^{SL}$, alternatively $T_1 = T_{proc,1}{}^{SL}$; (4) wherein, $T_{sen}$ is the size of the sensing window. $T_a$ is the time the SL data is available, and hence is the earliest time the resource selection window can start. $T_{sen} = \max(T_b, T_a - T_{proc,0}{}^{SL} - T_1)$. Wherein, $T_b$ is a minimum sensing window time specified in the system specifications and/or pre-configured and/or configured and/or updated by RRC signaling and/or MAC CE signaling and/or L1 control signaling. For example, $T_{sen}$ can be 31 slots; (5) in a variant example for resource selection window that starts in slot m, the sensing window starts in the later of slot m−W (e.g., W=31) or slot n+1; and (6) wherein, $T_{proc,0}{}^{SL}$ is the sensing latency, which is the time between the end of the sensing window and the resource selection/reselection. $T_1$ is the time between the resource selection/reselection and the start of the resource selection window. In one example, $T_1 \leq T_{proc,1}{}^{SL}$. $T_2$ is the time between the resource selection/reselection and the end of the resource selection window. $T_2-T_1$ is the length of the resource selection window.

In a further example, a UE can perform periodic-based partial sensing after a SL transmission (resource selection/re-selection procedure) is triggered by higher layers in slot n and before the initial resource selection/re-selection and candidate resources determination/reporting to higher layers in slot R.

In a further example 2.2.4, the periodic-based partial sensing window and/or the contiguous partial sensing window can continue beyond slot R, for example the periodic-based partial sensing window and/or the contiguous partial sensing window can continue beyond slot R for re-evaluation check and pre-emption check. The periodic-based partial sensing window and/or the contiguous partial sensing window can end when the last (re-)transmission is either transmitted or acknowledged that it has been received by the one or more target UEs.

In another example 2.3.1, for aperiodic traffic, SL transmission (resource selection/re-selection procedure) is triggered by higher layers in slot n. Resource selection/reselection and candidate resources determination/reporting to higher layers is in slot R. Wherein, slot R is after slot n. Periodic-based partial sensing and/or contiguous partial sensing starts in slot $R-T_{ps}$ and/or slot $R-T_{cs}$ respectively. Slot $R-T_{ps}$ and slot $R-T_{cs}$ can be after slot n if the UE can't anticipate the SL traffic before slot n. A UE can anticipate SL traffic in slot n, if for example it is signaled by the UE's higher layers (e.g., application layer). Slot $R-T_{ps}$ and slot $R-T_{cs}$ are determined by the earliest time (that could be before or after slot n) a UE can anticipate traffic for an aperiodic transmission. The following examples can apply, this can be based on system specifications and/or pre-configuration and/or higher-layer configuration and/or UE's own implementation and/or based on a condition (e.g., SL traffic priority and/or HARQ-ACK error rate and/or CBR and/or CR and/or power configuration setting).

In one example 2.3.1.1, sensing for initial resource selection/re-selection in slot R is based on periodic-based partial sensing and contiguous partial sensing. When the UE performs periodic-based partial sensing and contiguous partial sensing, the UE uses a same resource selection window and a same set of Y candidate slots within the resource selection window for periodic-based partial sensing and contiguous partial sensing.

In another example 2.3.1.2, sensing for initial resource selection/re-selection in slot R is based on periodic-based partial sensing.

In another example 2.3.1.3, sensing for initial resource selection/re-selection in slot R is based on contiguous partial sensing.

In another example 2.3.2, for aperiodic traffic, SL transmission (resource selection/re-selection procedure) is triggered by higher layers in slot n, resource selection is based on no-sensing, i.e., random resource selection.

The choice between example 2.3.1 and 2.3.2 can be based on system specifications and/or pre-configuration and/or higher-layer configuration and/or UE's own implementation and/or based on a condition (e.g., SL traffic priority and/or HARQ-ACK error rate and/or CBR and/or CR and/or power configuration setting).

In one example 2.4, for re-evaluation check and pre-emption check, one of the following examples can apply, this can be based on system specifications and/or pre-configuration and/or higher-layer configuration and/or UE's own implementation and/or based on a condition (e.g., SL traffic priority and/or HARQ-ACK error rate and/or CBR and/or CR and/or power configuration setting).

In one example 2.4.1, there is no re-evaluation check and/or pre-emption check.

In another example 2.4.2, sensing for re-evaluation check and/or pre-emption check is based on periodic-based partial sensing and contiguous partial sensing.

In another example 2.4.3, sensing for re-evaluation check and/or pre-emption check is based on periodic-based partial sensing.

In another example 2.4.4, sensing for re-evaluation check and/or pre-emption check is based on contiguous partial sensing.

In one embodiment of Component 3, resource pool without periodic reservations and UE with periodic traffic is provided.

In one example 3.1, a UE is configured with a resource pool without periodic reservations. The UE is further configured to transmit periodic traffic. The periodicity of the periodic traffic is $N_{per}$ slots: (1) in one example, $N_{per}$ slots is given in number of physical slots; (2) in another example, $N_{per}$ slots is given as the corresponding physical time duration e.g., in units of ms; and (3) in another example, $N_{per}$ slots is given in number of logical slots that can be in a resource pool.

In another example, $N_{per}$ slots is given in number of logical slots that are in a resource pool.

The examples of component 1 apply to this component except that there is no periodic-based partial sensing.

In one example 3.2.1, for periodic traffic, a UE can anticipate the slot $n_i$, during which SL transmission (resource selection/re-selection procedure) is triggered by higher layers. Contiguous partial sensing can start and end before slot $n_i$ and resource selection/re-selection occurs in slot $n_i$. The UE would need to anticipate the SL transmission (resource selection/re-selection procedure) trigger by higher layers in slot $n_i$ early enough, before $n_i-T_{cs}$, to perform contiguous partial sensing.

In one example 3.2.1.1, sensing for initial resource selection/re-selection in slot $n_i$ is based on contiguous partial sensing.

In another example 3.2.2, for periodic traffic, SL transmission (resource selection/re-selection procedure) is triggered by higher layers in slot $n_i$. Resource selection/re-selection and candidate resources determination/reporting to higher layers is in slot $R_i$. Wherein, slot $R_i$ is after slot $n_i$. Contiguous partial sensing starts in slot $R_i-T_{cs}$. Slot $R_i-T_{cs}$ can be after slot $n_i$ if the UE can't anticipate the SL traffic before slot $n_i$. Alternatively, slot $R_i-T_{cs}$ is determined by the earliest time (that could be before or after slot $n_i$) a UE can anticipate traffic for period i, which, for example, can be based on higher layer (e.g., application layer) signaling in the UE before slot $n_i$. Alternatively or additionally, the start of the contiguous partial sensing window in slot $R_i-T$ can be determined such that the earliest sensed slot is W logical slots (e.g., 31 logical slots) before the first logical slot in the resource selection window.

In one example 3.2.2.1, sensing for initial resource selection/re-selection in slot $R_i$ is based on contiguous partial sensing.

In another example 3.2.3, for periodic traffic, SL transmission (resource selection/re-selection procedure) is triggered by higher layers in slot $n_i$, resource selection is based on no-sensing, i.e., random resource selection.

The choice between example 3.2.1 or 3.2.2 and 3.2.3 can be based on system specifications and/or pre-configuration and/or higher-layer configuration and/or UE's own implementation and/or based on a condition (e.g., SL traffic priority and/or HARQ-ACK error rate and/or CBR and/or CR and/or power configuration setting).

In one example 3.3, for re-evaluation check and pre-emption check, one of the following examples can apply, this can be based on system specifications and/or pre-configuration and/or higher-layer configuration and/or UE's own implementation and/or based on a condition (e.g., SL traffic priority and/or HARQ-ACK error rate and/or CBR and/or CR and/or power configuration setting);

In one example 3.3.1, there is no re-evaluation check and/or pre-emption check.

In another example 3.3.2, sensing for re-evaluation check and/or pre-emption check is based on contiguous partial sensing.

In one embodiment of Component 4, resource pool without periodic reservations and UE with aperiodic traffic is provided.

In one example 4.1, a UE is configured with a resource pool without periodic reservations. Aperiodic traffic occurs at irregular time intervals.

The examples of component 2 apply to this component except that there is no periodic-based partial sensing.

In another example 4.2.1, for aperiodic traffic, SL transmission (resource selection/re-selection procedure) is triggered by higher layers in slot n. Resource selection/re-selection and candidate resources determination/reporting to higher layers is in slot R. Wherein, slot R is after slot n. Contiguous partial sensing starts in slot $R-T_{cs}$. Slot $R-T_{cs}$ can be after slot n if the UE can't anticipate the SL traffic before slot n. A UE can anticipate SL traffic in slot n, if for example it is signaled by the UE's higher layers (e.g., application layer). Slot $R-T_{cs}$ is determined by the earliest time (that could be before or after slot n) a UE can anticipate traffic for an aperiodic transmission. Alternatively or additionally, the start of the contiguous partial sensing window in slot $R-T_{cs}$ can be determined such that the earliest sensed slot is W logical slots (e.g., 31 logical slots) before the first logical slot in the resource selection window.

In one example 4.2.1.1, sensing for initial resource selection/re-selection in slot R is based on contiguous partial sensing.

In another example 4.2.2, for aperiodic traffic, SL transmission (resource selection/re-selection procedure) is triggered by higher layers in slot n, resource selection is based on no-sensing, i.e., random resource selection.

The choice between example 4.2.1 and 4.2.2 can be based on system specifications and/or pre-configuration and/or higher-layer configuration and/or UE's own implementation and/or based on a condition (e.g., SL traffic priority and/or HARQ-ACK error rate and/or CBR and/or CR and/or power configuration setting).

In one example, 4.3, for re-evaluation check and preemption check, one of the following examples can apply, this can be based on system specifications and/or pre-configuration and/or higher-layer configuration and/or UE's own implementation and/or based on a condition (e.g., SL traffic priority and/or HARQ-ACK error rate and/or CBR and/or CR and/or power configuration setting).

In one example 4.3.1, there is no re-evaluation check and/or pre-emption check.

In another example 4.3.2, sensing for re-evaluation check and/or pre-emption check is based on contiguous partial sensing.

In one embodiment of Component 1A, aperiodic transmission in resource pool without periodic reservations in a mode 2 resource pool is provided.

A mode 2 resource pool without periodic reservations doesn't have sl-MultiReserveResource enabled.

sl-MultiReserveResource: indicates if it is allowed to reserve a sidelink resource for an initial transmission of a TB by an SCI associated with a different TB, based on sensing and resource selection procedure.

A UE (resource selection/re-selection procedure) is triggered by aperiodic transmission (i.e., $P_{rsvp\_TX}=0$) in slot n.

In one example A1.1, in the logical slot(s) immediately preceding slot n, the UE didn't perform sensing.

FIG. 29 illustrates yet another example of sensing operation 2900 according to embodiments of the present disclosure. An embodiment of the sensing operation 2900 shown in FIG. 29 is for illustration only.

In one example A1.1.1, the UE starts sensing in the first logical slot at or after slot n as illustrated in FIG. 29. Denote this logical slot as logical slot with index $t_{sen-start}^{SL}$. The last slot of the sensing window is M−1 logical slots after slot $t_{sen-start}^{SL}$ denote this logical slot as logical slot with index $t_{sen-start}^{SL}$ the total number of logical slots in the sensing window is M. e.g., $t_{sen-start}^{SL} = t_{sen-end}^{SL}$M−1. M can be specified in the system specifications and/or (pre-) configured or updated by higher layer RRC signaling and/or MAC CE signaling and/or L1 control signaling, in one example M is 31 slots. The UE selects Y' contiguous logical slots for SL resource selection, wherein $Y' \geq Y_{min}'$. $Y_{min}'$ can be specified in the system specifications and/or (pre-) configured or updated by higher layer RRC signaling and/or MAC CE signaling and/or L1 control signaling. The first slot selected for resource selection is denoted as logical slot with index $t'_{y,0}^{SL}$, wherein logical slot $t'_{y,0}^{SL}$ is at least $T_{proc,0}^{SL}+T_{proc,1}^{SL}$ after the end of the sensing window, wherein $T_{proc,0}^{SL}$ and $T_{proc,1}^{SL}$ are in units of physical time (e.g., milli-seconds) or in units of physical slot. $T_{proc,0}^{SL}$ is the time between the end of the sensing window (e.g., $t_{sen-end}^{SL}$) and the slot of resource selection, e.g., $T_{proc,0}^{SL}$ can be as illustrate in TABLE 2. $T_{proc,1}^{SL}$ is the time between the slot of resource selection and the start of the window for sidelink resource selection (e.g., $t'_{y,0}^{SL}$), e.g., $T_{proc,1}^{SL}$ can be as illustrated in TABLE 3. $T_{proc,0}^{SL}$ and/or $T_{proc,1}^{SL}$ can be specified in the system specifications and/or (pre-)configured or updated by higher layer RRC signaling and/or MAC CE signaling and/or L1 control signaling. In one example, $T_{proc,0}^{SL}$ and/or $T_{proc,1}^{SL}$ can depend on a UE capability. The time period between slot R and the last logical slot of the sensing window, in FIG. 29, can be larger than $T_{proc,0}^{SL}$ as not all physical slots are logical slots.

FIG. 30 illustrates yet another example of sensing operation 3000 according to embodiments of the present disclosure. An embodiment of the sensing operation 3000 shown in FIG. 30 is for illustration only.

In one example A1.1.2, the UE starts sensing in the first logical slot at or after slot n by at least $T_{sen-proc}$ (minimum time required for UE to start sensing at or after being triggered in slot n) as illustrated in FIG. 30, wherein $T_{sen-proc}$ can be in units of physical time (e.g., milli-seconds) or physical slots. $T_{sen-proc}$ can be specified in the system specifications and/or (pre) configured or updated by higher layer RRC signaling and/or MAC CE signaling and/or L1 control signaling. In one example, $T_{sen-proc}$ can depend on a UE capability. Denote this logical slot as logical slot with index $t_{sen-start}^{SL}$. The last slot of the sensing window is M−1 logical slots after slot $t_{sen-start}^{SL}$ denote this as logical slot with index $t_{sen-end}^{SL}$ i.e., the total number of logical slots in the sensing window is M. e.g., $t_{sen-end}^{SL} = t_{sen-start}^{SL}+M-1$. M can be specified in the system specifications and/or (pre-) configured or updated by higher layer RRC signaling and/or MAC CE signaling and/or L1 control signaling, in one example M is 31 slots. The UE selects Y' contiguous logical slots for SL resource selection, wherein $Y' \geq Y_{min}'$. $Y_{min}'$ can be specified in the system specifications and/or (pre-)configured or updated by higher layer RRC signaling and/or MAC CE signaling and/or L1 control signaling. The first slot selected for resource selection is denoted as logical slot $t'_{y,0}^{SL}$, wherein logical slot $t'_{y,0}^{SL}$ is at least $T_{proc,0}^{SL}+T_{proc,1}^{SL}$ after the end of the sensing window, wherein $T_{proc,0}^{SL}$ and $T_{proc,1}^{SL}$ are in units of physical time (e.g., milli-seconds) or in units of physical slot. $T_{proc,0}^{SL}$ is the time between the end of the sensing window (e.g., $t_{sen-end}^{SL}$) and the slot of resource selection, e.g., $T_{proc,0}^{SL}$ can be as illustrated in TABLE 2. $T_{proc,1}^{SL}$ is the time between the slot of resource selection and the start of the window for sidelink resource selection (e.g., $t'_{y,0}^{SL}$), $T_{proc,1}^{SL}$ can be as illustrated in TABLE 3. $T_{proc,0}^{SL}$ and/or $T_{proc,1}^{SL}$ can be specified in the system specifications and/or (pre-)configured or updated by higher layer RRC signaling and/or MAC CE signaling and/or L1 control signaling. In one example, $T_{proc,0}^{SL}$ and/or $T_{proc,1}^{SL}$ can depend on a UE capability. The time period between slot R and the last logical slot of the sensing window, in FIG. 30, can be larger than $T_{proc,0}^{SL}$ as not all physical slots are logical slots.

Figure 31:
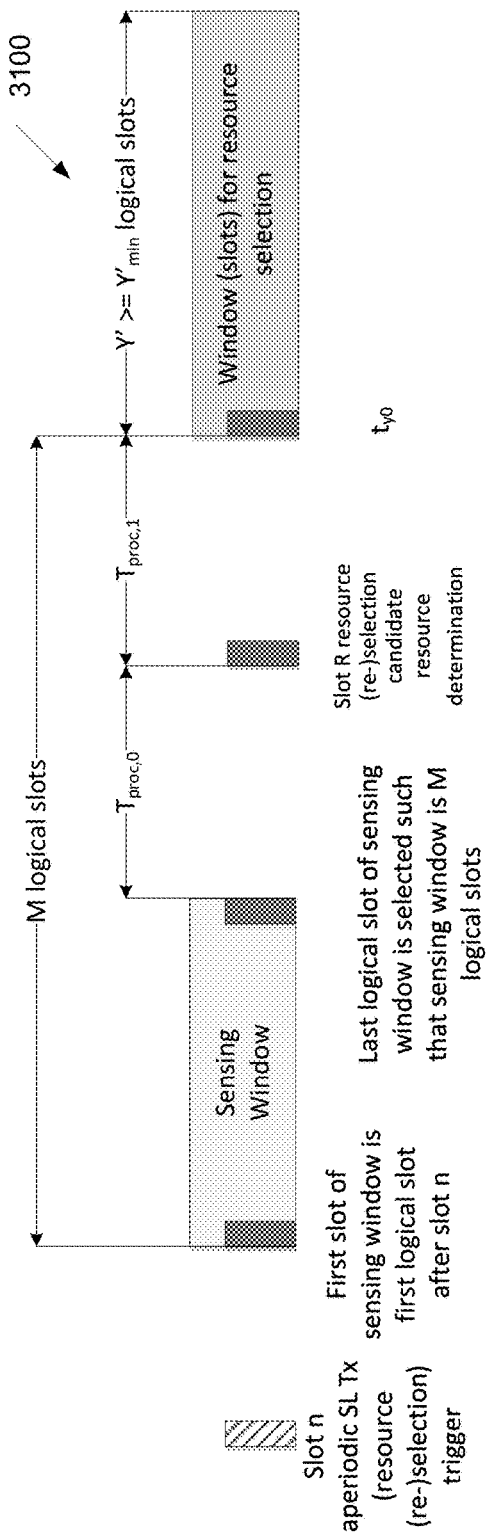

FIG. 31 illustrates yet another example of sensing operation 3100 according to embodiments of the present disclosure. An embodiment of the sensing operation 3100 shown in FIG. 31 is for illustration only.

Figure 32:
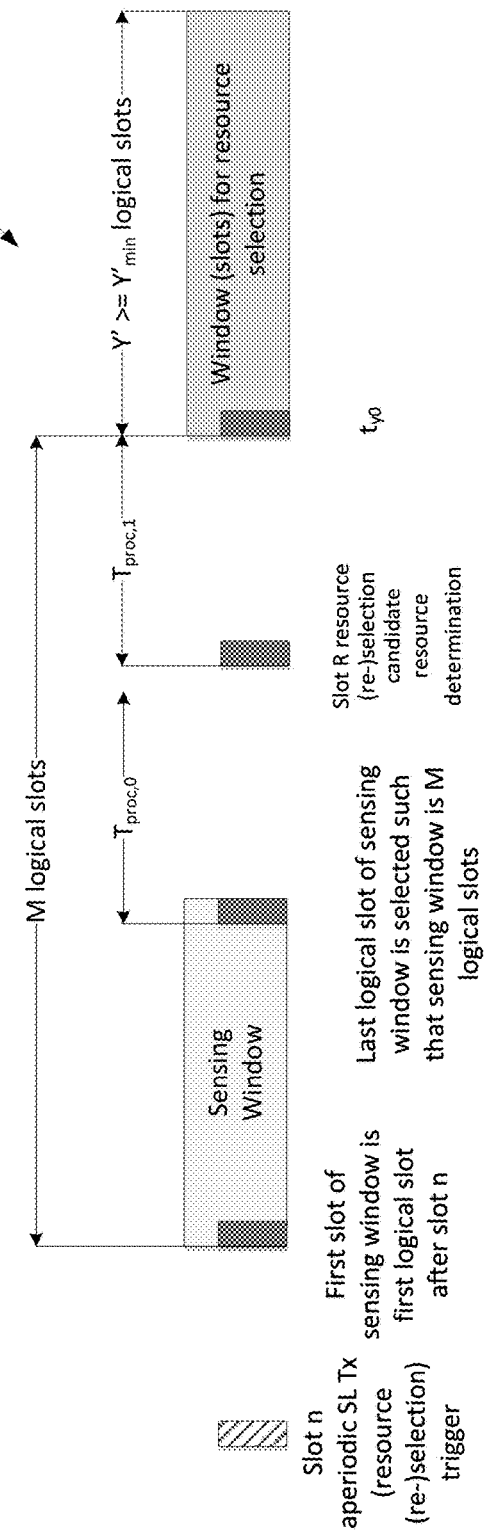

FIG. 32 illustrates yet another example of sensing operation 3200 according to embodiments of the present disclosure. An embodiment of the sensing operation 3200 shown in FIG. 32 is for illustration only.

In one example A1.1.3, the UE starts sensing in the first logical slot at or after slot n as illustrated in FIG. 31 and FIG. 32. Denote this logical slot as logical slot with index $t_{sen-start}^{SL}$. The first slot selected for resource selection is denoted as logical slot with index $t'_{y0}^{SL}$, wherein logical slot $t'_{y0}^{SL}$ is M logical slots after logical slot $t_{sen-start}^{SL}$, e.g., $t'_{y0}^{SL} = t_{sen-start}^{SL} + M$. M can be specified in the system specifications and/or (pre-)configured or updated by higher layer RRC signaling and/or MAC CE signaling and/or L1 control signaling, in one example M is 31 slots. The last slot of the sensing window, e.g., $t_{sen-end}^{SL}$, is earlier than (or before or earlier than) $t'_{y0}^{SL}$ by $T_{proc,0}^{SL} + T_{proc,1}^{SL}$, wherein $T_{proc,0}^{SL}$ and $T_{proc,1}^{SL}$ are in units of physical time (e.g., milli-seconds) or in units of physical slot. $T_{proc,0}^{SL}$ is the time between the end of the sensing window $t_{sen-end}^{SL}$) pro and the slot of resource selection, e.g., $T_{proc,0}^{SL}$ can be as illustrated in TABLE 2. $T_{proc,1}^{SL}$ is the time between the slot of resource selection and the start of the window for sidelink resource selection (e.g., $t'_{y0}^{SL}$), e.g., $T_{proc,1}^{SL}$ can be as illustrated in TABLE 3. $T_{proc,0}^{SL}$ and/or $T_{proc,1}^{SL}$ can be specified in the system specifications and/or (pre-)configured or updated by higher layer RRC signaling and/or MAC CE signaling and/or L1 control signaling. In one example, $T_{proc,0}^{SL}$ and/or $T_{proc,1}^{SL}$ can depend on a UE capability. In one example, the UE selects Y' contiguous logical slots for SL resource selection starting with logical slot $t'_{y0}^{SL}$, wherein $Y' \geq Y_{min}'$. $Y_{min}'$ can be specified in the system specifications and/or (pre-)configured or updated by higher layer RRC signaling and/or MAC CE signaling and/or L1 control signaling. The time period between slot R and the last logical slot of the sensing window, in FIGS. 31 and 32, can be larger than $T_{proc,0}^{SL}$ as not all physical slots are logical slots.

Figure 33:
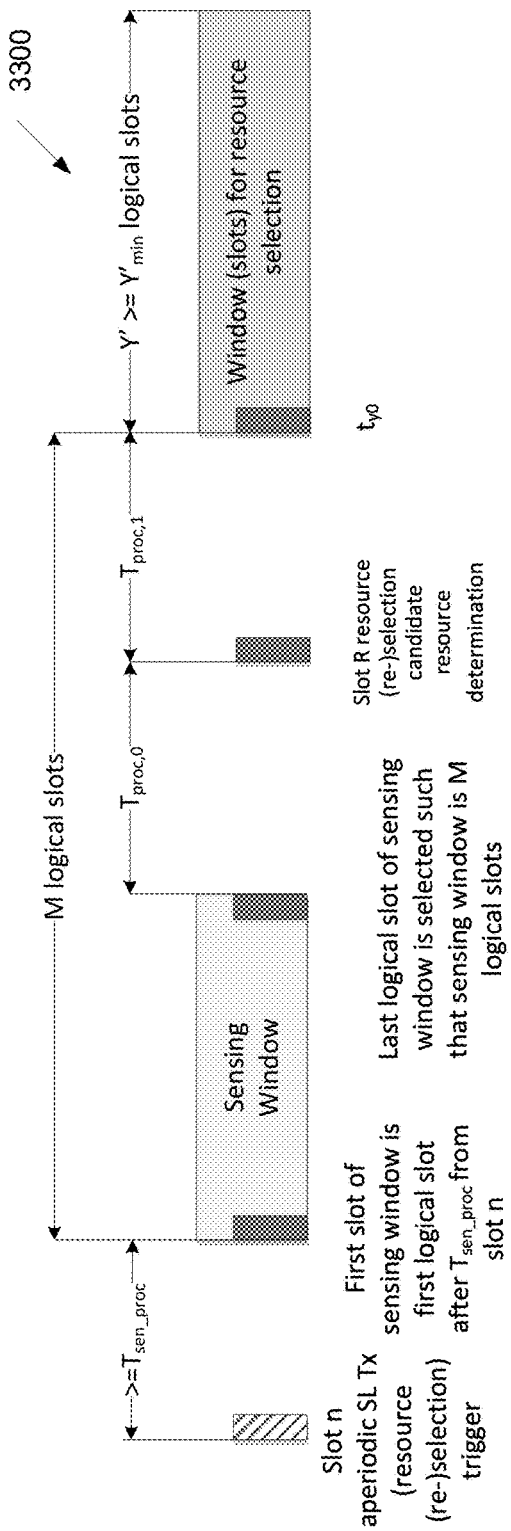

FIG. 33 illustrates yet another example of sensing operation 3300 according to embodiments of the present disclosure. An embodiment of the sensing operation 3300 shown in FIG. 33 is for illustration only.

Figure 34:
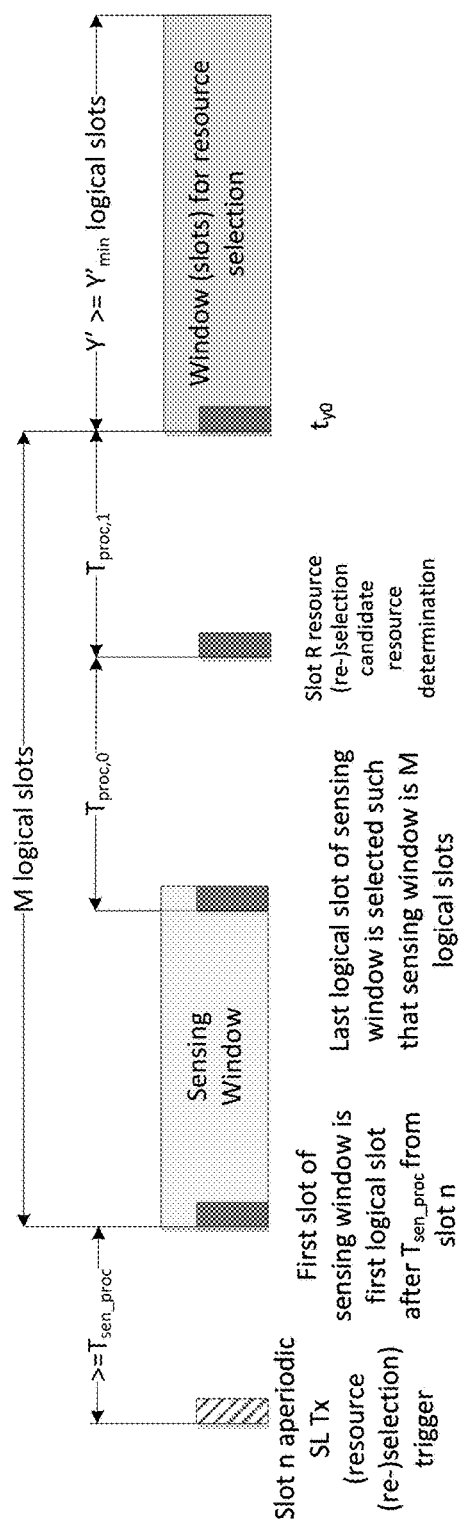

FIG. 34 illustrates yet another example of sensing operation 3400 according to embodiments of the present disclosure. An embodiment of the sensing operation 3400 shown in FIG. 34 is for illustration only.

In one example A1.1.4, the UE starts sensing in the first logical slot at or after slot n by at least $T_{sen-proc}$ (minimum time required for UE to start sensing after being triggered in slot n) as illustrated in FIG. 33 and FIG. 34, wherein $T_{sen-proc}$ can be in units of physical time (e.g., milli-seconds) or physical slots. $T_{sen-proc}$ can be specified in the system specifications and/or (pre-)configured or updated by higher layer RRC signaling and/or MAC CE signaling and/or L1 control signaling, in one example M is 31 slots. In one example, $T_{sen-proc}$ can depend on a UE capability. Denote the first logical slot of the sensing window as logical slot with index $t_{sen-start}^{SL}$ The first slot selected for resource selection is denoted as logical slot with index $t'_{y0}^{SL}$, wherein logical slot $t'_{y0}^{SL}$ is M logical slots after slot $t_{sen-start}^{SL}$, e.g., $t'_{y0}^{SL} = t_{sen-start}^{SL} + M$. M can be specified in the system specifications and/or (pre-)configured or updated by higher layer RRC signaling and/or MAC CE signaling and/or L1 control signaling. The last slot of the sending window, e.g., $t_{sen-start}^{SL}$, is earlier than (or before or earlier than) $t'_{y0}^{SL}$ by $T_{proc,0}^{SL} + T_{proc,1}^{SL}$, wherein $T_{proc,0}^{SL}$ and $T_{proc,1}^{SL}$ are in units of physical time (e.g., milli-seconds) or in units of physical slot. $T_{proc,0}^{SL}$ is the time between the end of the sensing window (e.g., $t_{sen-end}^{SL}$) and the slot of resource selection, e.g., $T_{proc,0}^{SL}$ can be as illustrated in TABLE 2. $T_{proc,1}^{SL}$ is the time between the slot of resource selection and the start of the window for sidelink resource selection (e.g., $t'_{y0}^{SL}$), e.g., $T_{proc,1}^{SL}$ can be as illustrated in TABLE 3. $T_{proc,0}^{SL}$ and/or $T_{proc,1}^{SL}$ can be specified in the system specifications and/or (pre-)configured or updated by higher layer RRC signaling and/or MAC CE signaling and/or L1 control signaling. In one example, $T_{proc,0}^{SL}$ and/or $T_{proc,1}^{SL}$ can depend on a UE capability. The UE selects Y' contiguous logical slots for SL resource selection starting with slot $t'_{y0}^{SL}$, wherein $Y' \geq Y_{min}'$. $Y_{min}'$ can be specified in the system specifications and/or (pre-) configured or updated by higher layer RRC signaling and/or MAC CE signaling and/or L1 control signaling. The time period between slot R and the last logical slot of the sensing window, in FIG. 33 and FIG. 34, can be larger than $T_{proc,0}^{SL}$ as not all physical slots are logical slots.

In one example A1.1.5, the window (slots) for resource selection in examples A1.1.1, A1.1.2, A1.1.3, and A1.1.4, comprises: (1) a first logical slot $t'_{y0}^{SL}$ determined as described in the examples A1.1.1, A1.1.2, A1.1.3, and A1.1.4; (2) additional m contiguous logical slots until logical slot $t'_{ym-1}^{SL}$, wherein $t'_{ym-1}^{SL}$ is M or 31 logical slots after the end of the sensing window (i.e., if $t_{sen-end}^{SL}$ is the last slot of the sensing window, $t'_{ym-1}^{SL} = t_{sen-end}^{SL} + M$ or $t'_{ym-1}^{SL} = t_{sen-end}^{SL} + 31$). M can be specified in the system specifications and/or (pre-)configured or updated by higher layer RRC signaling and/or MAC CE signaling and/or L1 control signaling, in one example M is 31 slots; (3) if the $m < Y_{min}'$. The UE can select an additional Y'-m slots ($Y' \geq Y_{min}'$) after $t'_{ym-1}^{SL}$ and before the end of a resource selection window, wherein the end of the resource selection window is given by $n+T_2$, and $T_2$ is determined as described in section 8.1.4 of TS 38.214. The additional slots after slot $t_{sen-end}^{SL}$ don't have to be contiguous; and (4) if $m \geq Y_{min}'$, the index of the last logical slot for resource selection is given by at least $t'_{y0}^{SL} + Y_{min}' - 1$. The logical slots are contiguous after slot $t'_{y0}^{SL}$ ($Y_{min}'$ contiguous logical slots after and including $t'_{y0}^{SL}$).

In one example A1.2, in the logical slot(s) immediately preceding and up to slot n (if slot n is a logical slot), the UE performed sensing. Assume that the first logical slot the UE has contiguous sensing results for before slot n is slot $t_{sen-start}^{SL}$.

Figure 35:
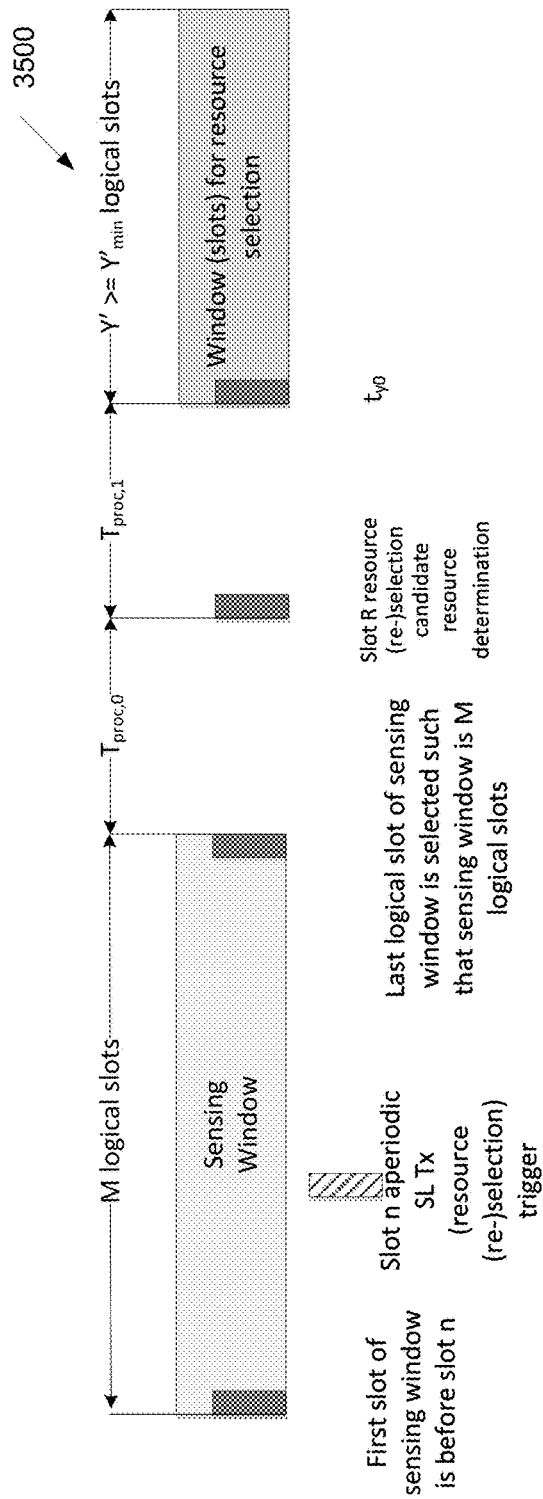

FIG. 35 illustrates yet another example of sensing operation 3500 according to embodiments of the present disclosure. An embodiment of the sensing operation 3500 shown in FIG. 35 is for illustration only.

In one example A1.2.1, as illustrated in FIG. 35, the number of contiguously sensed slots up to slot n is less than M the UE continues sensing after slot n. The last slot of the sensing window is M−1 logical slots after slot $t_{sen-start}^{SL}$ denote this logical slot as $t_{sen-end}^{SL}$ i.e., the total number of logical slots in the sensing window is M. M can be specified in the system specifications and/or (pre-)configured or updated by higher layer RRC signaling and/or MAC CE signaling and/or L1 control signaling, in one example M is 31 slots. The UE can perform resource selection of the candidate set in slot n. The UE selects Y' contiguous logical slots for SL resource selection, wherein $Y' \geq Y_{min}'$. $Y_{min}'$ can be specified in the system specifications and/or (pre-)configured or updated by higher layer RRC signaling and/or MAC CE signaling and/or L1 control signaling. The first slot selected for resource selection is denoted as logical slot $t'_{y0}{}^{SL}$, wherein logical slot $t'_{y0}{}^{SL}$ is at least $T_{proc,0}{}^{SL}+T_{proc,1}{}^{SL}$ after the end of the sensing window, wherein $T_{proc,0}{}^{SL}$ and $T_{proc,1}{}^{SL}$ are in units of physical time (e.g., milli-seconds) or in units of physical slot. $T_{proc,0}{}^{SL}$ is the time between the end of the sensing window (e.g., $t_{sen-end}{}^{SL}$) and the slot of resource selection, e.g., $T_{proc,0}{}^{SL}$ can be as illustrated in TABLE 2. $T_{proc,1}{}^{SL}$ is the time between the slot of resource selection and the start of the window for sidelink resource selection (e.g., $t'_{y0}{}^{SL}$), e.g., $T_{proc,1}{}^{SL}$ can be as illustrated in TABLE 3. $T_{proc,0}{}^{SL}$ and/or $T_{proc,1}{}^{SL}$ can be specified in the system specifications and/or (pre-) configured or updated by higher layer RRC signaling and/or MAC CE signaling and/or L1 control signaling. In one example, $T_{proc,0}{}^{SL}$ and/or $T_{proc,1}{}^{SL}$ can depend on a UE capability. The time period between slot R and the last logical slot of the sensing window, in FIG. 35, can be larger than $T_{proc,0}{}^{SL}$ as not all physical slots are logical slots.

Figure 36:
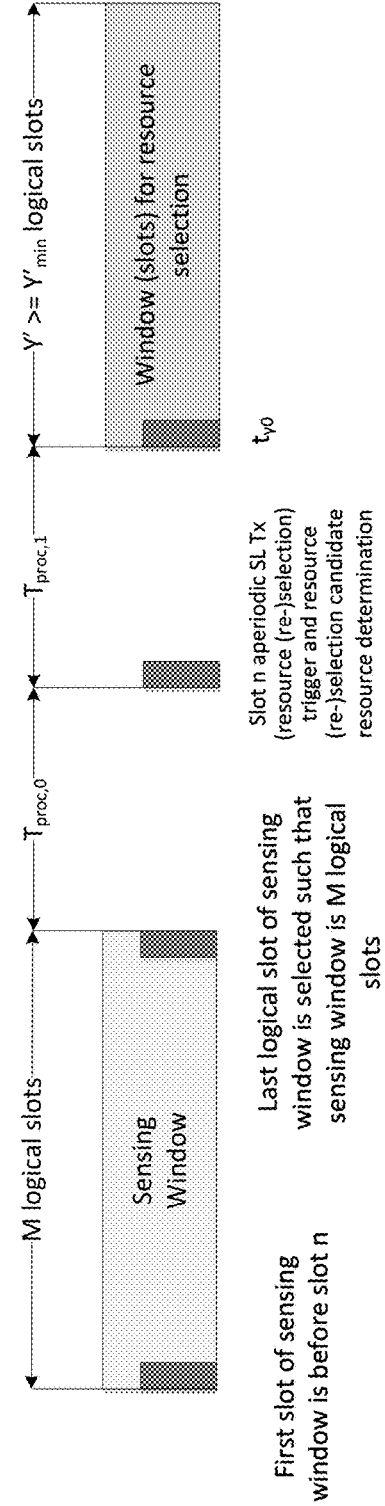

FIG. 36 illustrates yet another example of sensing operation 3600 according to embodiments of the present disclosure. An embodiment of the sensing operation 3600 shown in FIG. 36 is for illustration only.

In one example A1.2.2, as illustrated in FIG. 36, the number of contiguously sensed slots up to slot n is more than or equal to M. The sensing window ends before slot $n-T_{proc,0}{}^{SL}$. The sensing window duration is M logical slots. The last logical slot of the sensing window is denoted as slot $t_{sen-end}{}^{SL}$. M can be specified in the system specifications and/or (pre-)configured or updated by higher layer RRC signaling and/or MAC CE signaling and/or L1 control signaling, in one example M is 31 slots. The UE selects Y' contiguous logical slots for SL resource selection, wherein $Y' \geq Y_{min}'$. $Y_{min}'$ can be specified in the system specifications and/or (pre-)configured or updated by higher layer RRC signaling and/or MAC CE signaling and/or L1 control signaling. The first slot selected for resource selection is denoted as logical slot $t'_{y0}{}^{SL}$, wherein logical slot $t'_{y0}{}^{SL}$ is at least $T_{proc,1}{}^{SL}$ after slot n. Wherein $T_{proc,0}{}^{SL}$ and $T_{proc,1}{}^{SL}$ are in units of physical time (e.g., milli-seconds) or in units of physical slot. $T_{proc,0}{}^{SL}$ is the time between the end of the sensing window (e.g., $t_{sen-end}{}^{SL}$) and the slot of resource selection, e.g., $T_{proc,0}{}^{SL}$ can be as illustrated in TABLE 2. $T_{proc,1}{}^{SL}$ is the time between the slot of resource selection and the start of the window for sidelink resource selection (e.g., $t'_{y0}{}^{SL}$), e.g., $T_{proc,1}{}^{SL}$ can be as illustrated in TABLE 3. $T_{proc,0}{}^{SL}$ and/or $T_{proc,1}{}^{SL}$ can be specified in the system specifications and/or (pre-)configured or updated by higher layer RRC signaling and/or MAC CE signaling and/or L1 control signaling. In one example, $T_{proc,0}{}^{SL}$ and/or $T_{proc,1}{}^{SL}$ can depend on a UE capability. The time period between slot R and the last logical slot of the sensing window, in FIG. 36, can be larger than $T_{proc,0}{}^{SL}$ as not all physical slots are logical slots.

Figure 37:
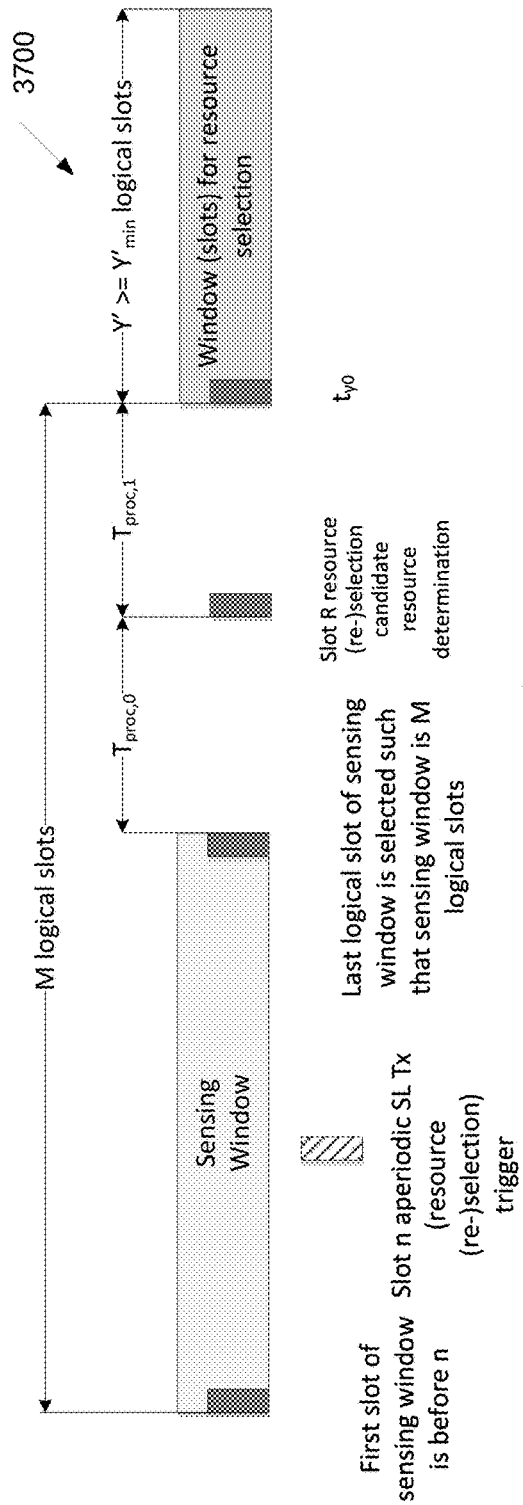
Figure 38:
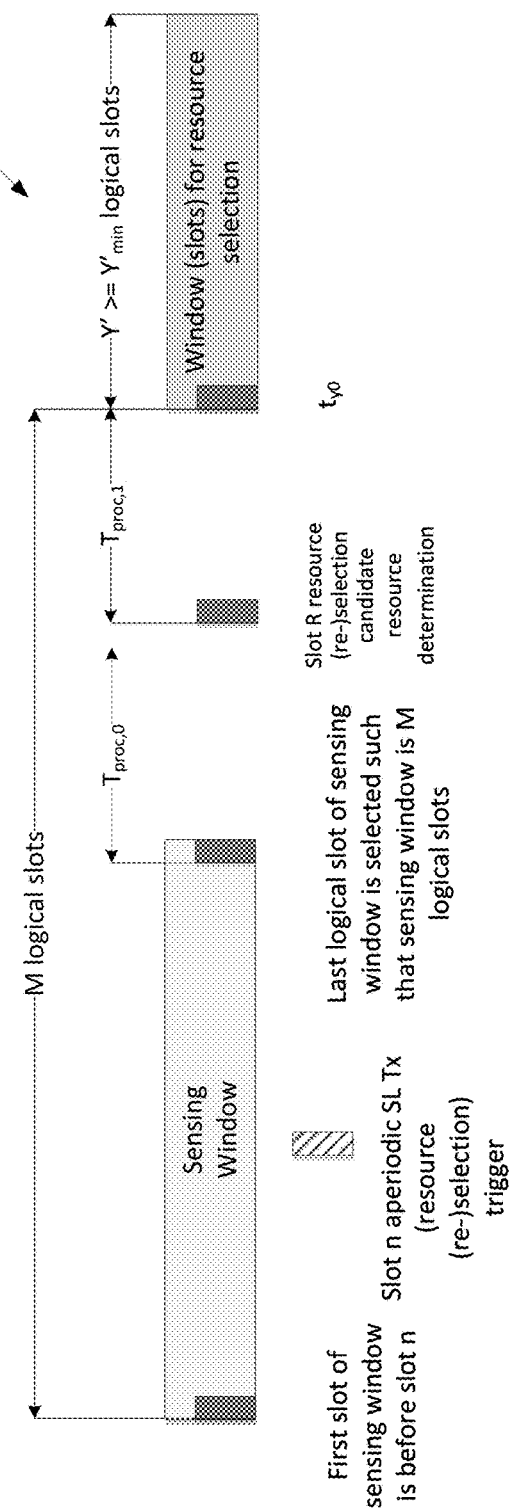
Figure 39:
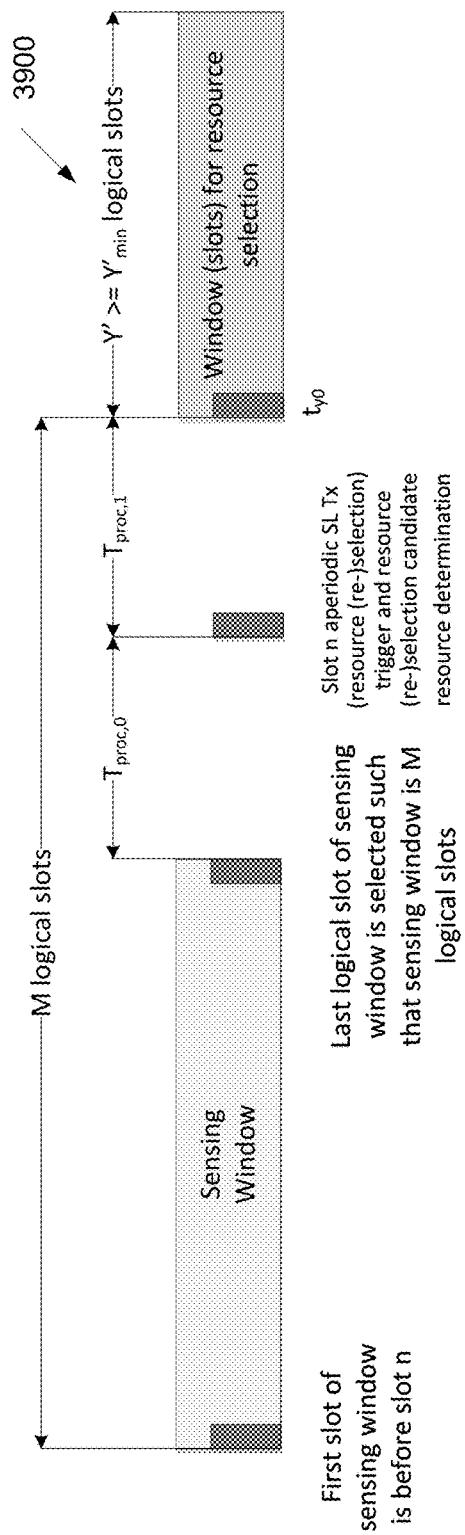
Figure 40:
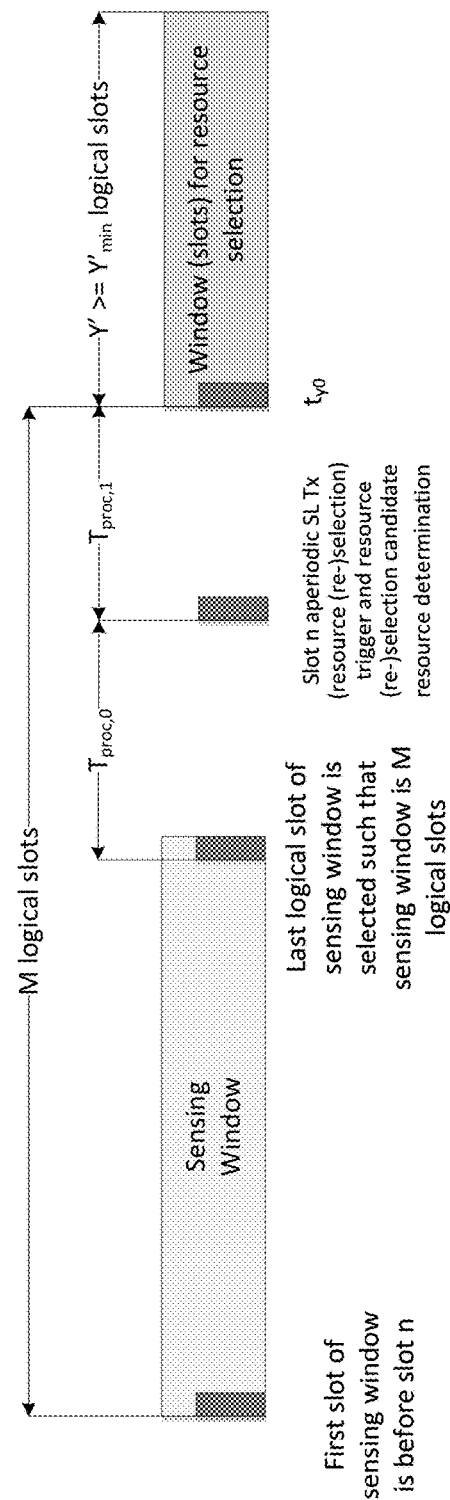

In one example A1.2.3, the index of the first logical slot in the set of contiguously sensed slots before slot n is $t'_{sen-start}{}^{SL}$. The first slot selected for resource selection is denoted as logical slot $t'_{y0}{}^{SL}$, wherein logical slot $t'_{y0}{}^{SL}$ is the larger of: (1) Case 1: FIG. 37 and FIG. 38: M logical slots after slot $t'_{n'}{}^{SL}$, e.g., $t'_{y0}{}^{SL}=t_{sen-start}{}^{SL}+M$, where $t'_{n'}{}^{SL}=t'_{sen-start}{}^{SL}$; and (2) Case 2: FIG. 39 and FIG. 40: starting at or after slot $n+T_{proc,1}{}^{SL}$.

FIG. 37 illustrates yet another example of sensing operation 3700 according to embodiments of the present disclosure. An embodiment of the sensing operation 3700 shown in FIG. 37 is for illustration only.

FIG. 38 illustrates yet another example of sensing operation 3800 according to embodiments of the present disclosure. An embodiment of the sensing operation 3800 shown in FIG. 38 is for illustration only.

FIG. 39 illustrates yet another example of sensing operation 3900 according to embodiments of the present disclosure. An embodiment of the sensing operation 3900 shown in FIG. 39 is for illustration only.

FIG. 40 illustrates yet another example of sensing operation 4000 according to embodiments of the present disclosure. An embodiment of the sensing operation 4000 shown in FIG. 40 is for illustration only.

M can be specified in the system specifications and/or (pre-)configured or updated by higher layer RRC signaling and/or MAC CE signaling and/or L1 control signaling, in one example M is 31 slots: (1) for case 1, the start of the sensing window is $t_{sen-start}{}^{SL}=t'_{sen-start}{}^{SL}$. The last slot of the sensing window is denoted as, e.g., $t_{sen-end}{}^{SL}$, wherein, $t_{sen-end}{}^{SL}$, is earlier than (or before or earlier than) $t'_{y0}{}^{SL}$ by $T_{proc,0}{}^{SL}+T_{proc,1}{}^{SL}$; and (2) for case 2, the start of M logical slots earlier than slot $t'_{y0}{}^{SL}$. e.g., $t_{sen-start}{}^{SL}=t'_{y0}{}^{SL}-M$. The last slot of the sensing window is denoted as, e.g., $t_{sen-end}{}^{SL}$, wherein, $t_{sen-end}{}^{SL}$, is earlier than (or before or earlier than) $t'_{y0}{}^{SL}$ by $T_{proc,0}{}^{SL}+T_{proc,1}{}^{SL}$.

Wherein $T_{proc,0}{}^{SL}$ and $T_{proc,1}{}^{SL}$ are in units of physical time (e.g., milli-seconds) or in units of physical slot. $T_{proc,0}{}^{SL}$ is the time between the end of the sensing window (e.g., $t_{sen-end}{}^{SL}$) and the slot of resource selection, e.g., $T_{proc,0}{}^{SL}$ can be as illustrated in TABLE 2. $T_{proc,1}{}^{SL}$ is the time between the slot of resource selection and the start of the window for sidelink resource selection (e.g., $t'_{y0}{}^{SL}$), e.g., $T_{proc,1}{}^{SL}$ can be as illustrated in TABLE 3. $T_{proc,0}{}^{SL}$ and/or $T_{proc,1}{}^{SL}$ can be specified in the system specifications and/or (pre-)configured or updated by higher layer RRC signaling and/or MAC CE signaling and/or L1 control signaling. In one example, $T_{proc,0}{}^{SL}$ and/or $T_{proc,1}{}^{SL}$ can depend on a UE capability.

In case 1 and case 2, the UE selects Y' contiguous logical slots for SL resource selection starting with slot $t'_{y0}{}^{SL}$, wherein $Y' \geq Ym Y_{min}'$. $Y_{min}'$ can be specified in the system specifications and/or (pre-)configured or updated by higher layer RRC signaling and/or MAC CE signaling and/or L1 control signaling. The time period between slot R and the last logical slot of the sensing window, in FIGS. 37, 38, 39, and 40, can be larger than $T_{proc,0}{}^{SL}$ as not all physical slots are logical slots.

FIG. 37 illustrates the Example A1.2.3 case 1, FIG. 38 illustrates Example A1.2.3 case 1, FIG. 39 illustrates Example A1.2.3 case 2, and FIG. 40 illustrates Example A1.2.3 case 2).

In one example A1.2.4, the window (slots) for resource selection in examples A1.2.1, A1.2.2, and A1.2.3, comprises: (1) a first logical slot $t'_{y0}{}^{SL}$ determined as described in the examples A1.2.1, A1.2.2, and A1.2.3; (2) additional m contiguous logical slots until logical slot $t'_{ym-1}{}^{SL}$, wherein $t'_{ym-1}{}^{SL}$ is M or 31 logical slots after the end of the sensing window (i.e., if $t_{sen-end}{}^{SL}$ is the last slot of the sensing window, $t'_{ym-1}{}^{SL}=t_{sen-end}{}^{SL}+M$ or $t'_{ym-1}{}^{SL}=t_{sen-end}{}^{SL}+31$). M can be specified in the system specifications and/or (pre-) configured or updated by higher layer RRC signaling and/or MAC CE signaling and/or L1 control signaling, in one example M is 31 slots; (3) if the $m<Y_{min}'$. The UE can select an additional Y'−m slots ($Y' \geq Y_{min}'$) after $t'_{ym-1}{}^{SL}$ and before the end of a resource selection window, wherein the end of the resource selection window is given by $n+T_2$, and $T_2$ is determined as described in TS 38.214. The additional slots after slot $t_{sen-end}^{SL}$ don't have to be contiguous; and (4) if m≥$Y_{min}$', the index of the last logical slot for resource selection is given by at least $t'_{y0}^{SL}+Y_{min}'-1$. The logical slots are contiguous after slot $t'_{y0}^{SL}$ ($Y_{min}'$ contiguous logical slots after and including $t'_{y0}^{SL}$).

In one example A1.3, in the logical slot(s) immediately preceding slot n, the UE didn't perform sensing. The UE selects the first slot selected for resource selection $t'_{y0}^{SL}$.

Figure 41:
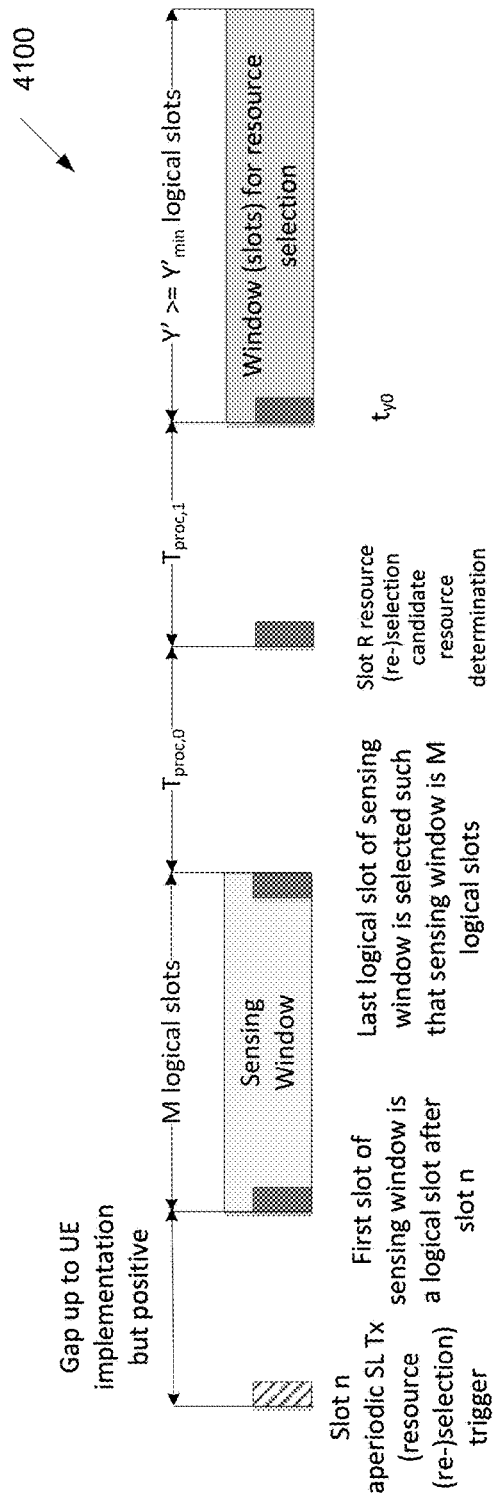

FIG. 41 illustrates yet another example of sensing operation 4100 according to embodiments of the present disclosure. An embodiment of the sensing operation 4100 shown in FIG. 41 is for illustration only.

In one example A1.3.1, the UE can starts sensing in the first logical slot after slot n as illustrated in FIG. 41.

The end of the sensing window is in logical slot $T_{proc,0}^{SL}$ that ends (or starts) at least $T_{proc,0}^{SL}+T_{proc,1}^{SL}$ before slot $t'_{y0}^{SL}$. $T_{proc,0}^{SL}$ is the time between the end of the sensing window (e.g., $T_{proc,0}^{SL}$) and the slot of resource selection, e.g., $T_{proc,0}^{SL}$ can be as illustrated in TABLE 2. $T_{proc,1}^{SL}$ is the time between the slot of resource selection and the start of the window for sidelink resource selection (e.g., $t'_{y0}^{SL}$), e.g., $T_{proc,1}^{SL}$ can be as illustrated in TABLE 3. $T_{proc,0}^{SL}$ and $T_{proc,1}^{SL}$ are in units of physical time (e.g., milli-seconds) or in units of physical slot. $T_{proc,0}^{SL}$ and/or $T_{proc,1}^{SL}$ can be specified in the system specifications and/or (pre-)configured or updated by higher layer RRC signaling and/or MAC CE signaling and/or L1 control signaling. In one example, $T_{proc,1}^{SL}$ and/or $T_{proc,1}^{SL}$ can depend on a UE capability.

The start of the sensing window is M−1 logical slots before the last slot of the sensing window. Denote the start of the sensing window as $t_{sen-start}^{SL}$. Therefore, $t_{sen-start}^{SL}=t_{sen-end}^{SL}-(M-1)$. The total number of logical slots in the sensing window is M. M can be specified in the system specifications and/or (pre-)configured or updated by higher layer RRC signaling and/or MAC CE signaling and/or L1 control signaling, in one example M is 31 slots.

$t'_{y0}^{SL}$ is selected such that $t_{sen-start}^{SL}$ is at or after slot n.

The UE selects Y' contiguous logical slots for SL resource selection, wherein Y'≥$Y_{min}$'. $Y_{min}$' can be specified in the system specifications and/or (pre-)configured or updated by higher layer RRC signaling and/or MAC CE signaling and/or L1 control signaling. The time period between slot R and the last logical slot of the sensing window, in FIG. 41, can be larger than $T_{proc,0}^{SL}$ as not all physical slots are logical slots.

Figure 42:
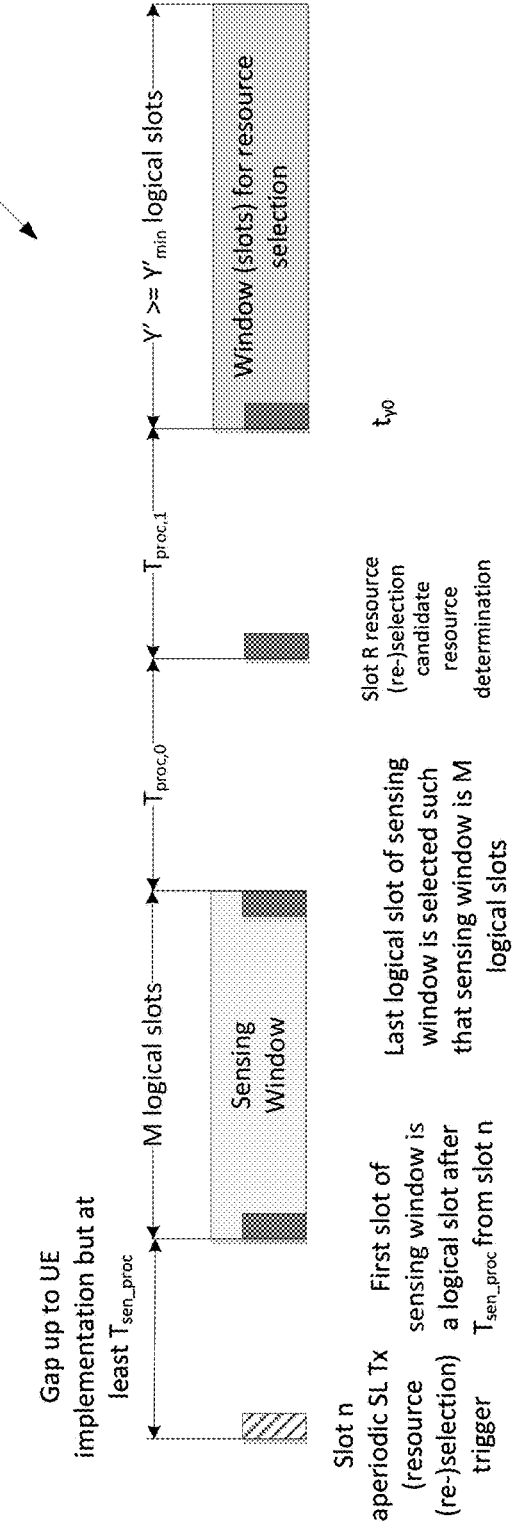

FIG. 42 illustrates yet another example of sensing operation 4200 according to embodiments of the present disclosure. An embodiment of the sensing operation 4200 shown in FIG. 42 is for illustration only.

In one example A1.3.2, the UE can start sensing in the first logical slot at or after slot n by at least $T_{sen-proc}$ (minimum time required for UE to start sensing after being triggered in slot n) as illustrated in FIG. 42, wherein T sen-proc can be in units of physical time (e.g., milli-seconds) or physical slots. T sen-proc can be specified in the system specifications and/or (pre) configured or updated by higher layer RRC signaling and/or MAC CE signaling and/or L1 control signaling. In one example, T sen-proc can depend on a UE capability.

The end of the sensing window is in logical slot $t_{sen-end}^{SL}$ that ends (or starts) at least $T_{proc,0}^{SL}+T_{proc,1}^{SL}$ before slot $t'_{y0}^{SL}$. $T_{proc,0}^{SL}$ is the time between the end of the sensing window (e.g., $t_{sen-end}^{SL}$) and the slot of resource selection, e.g., $T_{proc,0}^{SL}$ can be as illustrated in TABLE 2. $T_{proc,1}^{SL}$ is the time between the slot of resource selection and the start of the window for sidelink resource selection (e.g., $t'_{y0}^{SL}$), e.g., $T_{proc,1}^{SL}$ can be as illustrated in TABLE 3. $T_{proc,0}^{SL}$ and $T_{proc,1}^{SL}$ are in units of physical time (e.g., milli-seconds) or in units of physical slot. $T_{proc,0}^{SL}$ and/or $T_{proc,1}^{SL}$ can be specified in the system specifications and/or (pre-)configured or updated by higher layer RRC signaling and/or MAC CE signaling and/or L1 control signaling. In one example, $T_{proc,0}^{SL}$ and/or $T_{proc,1}^{SL}$ can depend on a UE capability.

The start of the sensing window is M−1 logical slots before the last slot of the sensing window. Denote the start of the sensing window as $t_{sen-start}^{SL}$. Therefore, $t_{sen-start}^{SL}=t_{sen-end}^{SL}-(M-1)$. The total number of logical slots in the sensing window is M. M can be specified in the system specifications and/or (pre-)configured or updated by higher layer RRC signaling and/or MAC CE signaling and/or L1 control signaling, in one example M is 31 slots.

$t'_{y0}^{SL}$ is selected such that $t_{sen-start}^{SL}$ is at or after slot n by at least $T_{sen-proc}$.

The UE selects Y' contiguous logical slots for SL resource selection, wherein Y'≥$Y_{min}$'. $Y_{min}$' can be specified in the system specifications and/or (pre-)configured or updated by higher layer RRC signaling and/or MAC CE signaling and/or L1 control signaling. The time period between slot R and the last logical slot of the sensing window, in FIG. 42, can be larger than $T_{proc,0}^{SL}$ as not all physical slots are logical slots.

Figure 43:
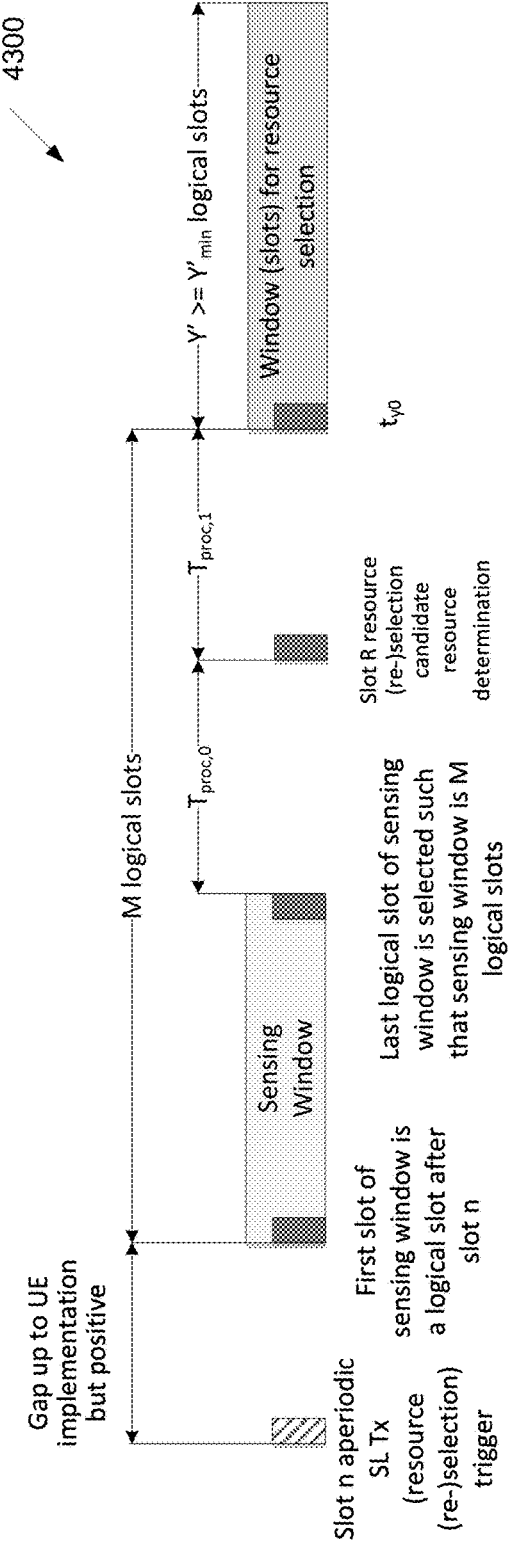

FIG. 43 illustrates yet another example of sensing operation 4300 according to embodiments of the present disclosure. An embodiment of the sensing operation 4300 shown in FIG. 43 is for illustration only.

Figure 44:
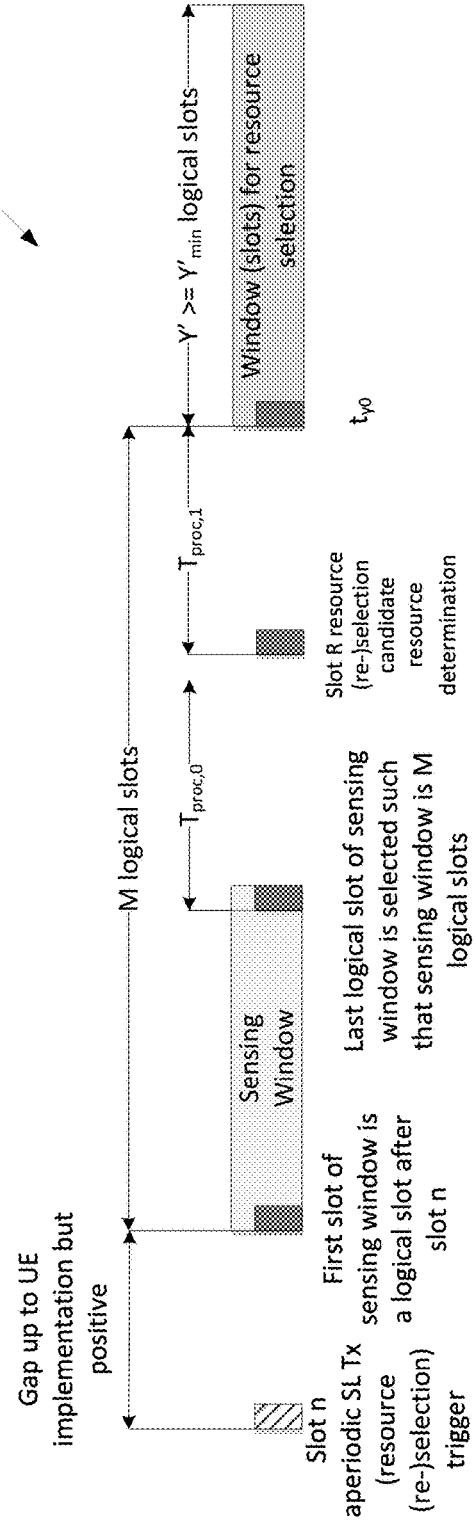

FIG. 44 illustrates yet another example of sensing operation 4400 according to embodiments of the present disclosure. An embodiment of the sensing operation 4400 shown in FIG. 44 is for illustration only.

In one example A1.3.3, the UE can start sensing in the first logical slot at or after slot n as illustrated in FIG. 43 and FIG. 44.

The end of the sensing window is in logical slot $t_{sen-end}^{SL}$ that ends (or starts) at least $T_{proc,0}^{SL}+T_{proc,1}^{SL}$ before slot $t'_{y0}^{SL}$. $T_{proc,0}^{SL}$ is the time between the end of the sensing window (e.g., $t_{sen-end}^{SL}$) and the slot of resource selection, e.g., $T_{proc,0}^{SL}$ can be as illustrated in TABLE 2. $T_{proc,1}^{SL}$ is the time between the slot of resource selection and the start of the window for sidelink resource selection (e.g., $t'_{y0}^{SL}$), e.g., $T_{proc,1}^{SL}$ can be as illustrated in TABLE 3. $T_{proc,0}^{SL}$ and $T_{proc,1}^{SL}$ are in units of physical time (e.g., milli-seconds) or in units of physical slot. $T_{proc,0}^{SL}$ and/or $T_{proc,1}^{SL}$ can be specified in the system specifications and/or (pre-)configured or updated by higher layer RRC signaling and/or MAC CE signaling and/or L1 control signaling. In one example, $T_{proc,0}^{SL}$ and/or $T_{proc,1}^{SL}$ can depend on a UE capability.

The start of the sensing window is M logical slots before slot $t'_{y0}^{SL}$. Denote the start of the sensing window as $t_{sen-start}^{SL}$. Therefore, $t_{sen-start}^{SL}=t'_{y0}^{SL}-M$. M can be specified in the system specifications and/or (pre-)configured or updated by higher layer RRC signaling and/or MAC CE signaling and/or L1 control signaling, in one example M is 31 slots.

$t'_{y0}^{SL}$ is selected such that $t_{sen-start}^{SL}$ is at or after slot n.

The UE selects Y' contiguous logical slots for SL resource selection, wherein Y'≥$Y_{min}$'. $Y_{min}$' can be specified in the system specifications and/or (pre-)configured or updated by higher layer RRC signaling and/or MAC CE signaling and/or L1 control signaling. The time period between slot R and the last logical slot of the sensing window, in FIGS. 43 and 44, can be larger than $T_{proc,0}^{SL}$ as not all physical slots are logical slots.

Figure 45:
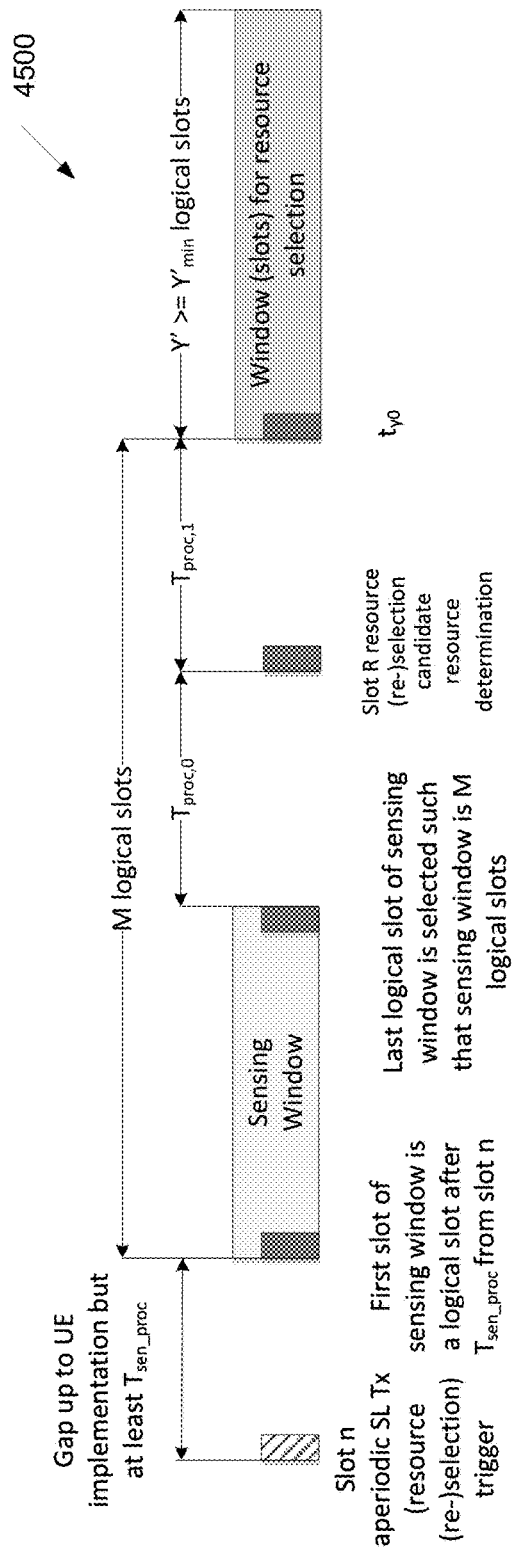

FIG. 45 illustrates yet another example of sensing operation 4500 according to embodiments of the present disclosure. An embodiment of the sensing operation 4500 shown in FIG. 45 is for illustration only.

Figure 46:
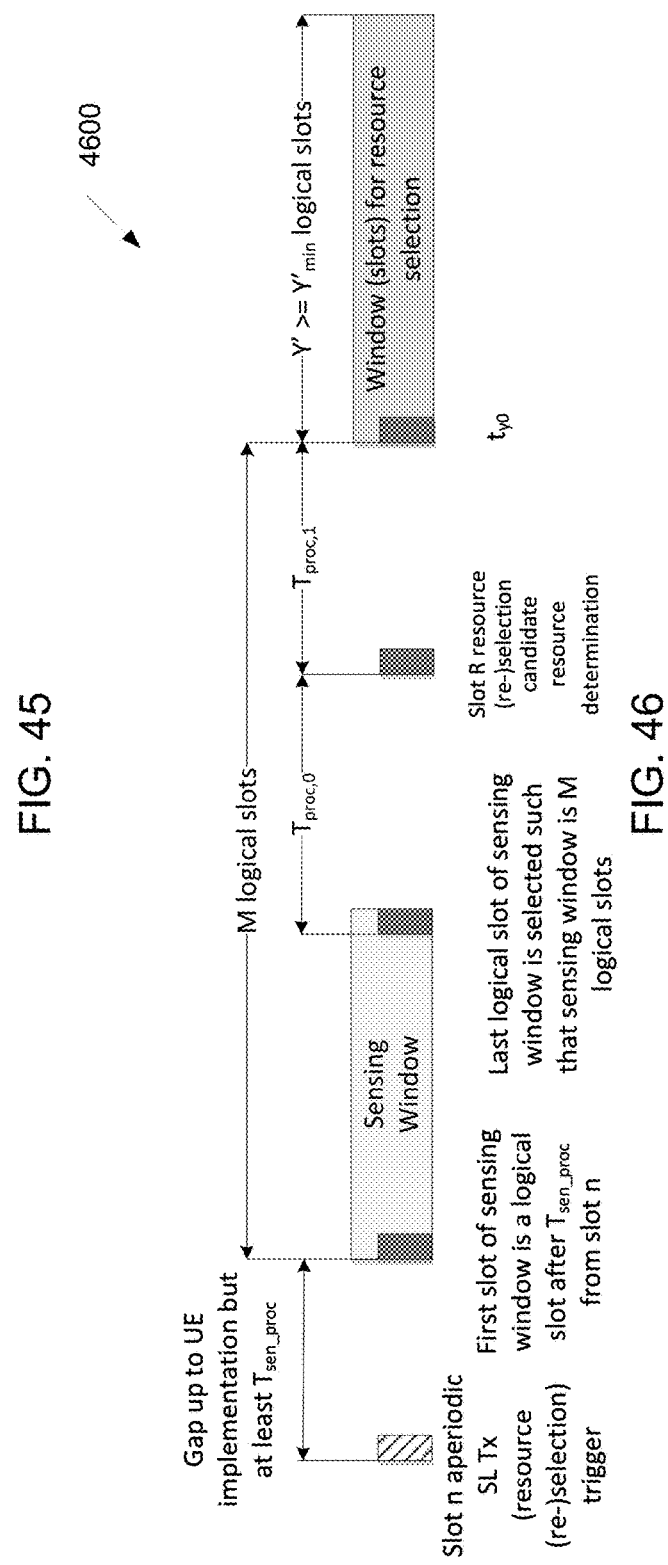

FIG. 46 illustrates yet another example of sensing operation 4600 according to embodiments of the present disclosure. An embodiment of the sensing operation 4600 shown in FIG. 46 is for illustration only.

In one example A1.3.4, the UE can starts sensing in the first logical slot after slot n by at least $T_{sen-proc}$ (minimum time required for UE to start sensing after being triggered in slot n) as illustrated in FIG. 45 and FIG. 46, wherein $T_{sen-proc}$ can be in units of physical time (e.g., milli-seconds) or physical slots. $T_{sen-proc}$ can be specified in the system specifications and/or (pre-) configured or updated by higher layer RRC signaling and/or MAC CE signaling and/or L1 control signaling. In one example, T sen-proc can depend on a UE capability.

The end of the sensing window is in logical slot $t_{sen-end}^{SL}$ that ends (or starts) at least $T_{proc,0}^{SL}+T_{proc,1}^{SL}$ before slot $t'_{y0}^{SL}$. $T_{proc,0}^{SL}$ is the time between the end of the sensing window (e.g., $t_{sen-end}^{SL}$) and the slot of resource selection, e.g., $T_{proc,0}^{SL}$ can be as illustrated in TABLE 2. $T_{proc,1}^{SL}$ is the time between the slot of resource selection and the start of the window for sidelink resource selection (e.g., $t'_{y0}^{SL}$), e.g., $T_{proc,1}^{SL}$ can be as illustrated in TABLE 3. $T_{proc,0}^{SL}$ and $T_{proc,1}^{SL}$ are in units of physical time (e.g., milli-seconds) or in units of physical slot. $T_{proc,0}^{SL}$ and/or $T_{proc,1}^{SL}$ can be specified in the system specifications and/or (pre-)configured or updated by higher layer RRC signaling and/or MAC CE signaling and/or L1 control signaling. In one example, $T_{proc,0}^{SL}$ and/or $T_{proc,1}^{SL}$ can depend on a UE capability.

The start of the sensing window is M logical slots before slot $t'_{y0}^{SL}$. Denote the start of the sensing window as $t_{sen-start}^{SL}$. Therefore, $t_{sen-start}^{SL}=t'_{y0}^{SL}-M$. M can be specified in the system specifications and/or (pre-)configured or updated by higher layer RRC signaling and/or MAC CE signaling and/or L1 control signaling, in one example M is 31 slots.

$t'_{y0}^{SL}$ is selected such that $t_{sen-start}^{SL}$ is after slot n by at least $T_{sen-proc}$.

The UE selects Y' contiguous logical slots for SL resource selection, wherein $Y' \geq Y_{min}'$. $Y_{min}'$ can be specified in the system specifications and/or (pre-)configured or updated by higher layer RRC signaling and/or MAC CE signaling and/or L1 control signaling. The time period between slot R and the last logical slot of the sensing window, in FIG. 45 and FIG. 46, can be larger than $T_{proc,0}^{SL}$ as not all physical slots are logical slots.

In one example A1.3.5, the window (slots) for resource selection in examples A1.3.1, A1.3.2, A1.3.3, and A1.3.4, comprises: (1) a first logical slot $t'_{y0}^{SL}$ determined as described in the examples A1.3.1, A1.3.2, A1.3.3, and A1.3.4; (2) additional m contiguous logical slots until logical slot $t'_{ym-1}^{SL}$, wherein $t'_{ym-1}^{SL}$ is M or 31 logical slots after the end of the sensing window (i.e., if $t_{sen-end}^{SL}$ is the last slot of the sensing window, $t'_{ym-1}^{SL}=t_{sen-end}^{SL}+M$ or $t'_{ym-1}^{SL}=t_{sen-end}^{SL}+31$). M can be specified in the system specifications and/or (pre-)configured or updated by higher layer RRC signaling and/or MAC CE signaling and/or L1 control signaling, in one example M is 31 slots; (3) if the $m<Y_{min}'$. The UE can select an additional Y'-m slots ($Y' \geq Y_{min}'$) after $t'_{ym-1}^{SL}$ and before the end of a resource selection window, wherein the end of the resource selection window is given by $n+T_2$, and $T_2$ is determined as described in TS 38.214. The additional slots after slot $t_{sen-end}^{SL}$ don't have to be contiguous; and (4) if $m \geq Y_{min}'$, the index of the last logical slot for resource selection is given by at least $t'_{y0}^{SL}+Y_{min}'-1$. The logical slots are contiguous after slot $t'_{y0}^{SL}$ ($Y_{min}'$ contiguous logical slots after and including $t'_{y0}^{SL}$).

In one example A1.4, in the logical slot(s) immediately preceding and up to slot n (if slot n is a logical slot), the UE performed sensing. Assume that the first logical slot the UE has contiguous sensing results for before slot n is slot $t'_{sen-start}^{SL}$. The UE selects the first slot selected for resource selection $t'_{y0}^{SL}$.

Figure 47:
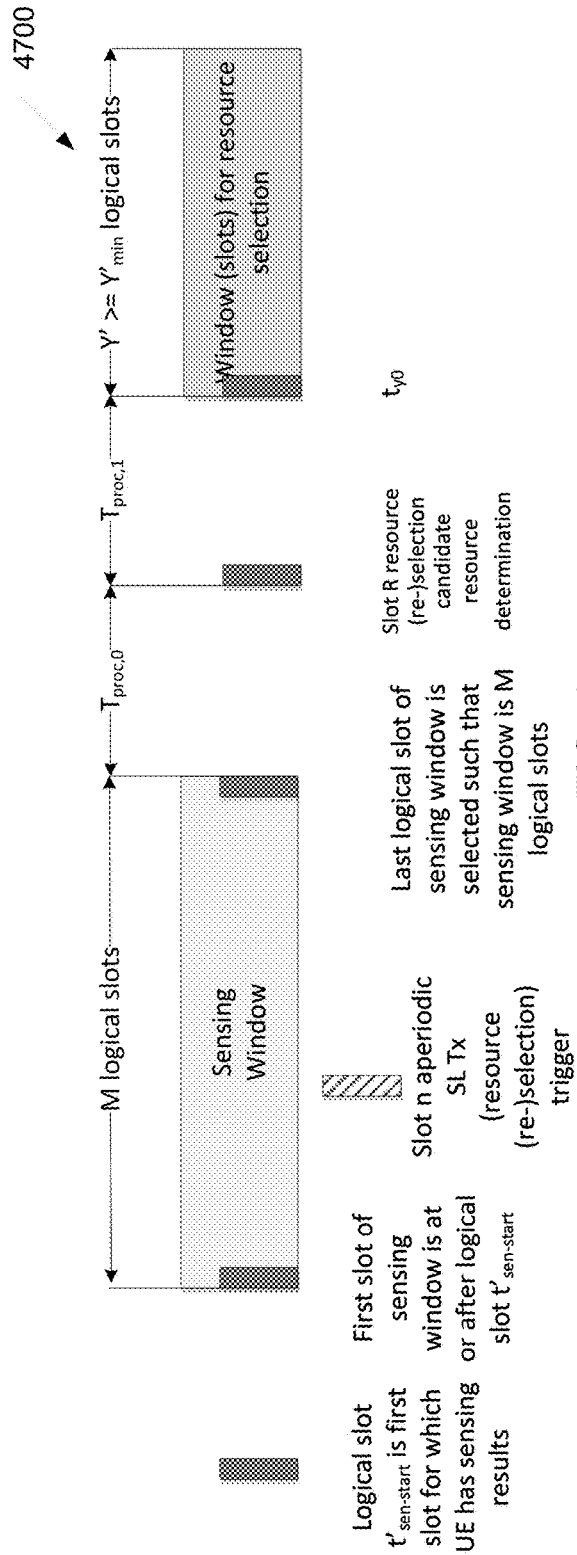

FIG. 47 illustrates yet another example of sensing operation 4700 according to embodiments of the present disclosure. An embodiment of the sensing operation 4700 shown in FIG. 47 is for illustration only.

In one example A1.4.1, the UE can continue sensing after slot n as illustrated in FIG. 47.

The end of the sensing window is in logical slot $t_{sen-end}^{SL}$ that ends (or starts) at least $T_{proc,0}^{SL}+T_{proc,1}^{SL}$ before slot $t'_{y0}^{SL}$ is the time between the end of the sensing window (e.g., $t_{sen-end}^{SL}$) and the slot of resource selection, e.g., $T_{proc,0}^{SL}$ is as illustrated in TABLE 2. $T_{proc,1}^{SL}$ is the time between the slot of resource selection and the start of the window for sidelink resource selection (e.g., $t'_{y0}^{SL}$), e.g., $T_{proc,1}^{SL}$ is as illustrated in TABLE 3. $T_{proc,0}^{SL}$ and $T_{proc,1}^{SL}$ are in units of physical time (e.g., milli-seconds) or in units of physical slot. $T_{proc,0}^{SL}$ and/or $T_{proc,1}^{SL}$ can be specified in the system specifications and/or (pre-)configured or updated by higher layer RRC signaling and/or MAC CE signaling and/or L1 control signaling. In one example, $T_{proc,0}^{SL}$ and/or $T_{proc,1}^{SL}$ can depend on a UE capability.

The start of the sensing window is M-1 logical slots before the last slot of the sensing window. Denote the start of the sensing window as $t_{sen-start}^{SL}$. Therefore, $t_{sen-start}^{SL}=t_{sen-end}^{SL}-(M-1)$. The total number of logical slots in the sensing window is M. M can be specified in the system specifications and/or (pre-)configured or updated by higher layer RRC signaling and/or MAC CE signaling and/or L1 control signaling, in one example M is 31 slots. $t'_{y0}^{SL}$ is selected such that $t_{sen-start}^{SL}$ is at or after $t'_{sen-start}^{SL}$.

The UE selects Y' contiguous logical slots for SL resource selection, wherein $Y' \geq Y_{min}'$. $Y_{min}'$ can be specified in the system specifications and/or (pre-)configured or updated by higher layer RRC signaling and/or MAC CE signaling and/or L1 control signaling. The time period between slot R and the last logical slot of the sensing window, in FIG. 47, can be larger than $T_{proc,0}^{SL}$ as not all physical slots are logical slots.

Figure 48:
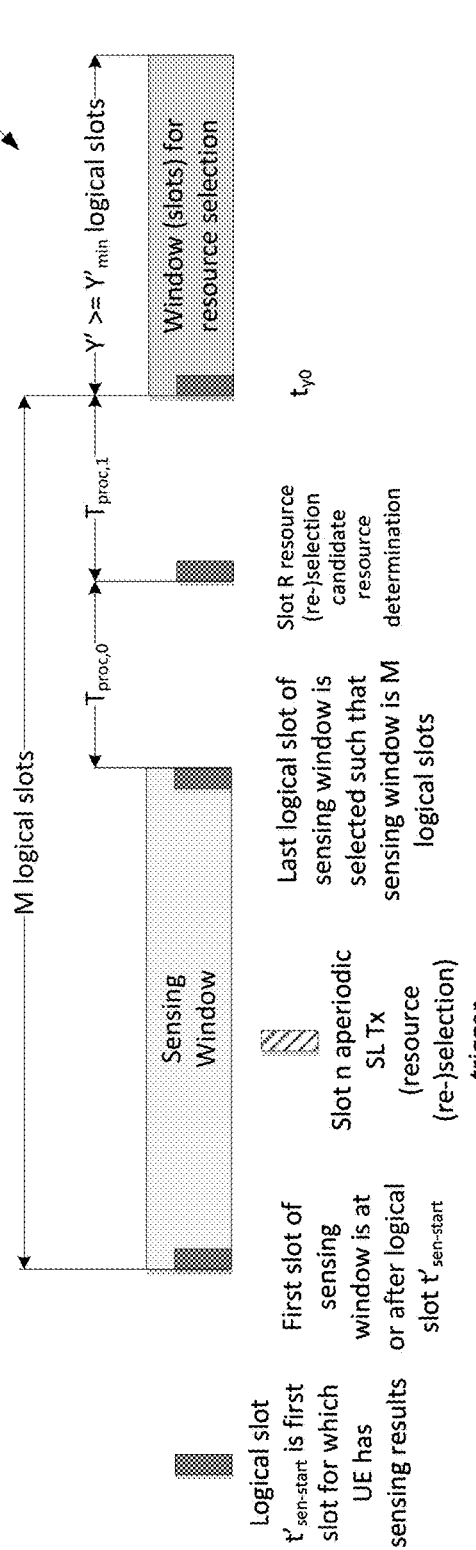

FIG. 48 illustrates yet another example of sensing operation 4800 according to embodiments of the present disclosure. An embodiment of the sensing operation 4800 shown in FIG. 48 is for illustration only.

In one example A1.4.2, the UE can continue sensing after slot n as illustrated in FIG. 48.

The end of the sensing window is in logical slot $t_{sen-end}^{SL}$ that ends (or starts) at least $T_{proc,0}^{SL}+T_{proc,1}^{SL}$ before slot $t'_{y0}^{SL}$. $T_{proc,0}^{SL}$ is the time between the end of the sensing window (e.g., $t_{sen-end}^{SL}$) and the slot of resource selection, e.g., $T_{proc,0}^{SL}$ is as illustrated in TABLE 2. $T_{proc,1}^{SL}$ is the time between the slot of resource selection and the start of the window for sidelink resource selection (e.g., $t'_{y0}^{SL}$), e.g., $T_{proc,1}^{SL}$ is as illustrated in TABLE 3. $T_{proc,0}^{SL}$ and $T_{proc,1}^{SL}$ are in units of physical time (e.g., milli-seconds) or in units of physical slot. $T_{proc,0}^{SL}$ and/or $T_{proc,1}^{SL}$ can be specified in the system specifications and/or (pre-)configured or updated by higher layer RRC signaling and/or MAC CE signaling and/or L1 control signaling. In one example, $T_{proc,0}^{SL}$ and/or $T_{proc,1}^{SL}$ can depend on a UE capability.

The start of the sensing window is M logical slots before slot $t'_{y0}{}^{SL}$. Denote the start of the sensing window as $t_{sen-start}{}^{SL}$. Therefore, $t_{sen-start}{}^{SL}=t'_{y0}{}^{SL}-M$. M can be specified in the system specifications and/or (pre-)configured or updated by higher layer RRC signaling and/or MAC CE signaling and/or L1 control signaling, in one example M is 31 slots.

$t'_{y0}{}^{SL}$ is selected such that $t_{sen-start}{}^{SL}$ is at or after $t'_{sen-start}{}^{SL}$.

The UE selects Y' contiguous logical slots for SL resource selection, wherein $Y' \geq Y_{min}'$. $Y_{min}'$ can be specified in the system specifications and/or (pre-)configured or updated by higher layer RRC signaling and/or MAC CE signaling and/or L1 control signaling. The time period between slot R and the last logical slot of the sensing window, in FIG. 48, can be larger than $T_{proc,0}{}^{SL}$ as not all physical slots are logical slots.

In one example A1.4.3, the window (slots) for resource selection in examples A1.4.1, A1.4.2, and A1.4.3, comprises: (1) a first logical slot $t'_{y0}{}^{SL}$ determined as described in the examples A1.4.1, A1.4.2, and A1.4.3; (2) additional m contiguous logical slots until logical slot $t'_{ym-1}{}^{SL}$, wherein $t'_{ym-1}{}^{SL}$ is M or 31 logical slots after the end of the sensing window (i.e., if $t_{sen-end}{}^{SL}$ is the last slot of the sensing window, $t'_{ym-1}{}^{SL}=t_{sen-end}{}^{SL}+M$ or $t'_{ym-1}{}^{SL}=t_{sen-end}{}^{SL}+31$). M can be specified in the system specifications and/or (pre-)configured or updated by higher layer RRC signaling and/or MAC CE signaling and/or L1 control signaling, in one example M is 31 slots; (3) if the $m<Y_{min}'$. The UE can select an additional Y'-m slots ($Y' \geq Y_{min}'$) after $t'_{ym-1}{}^{SL}$ and before the end of a resource selection window, wherein the end of the resource selection window is given by $n+T_2$, and $T_2$ is determined as described in section 8.1.4 of TS 38.214. The additional slots after slot $t_{sen-end}{}^{SL}$ don't have to be contiguous; and (4) if $m \geq Y_{min}'$, the index of the last logical slot for resource selection is given by at least $t'_{y0}{}^{SL}+Y_{min}'-1$. The logical slots are contiguous after slot $t'_{y0}{}^{SL}$ ($Y_{min}'$ contiguous logical slots after and including $t'_{y0}{}^{SL}$).

In the examples of component 1, let $n+T_1$ be the start of the window for resource selection (e.g., $n+T_1$ the first slot selected for resource selection, can be $t'_{y0}{}^{SL}$ or a slot earlier than slot $t'_{y0}{}^{SL}$). The UE selects the end of the window for resource selection, e.g., $n+T_2$, such that the $T_2$ is less than the packet delay budget and $T_2-T_1 \geq T_{2min}$, wherein $T_{2min}$ is the minimum length of the window for resource selection. If the UE can't satisfy $T_2-T_1 \geq T_{2min}$, when it starts CPS M logical slots before $t'_{y0}{}^{SL}$, (or when it senses M logical slots of CPS before $t'_{y0}{}^{SL}$ depending on the use case) the UE can do one of the following: (1) ensure that $T_2-T_1 \geq T_{2min}$ criterion is fulfilled e.g., by starting sensing (or sensing depending on the use case) less than M logical slots for CPS before $t'_{y0}{}^{SL}$; and (2) by performing no CPS. The UE uses random resource selection.

The choice of one of the two aforementioned options can be up the UE's implementation.

In example A1.5, a UE performs resource (re-)selection for a SL transmission (e.g., aperiodic transmission) in slot $t'_{yi}{}^{SL}$. The UE and/or TX resource pool are (pre-)configured for partial sensing. The resource (re-)selection for the SL transmission in slot $t'_{y0}{}^{SL}$ is performed in slot $n_1$. A first selected (e.g., reserved) resource next transmission is in slot $t'_{yi+1}{}^{SL}$. The UE performs re-evaluation/pre-emption for the selected (e.g., reserved) resource in slot $n_2$.

For slot $n_1$, the UE performs sensing (e.g., for contiguous partial sensing (CPS)) before slot $t'_{yi}{}^{SL}$ that ends at $t'_{yi}{}^{SL}-T_{proc,0}{}^{SL}-T_{proc,1}{}^{SL}$. For CPS, the CPS sensing window starts M logical before the slot where SL transmission can takes place (e.g., slot $t'_{yi}{}^{SL}$ or slot $t'_{yi+1}{}^{SL}$).

Figure 49:
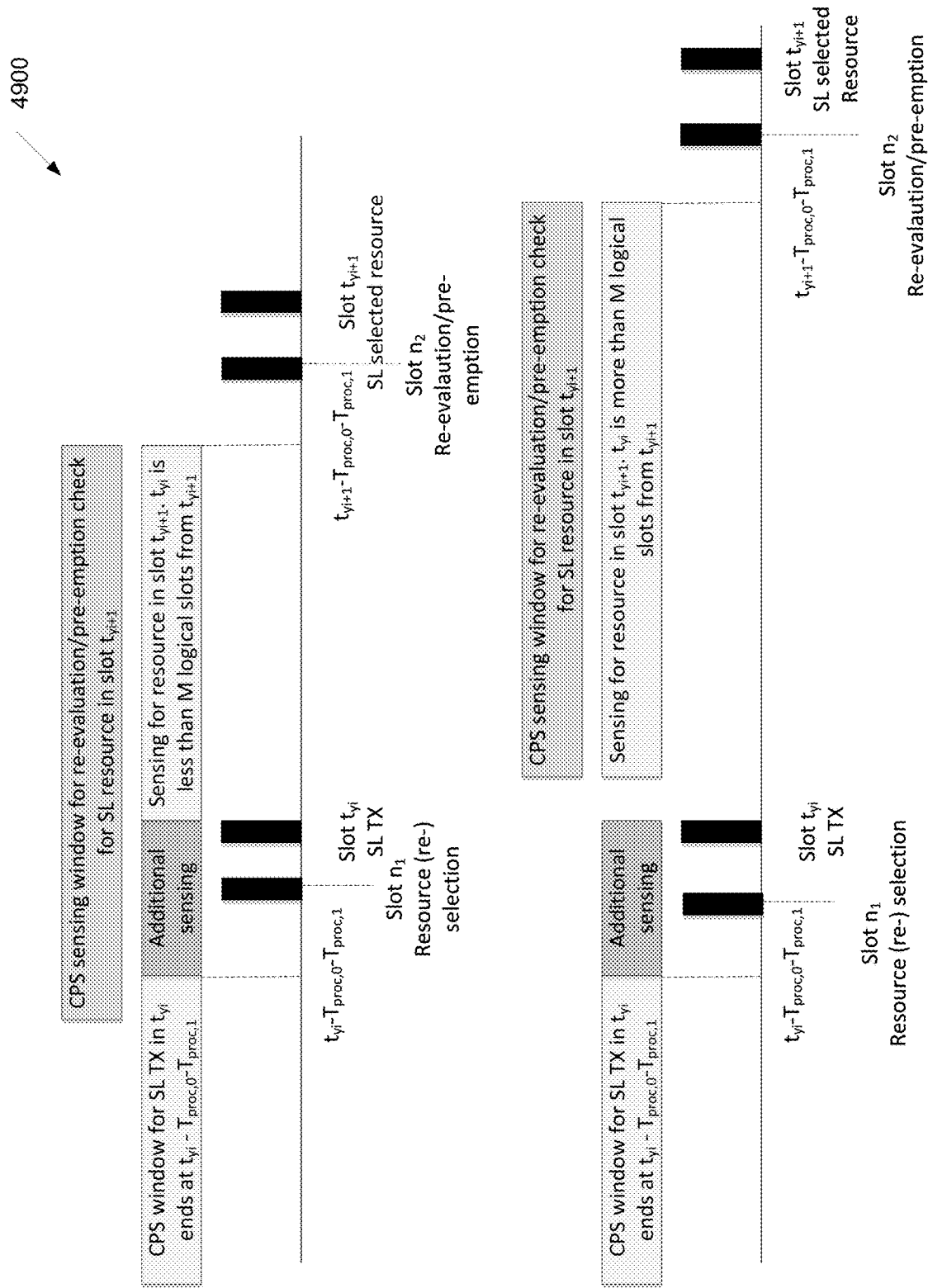

FIG. 49 illustrates yet another example of sensing operation 4900 according to embodiments of the present disclosure. An embodiment of the sensing operation 4900 shown in FIG. 49 is for illustration only.

In one example, as illustrated in FIG. 49, the UE continues to perform sensing from $t_{yi}{}^{SL}-T_{proc,0}{}^{SL}-T_{proc,1}{}^{SL}$ to and including slot $t'_{yi}{}^{SL}$ or the UE continues to perform sensing from $t'_{yi}{}^{SL}-T_{proc,0}{}^{SL}-T_{proc,1}{}^{SL}$ to slot $t'_{yi}{}^{SL}$.

Figure 50:
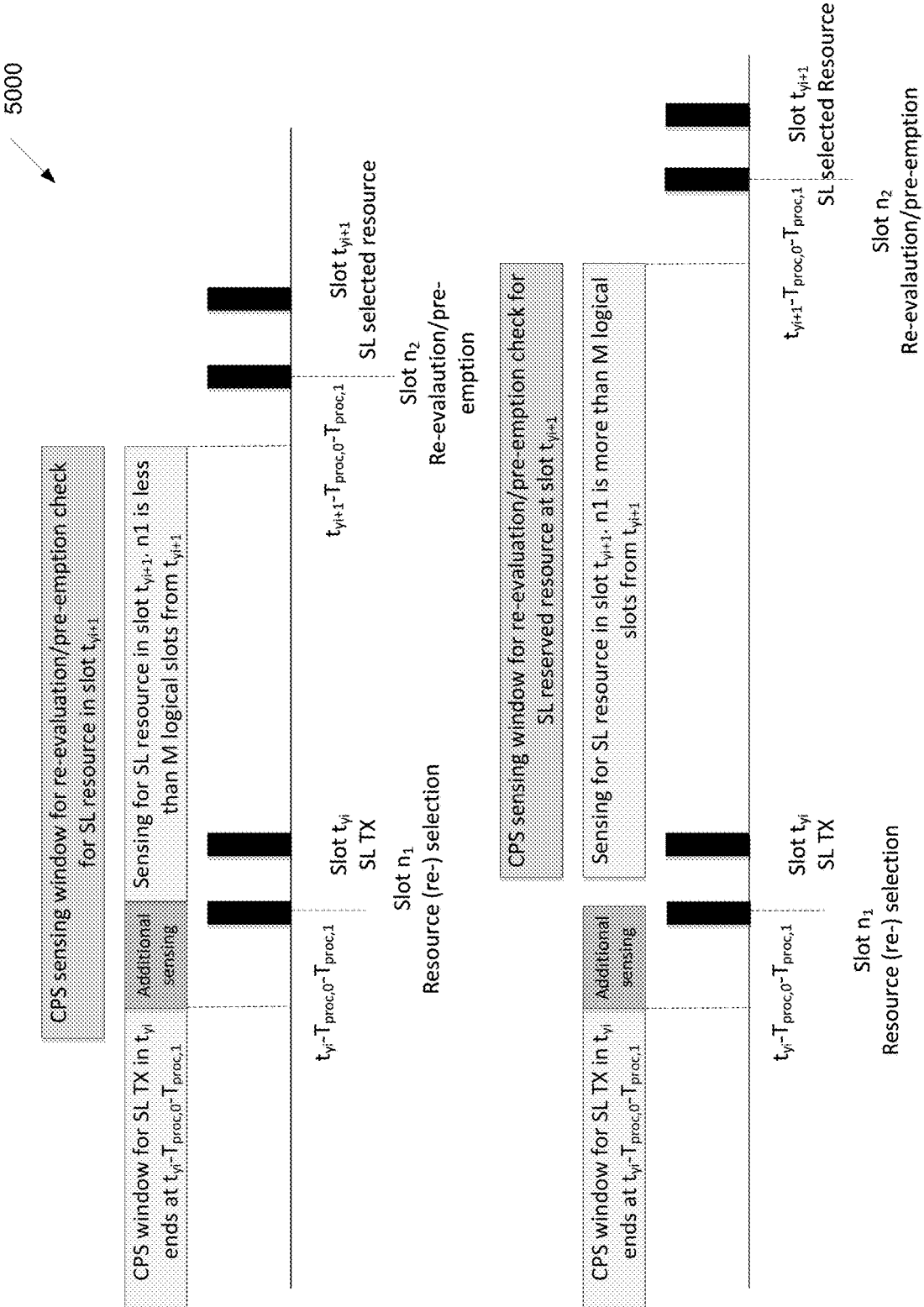

FIG. 50 illustrates yet another example of sensing operation 5000 according to embodiments of the present disclosure. An embodiment of the sensing operation 5000 shown in FIG. 50 is for illustration only.

In another example, as illustrated in FIG. 50, the UE continues to perform sensing from $t'_{yi}{}^{SL}-T_{proc,0}{}^{SL}-T_{proc,1}{}^{SL}$ to and including the slot where resource selection for slot $t'_{yi}{}^{SL}$ takes place (i.e., slot $n_1$), or the UE continues to perform sensing from $t'_{yi}{}^{SL}-T_{proc,0}{}^{SL}-T_{proc,1}{}^{SL}$ to the slot where resource selection for slot $t'_{yi}{}^{SL}$ takes place (i.e., slot $n_1$).

In one example A1.5.1a, the time between slot $t'_{yi}{}^{SL}$ and slot $t'_{yi+1}{}^{SL}$ is less than M logical slots. This is indicated in the top part of FIG. 49. The CPS sensing window for re-evaluation/pre-emption check for a selected (e.g., reserved) resource in slot $t'_{yi+1}{}^{SL}$ starts M logical slots before slot $t'_{yi+1}{}^{SL}$. The CPS sensing window for re-evaluation/pre-emption check for a selected (e.g., reserved) resource in slot $t'_{yi+1}{}^{SL}$ starts before slot $t'_{yi}{}^{SL}$ and includes the additional sensing and possibly part of the CPS window used for resource (re-)selection for slot $t'_{yi}{}^{SL}$.

In one example A1.5.1b, the time between the slot where resource (re-)selection for slot $t'_{yi}{}^{SL}$ takes place (i.e., slot $n_1$) and slot $t'_{yi+1}{}^{SL}$ is less than M logical slots. This is indicated in the top part of FIG. 50. The CPS sensing window for re-evaluation/pre-emption check for a selected (e.g., reserved) resource in slot $t'_{yi+1}{}^{SL}$ starts M logical slots before slot $t'_{yi+1}{}^{SL}$. The CPS sensing window for re-evaluation/pre-emption check for a selected (e.g., reserved) resource in slot $t'_{yi+1}{}^{SL}$ starts before slot $n_1$ and includes the additional sensing and possibly part of the CPS window used for resource (re-)selection for slot $t'_{yi}{}^{SL}$.

In one example A1.5.2a, the time between slot $t'_{yi}{}^{SL}$ and slot $t'_{yi+1}{}^{SL}$ is more than M logical slots. This is indicated in the lower part of FIG. 49. The CPS sensing window for re-evaluation/pre-emption check for a selected (e.g., reserved) resource in slot $t'_{yi+1}{}^{SL}$ starts M logical slots before slot $t'_{yi+1}{}^{SL}$. In this example, the additional sensing is not used.

In one example A1.5.2b, the time between the slot where resource (re-)selection for slot $t'_{yi}{}^{SL}$ takes place (i.e., slot $n_1$) and slot $t'_{yi+1}{}^{SL}$ is more than M logical slots. This is indicated in the lower part of FIG. 50. The CPS sensing window for re-evaluation/pre-emption check for a selected (e.g., reserved) resource in slot $t'_{yi+1}{}^{SL}$ starts M logical slots before slot $t'_{yi+1}{}^{SL}$. In this example, the additional sensing is not used.

In one example A1.5.3a, whether the UE performs addition sensing between slot $t'_{yi}{}^{SL}-T_{proc,0}{}^{SL}-T_{proc,1}{}^{SL}$ and slot $t'_{yi}{}^{SL}$ can be (pre-)configured (e.g., (pre-)configured for resource pool).

In one example A1.5.3b, whether the UE performs addition sensing between slot $t'_{yi}{}^{SL}-T_{proc,0}{}^{SL}-T_{proc,1}{}^{SL}$ and the slot where resource (re-)selection for slot $t_{yi}{}^{SL}$ takes place (i.e., slot $n_1$) can be (pre-)configured (e.g., (pre-)configured for resource pool).

In one example A1.5.4a, there is an additional sensing window before each slot of resource (re-)selection and re-evaluation/pre-emption check. e.g., additional sensing between slot $t'_{yi+1}{}^{SL}-T_{proc,0}{}^{SL}-T_{proc,1}{}^{SL}$ and slot $t'_{yi+1}{}^{SL}$, possibly also including slot $t'_{yi+1}{}^{SL}$.

In one example A1.5.4b, there is an additional sensing window before each slot of resource (re-)selection and re-evaluation/pre-emption check. e.g., additional sensing between slot $t'_{yi+1}{}^{SL}-T_{proc,0}{}^{SL}-T_{proc,1}{}^{SL}$ and the slot where resource (re-)selection for slot $t'_{yi+1}{}^{SL}$ takes place (i.e., slot $n_2$), possibly also including slot slot $n_2$.

In one example A1.5.5, whether the UE performs additional sensing depends on the value of M. For example, if $M<M_{th}$ or $M \leq M_{th}$, additional sensing is not performed, otherwise additional sensing is performed. Wherein, $M_{th}$ is threshold that can be (pre-)configured (e.g., (pre-) configured for resource pool), if not (pre-)configured a value specified in the system specifications can be used (e.g., 31 slots).

In one example A1.5.6a, if additional sensing is not performed, the time between slot $t'_{yi}{}^{SL}$ and slot $t'_{yi+1}{}^{SL}$ is greater than M logical slots. For example, during resource (re-)selection of a SL transmission in slot $t'_{yi}{}^{SL}$, the next selected (e.g., reserved) resource in slot $t'_{yi+1}{}^{SL}$, is selected to be greater than M logical slots after slot $t'_{yi}{}^{SL}$.

In one example A1.5.6b, if additional sensing is not performed, the time between the slot where resource (re-)selection for slot $t'_{yi}{}^{SL}$ takes place (i.e., slot $n_1$) and slot $t'_{yi+1}{}^{SL}$ is greater than M logical slots. For example, during resource (re-)selection in slot $n_1$, the next selected (e.g., reserved) resource in slot $t'_{yi+1}{}^{SL}$, is selected to be greater than M logical slots after slot $n_1$.

In one embodiment of Component A2, aperiodic transmission in resource pool with periodic reservations in a mode 2 resource pool is provided.

A mode 2 resource pool with periodic reservations has sl-MultiReserveResource enabled.

sl-MultiReserveResource: Indicates if it is allowed to reserve a sidelink resource for an initial transmission of a TB by an SCI associated with a different TB, based on sensing and resource selection procedure.

A UE (resource selection/re-selection procedure) is triggered by aperiodic transmission (i.e., $P_{rsvp\_TX}=0$) in slot n.

The examples of component 1 can also apply to aperiodic transmissions in mode 2 resource pool with periodic reservations when there are no periodic-based partial sensing results available.

In one embodiment of Component A3, channel busy ratio (CBR) measurement in a SL in a resource pool with partial sensing is provided.

The SL Channel Busy Ratio (CBR) is measured in slot n as the portion of sub-channels in the resource pool whose SL received signal strength indicator (RSSI) measured by the UE exceeds a (pre-) configured threshold sensed over a CBR measurement window [n–a, n–1], wherein a is equal to 100 or 100·2$^\mu$ slots according to higher layer parameter sl-TimeWindowSizeCBR, which can either be {ms100, slot100}. μ is the sub-carrier spacing configuration.

In case of partial sensing, the CBR is only based on RSSI measured over slots where the UE performs partial sensing (e.g., periodic based partial sensing (PBPS) and/or contiguous partial sensing (CPS)) in the measurement window [n–a, n–1], e.g., in slots where SL channels (e.g., PSCCH/PSSCH) can be received, e.g., for sensing.

The portion of sub-channels is given by the ratio of the sub-channels in the time window [n–a, n–1], where the UE performs partial sensing (e.g., PBPS and/or CPS), whose SL RSSI measured by the UE exceeds a (pre-) configured threshold over the total number of sub-channels in the time window [n–a, n–1], where the UE performs partial sensing (e.g., PBPS and CPS), e.g., in slots where SL channels (e.g., PSCCH/PSSCH) can be received, e.g., for sensing.

In one example A3.1, if the number of slots in the time window [n–a, n–1] available for CBR based on RRSI measurement (e.g., the slots where the UE performs partial sensing (e.g., PBPS and/or CPS)) is less than (or less than or equal to) a value, e.g., X, the CBR measurement is considered invalid and not used, otherwise it is considered valid and used. X can be specified in the system specifications and/or (pre-)configured or updated by higher layer RRC signaling and/or MAC CE signaling and/or L1 control signaling.

In one example A3.2, if the ratio of slots in the time window [n–a, n–1] available for CBR based on RRSI measurement (e.g., the slots where the UE performs partial sensing (e.g., PBPS and/or CPS)) to the total number of slots in the same window is less than (or less than or equal to) a value, e.g., Z, the CBR measurement is considered invalid and not used, otherwise it is considered valid and used. Z can be specified in the system specifications and/or (pre-)configured or updated by higher layer RRC signaling and/or MAC CE signaling and/or L1 control signaling.

In the present disclosure, a determination of the sensing window and slots for the selection of candidate SL resources for aperiodic SL transmission, and SL channel busy ratio (CBR) determination and validity in case of partial sensing are provided.

The above flow charts and diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver; and
a processor operably coupled to the transceiver, the processor configured to:
  operate with partial sensing;
  operate in a resource pool configured for the partial sensing;
  trigger a sidelink (SL) resource selection in a slot n;
  select Y candidate slots for the SL resource selection, wherein a first of the selected Y candidate slots is a slot $t'_{y0}{}^{SL}$; and
  perform, in a sensing window, a contiguous partial sensing (CPS), wherein:
    the sensing window is in contiguous slots within the resource pool relative to the slot $t'_{y0}{}^{SL}$, an end of the sensing window is $T_{proc,0}^{SL}+T_{proc,1}^{SL}$ before the slot $t'_{y_0}^{SL}$, $T_{proc,0}^{SL}$ is a sensing processing latency time, and $T_{proc,1}^{SL}$ is a resource selection processing time.

2. The UE of claim 1, wherein a start of the sensing window is one of:
    31 logical slots before the slot $t'_{y_0}^{SL}$, or
    a configured number of logical slots before the slot $t'_{y_0}^{SL}$.

3. The UE of claim 1, wherein a start of the sensing window is no earlier than the slot n.

4. The UE of claim 1, wherein:
    the resource pool has a parameter sl-MultiReserveResource set to enabled; and
    the processor is further configured to perform periodic-based partial sensing (PBPS).

5. The UE of claim 4, wherein the selected Y candidate slots are for the CPS and the PBPS.

6. The UE of claim 4, wherein the processor is further configured to perform PBPS for a re-evaluation check or a pre-emption check.

7. The UE of claim 1, wherein:
    the processor is further configured to trigger a re-evaluation check or a pre-emption check in the slot n,
    a slot $t'_{yi}^{SL}$ replaces the slot $t'_{y_0}^{SL}$, and
    the slot $t'_{yi}^{SL}$ is a first slot with a SL resource for a re-evaluation check or a pre-emption check after the slot $n+T_3$, where $T_3$ is a resource selection processing time for re-evaluation check or pre-emption check.

8. The UE of claim 1, wherein:
    the processor is further configured to determine candidate resources in a slot R, and
    the slot R is the resource selection processing time, $T_{proc,1}^{SL}$, before the slot $t'_{y_0}^{SL}$.

9. The UE of claim 1, wherein the processor is further configured to:
    measure a SL channel busy ratio (CBR) over a window [m−a, m−1], where m is a slot in which the received signal strength indicator (RSSI) is measured and a is determined according to a higher layer parameter sl-TimeWindowSizeCBR, and
    determine the CBR based on the RSSI measured in slots within the window, wherein partial sensing is performed and a number of the slots is X; and
    use the measured CBR when X is not less than a pre-configured value.

10. A method of operating a user equipment (UE), the method comprising:
    operating with partial sensing;
    operating in a resource pool configured for the partial sensing;
    triggering for a sidelink (SL) resource selection in a slot n;
    selecting Y candidate slots for the SL resource selection, wherein a first of the selected Y candidate slots is a slot $t'_{y_0}^{SL}$; and
    performing, in a sensing window, a contiguous partial sensing (CPS), wherein:
        the sensing window is in contiguous slots within the resource pool relative to the slot $t'_{y_0}^{SL}$,
        an end of the sensing window is $T_{proc,0}^{SL}+T_{proc,1}^{SL}$ before the slot $t'_{y_0}^{SL}$,
        $T_{proc,0}^{SL}$ is a sensing processing latency time, and
        $T_{proc,1}^{SL}$ is a resource selection processing time.

11. The method of claim 10, wherein a start of the sensing window is one of:
    31 logical slots before the slot $t'_{y_0}^{SL}$, or
    a configured number of logic slots before the slot $t'_{y_0}^{SL}$.

12. The method of claim 10, wherein a start of the sensing window is no earlier than the slot n.

13. The method of claim 10, wherein:
    the resource pool has a parameter sl-MultiReserveResource set to enabled; and
    the method further comprises performing periodic-based partial sensing (PBPS).

14. The method of claim 13, wherein the selected Y candidate slots are for the CPS and the PBPS.

15. The method of claim 13, further comprising performing PBPS for a re-evaluation check and a pre-emption check.

16. The method of claim 10, further comprising:
    triggering a re-evaluation check or a pre-emption check in the slot n,
    wherein a slot $t'_{yi}^{SL}$ replaces the slot $t'_{y_0}^{SL}$, and
    the slot $t'_{yi}^{SL}$ is a first slot with a SL resource for a re-evaluation check or a pre-emption check after the slot $n+T_3$, where $T_3$ is a resource selection processing time for re-evaluation check or pre-emption check.

17. The method of claim 10, further comprising:
    determining candidate resources in a slot R,
    wherein the slot R is the resource selection processing time, $T_{proc,1}^{SL}$, before the slot $t'_{y_0}^{SL}$.

18. The method of claim 10, further comprising:
    measuring a SL channel busy ratio (CBR) over a window [m−a, m−1], where m is a slot in which the received signal strength indicator (RSSI) is measured and a is determined according to a higher layer parameter sl-TimeWindowSizeCBR;
    determining the CBR based on the RSSI measured in slots, within the window, wherein partial sensing is performed and a number of the slots is X; and
    using the measured CBR when X is not less than a pre-configured value.

* * * * *